United States Patent [19]
Orr et al.

[11] Patent Number: 5,895,477
[45] Date of Patent: Apr. 20, 1999

[54] DESIGN ENGINE FOR AUTOMATIC LAYOUT OF CONTENT

[75] Inventors: Michael B. Orr; Keith S. Brintzenhofe, both of Bainbridge Island; Joseph D. King, Seattle; Marc B. McDonald, Mercer Island; Geoffrey von Limbach, Seattle; Steven E. Weil, Bellevue, all of Wash.

[73] Assignee: Design Intelligence, Inc., Seattle, Wash.

[21] Appl. No.: 08/745,557

[22] Filed: Sep. 9, 1996

[51] Int. Cl.$^6$ ................................................ G06F 17/21
[52] U.S. Cl. ................................................ 707/517
[58] Field of Search ............................ 707/517, 526, 707/530, 521, 514, 524

[56] References Cited

U.S. PATENT DOCUMENTS

| | | | |
|---|---|---|---|
| 5,263,132 | 11/1993 | Parker et al. | 395/146 |
| 5,581,670 | 12/1996 | Bier et al. | 395/326 |
| 5,621,873 | 4/1997 | Tanaka et al. | 395/779 |
| 5,630,120 | 5/1997 | Vachey | 395/602 |
| 5,630,125 | 5/1997 | Zellweger | 395/614 |
| 5,669,007 | 9/1997 | Tateishi | 395/779 |
| 5,673,401 | 9/1997 | Volk et al. | 395/127 |
| 5,680,619 | 10/1997 | Gudmundson et al. | 395/701 |
| 5,701,500 | 12/1993 | Ikeo et al. | 395/779 |
| 5,708,806 | 1/1998 | DeRose et al. | 395/615 |
| 5,717,945 | 2/1996 | Tamura | 395/800 |

FOREIGN PATENT DOCUMENTS

| | | |
|---|---|---|
| 0 349 457 | 1/1990 | European Pat. Off. . |
| 0513553 A2 | 11/1992 | European Pat. Off. . |
| 0 578 207 A2 | 1/1994 | European Pat. Off. . |
| 2 273 188 | 6/1994 | United Kingdom . |
| WO94/28480 | 8/1994 | WIPO . |

OTHER PUBLICATIONS

Expansion Plans Private Ventures; Pages Software; Sep. 1994; p. 29.

The Seybold Report on Desktop Publishing; Next page in Pages'Next saga: shipments; Dec. 6, 1993 v8 n4 p. 12(1).

Safi, Quabidur R.; Pages PC Week May 2, 1994 v11 n17 p. 103(2).

Document processor for NextStep; PC Week; Jul. 11, 1994, v11 nk27, p. 33(1).

Pages by Pages; Data Sources Report 1994; Record# 001 668 192 010 000 1.

Pages Software, Inc.; Data Sources Report 1994; Record #001 668.

European Patent Office, "Patent Cooperation Treaty International Preliminary Examination Report," May 12, 1998; International application No. PCT/US97/15660.

Primary Examiner—Joseph H. Feild
Assistant Examiner—Alford W. Kindred
Attorney, Agent, or Firm—Beyer & Weaver, LLP

[57] ABSTRACT

A three-way separation of information in a document includes content, design and media aspects. This division supports automatic rendering to multiple forms of media such as print, Intranet, Internet, and OLE embedding. A method adds content to a composition having a chosen design and automatically calculates a layout for the composition. A content object is dropped upon a receiving component of the composition. The dropped content object has at least one potential type. A potential type of the content object is matched with a compatible type of the receiving component. Next, the design tree is modified to incorporate the content object, and media layout values are calculated for each content element of the composition The dropped content may change the existing content, may replace it completely, may be inserted into the existing content, may change its properties, or may result in new components being created in the design tree. If content is dropped in an incorrect location, a tree structure is used to determine where to place the content automatically. A content drop table data structure is used to assist in dropping content onto a composition. When a content object having potential dropped content types is dropped upon a component of the composition, a matching subcomponent type may be determined by reference to the content drop table.

20 Claims, 47 Drawing Sheets

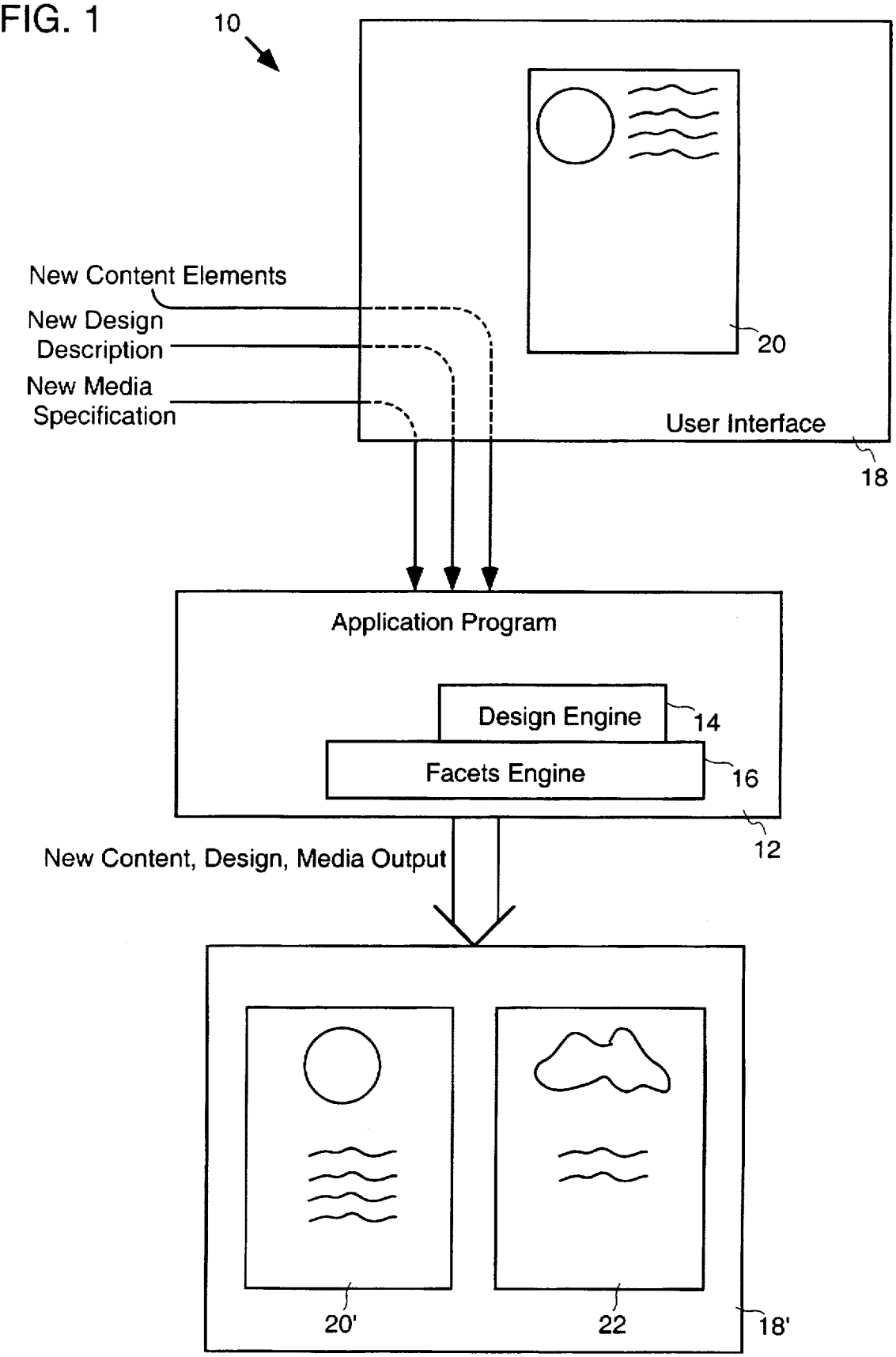

Footer Component

| Content Facet | |
|---|---|
| Property | Value |
| Text | <Pointer> |

| Design Facet | |
|---|---|
| Property | Value |
| Text Face | Times |
| Text Attribute | Italic |
| Justification | Center |
| Relative Size | 75% |

| Media Facet | |
|---|---|
| Property | Value |
| x Position | 20 |
| y Position | 100 |
| (dx) Width | 60 |
| (dx) Heigth | 2 |

FIG. 7

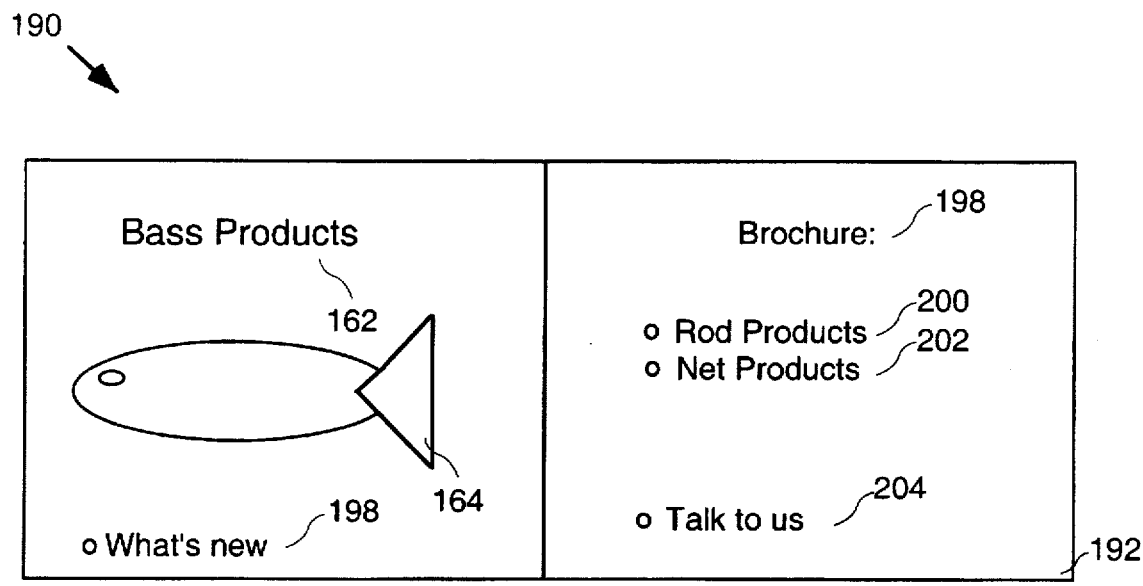
FIG. 12A    Brochure Composition -- Media Changed
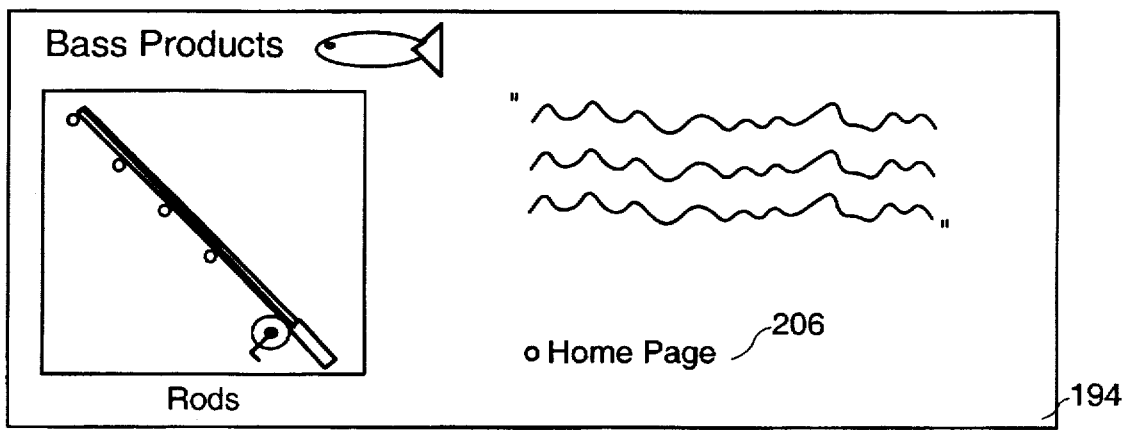
FIG. 12B
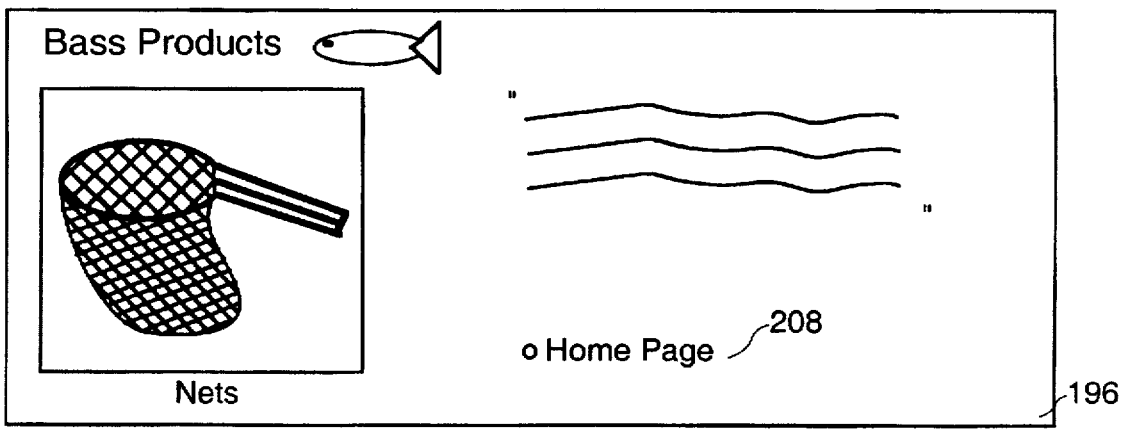
FIG. 12C

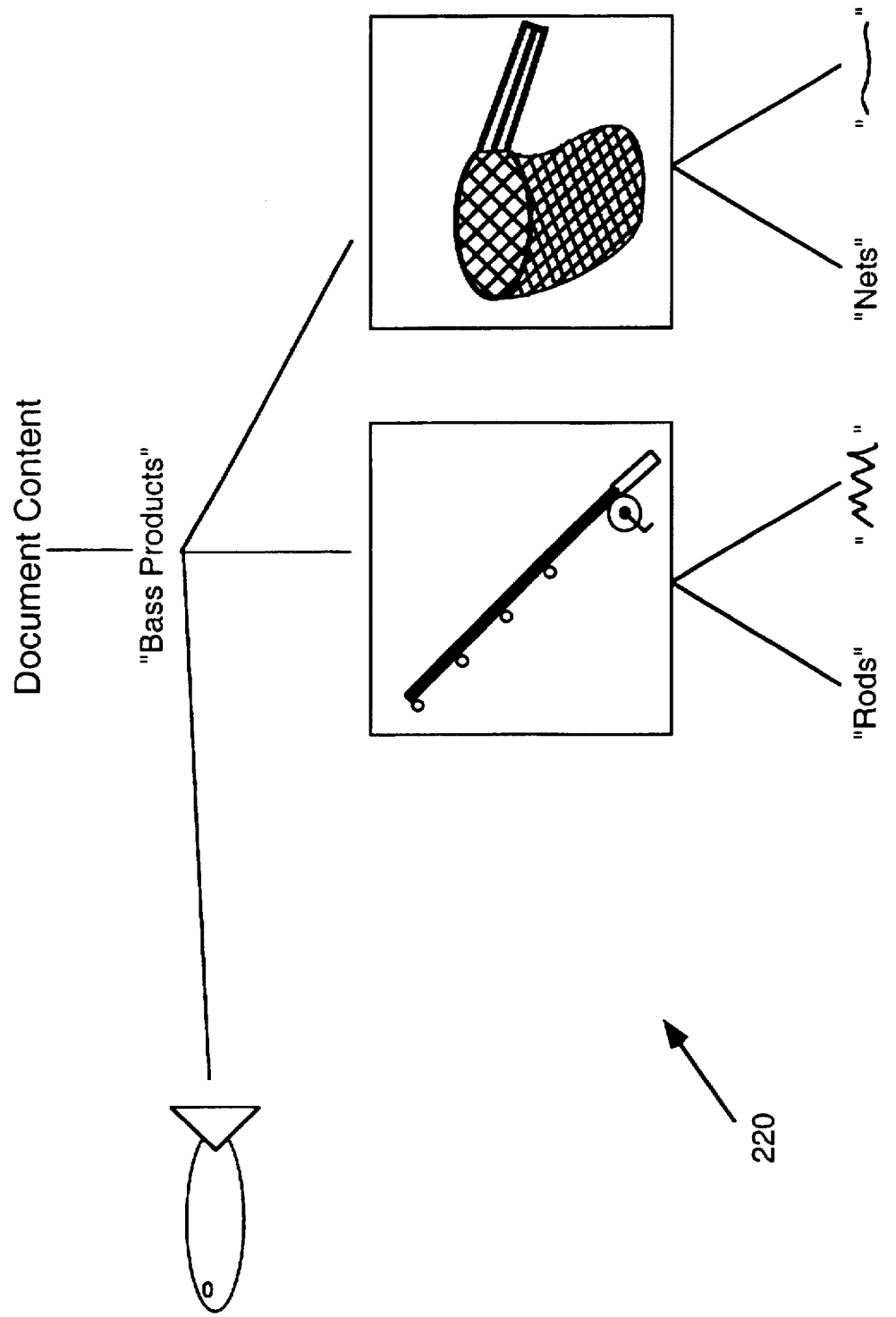
FIG. 13 Content Tree

Design Tree

Paper Media Tree

HTML Media Tree

260

| "Bass Products" ||||||
|---|---|---|---|---|---|
| Paper Media || HTML Media || VRML Media ||
| x | — | x | 10 | x | — |
| y | — | y | 10 | y | — |
|   |   |   |   | z | — |
| Heigth | — | Heigth | 25 | Heigth | — |
| Width | — | Width | 8 | Width | — |
|   |   | Page No. | 0 | Depth | — |
|   |   |   |   | Color | — |
|   |   |   |   | Brightness |   |
| • • • |   | • • • |   | Rotation |   |
|   |   |   |   | Sound |   |
|   |   |   |   | • • • |   |

FIG. 17

Example Product Layout 370  372

Design Tree

380

Media Tree

390

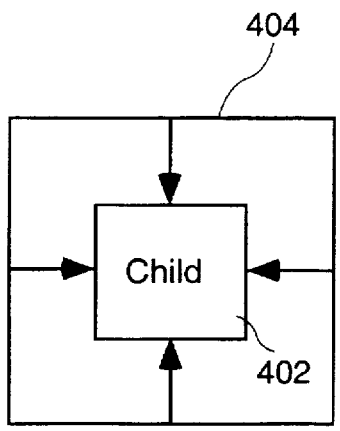
FIG. 25A
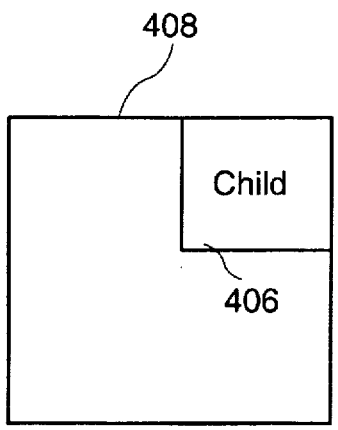
FIG. 25B
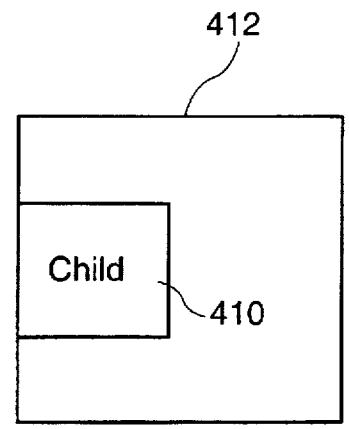
FIG. 25C
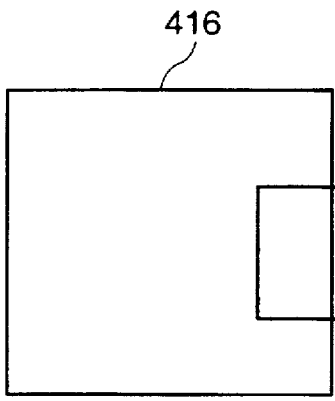
FIG. 25D
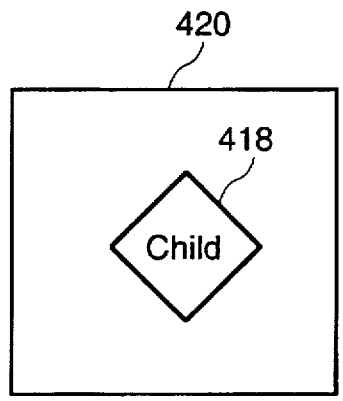
FIG. 25E
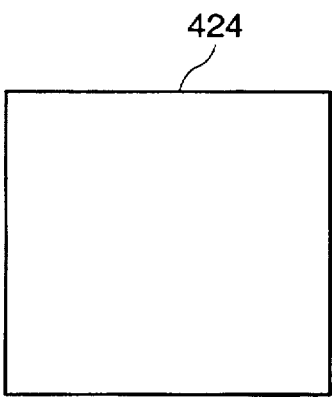
FIG. 25F
One - Way Media Division
FIGS. 25A-25F Two Way Media Division

460

Three - Way Media Division

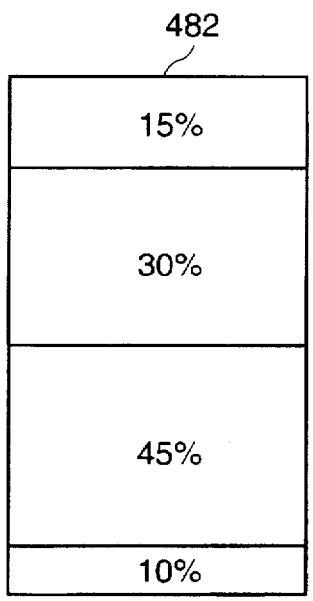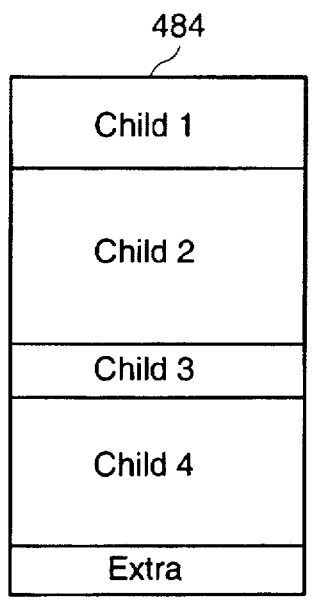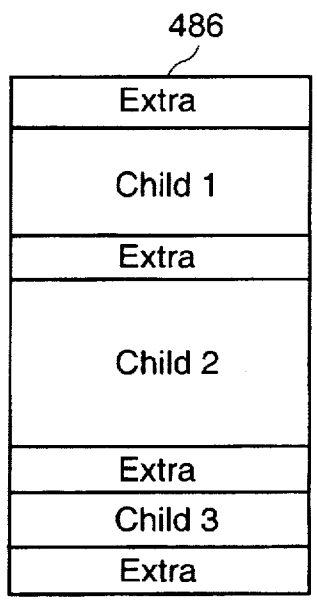
FIG. 28A  FIG. 28B  FIG. 28C
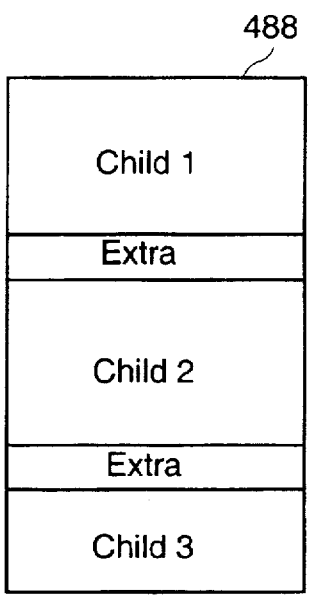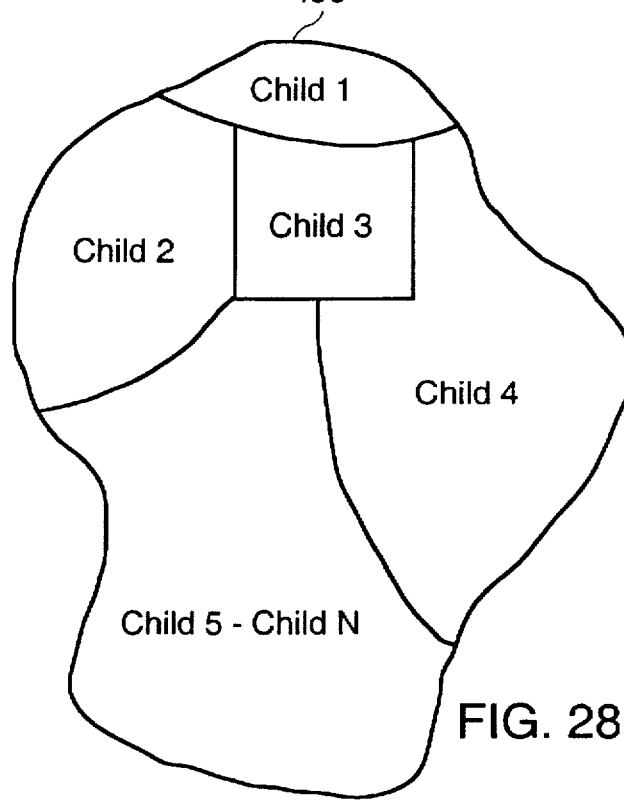
FIG. 28D
FIG. 28E
N - Way Media Division
FIGS. 28A-28E

DESIGN ENGINE FOR AUTOMATIC LAYOUT OF CONTENT

FIELD OF THE INVENTION

The present invention relates generally to the processing of data by a computer system. More specifically, the present invention relates to the automatic layout and formatting of content for a particular design and medium.

BACKGROUND OF THE INVENTION

Since the introduction of PC-based layout and publishing software in the late-1980's, the explosive growth of this market has underscored graphic design as a vital component of effective business communications. The information explosion has resulted in hundreds of messages—many enriched with clip art, custom illustrations, and scanned images—vying for attention across a wide variety of media (print, electronic, multimedia, etc.). Businesses have a significant need to visually differentiate their documents above the market noise. Pages that emphasize content with minimal attention to formatting, illustrations, layout, and visual appeal, will no longer attract the attention of increasingly sophisticated business audiences. Business users competing for readers' time now place a premium on creating and publishing graphically attractive communications.

The proliferation of software tools, ready-made content (e.g. on-line photo libraries and CD-ROM disks of clip art), and desktop peripherals (e.g. color printers and scanners), have made attractive content and output affordable for anyone with a personal computer. In addition, the Internet has had a profound impact on both the breadth of content and distribution opportunities. However, producing professional-quality materials for disparate media, including the Internet, requires design expertise, a variety of authoring tools, and advanced computer skills; a rare combination among most business people. Home and small business users in particular—already taxed for time to cover multiple business roles—seldom have the time or the tools needed to enhance their design and computer expertise.

To assist in the creation of materials, a number of word processing programs, desktop publishing tools, internet authoring tools and the like have been developed. Many of the word processing programs allow the user to include tables, columns and rudimentary graphics within a document, however, they are typically not designed to easily facilitate sophisticated document formatting. Desktop publishing tools can assist a user in preparing and formatting more sophisticated documents, as well as outputting the document onto a medium such as a printed page, a computer screen or other. However, current software publishing tools still require that the user manually change the layout and formatting or modify the content if the document needs to be output to a different media. Likewise, if the user wishes to change the design, or wishes to change the layout and formatting, the user must often manually modify the content of the document in order to fit the new design or layout. This manual modification of content or layout is time consuming and tedious for the user.

A variety of word-processing, desktop publishing, and Internet authoring applications claim to streamline document production. Each of these products partially succeeds, but with significant limitations. For example, current software publishing packages allow a user to author a document once, but do not allow the user to automatically publish to any desired format without some manual intervention by the user. For example, the Pagemaker software by Adobe Systems, Inc. is one approach to solving the problem of automating manual paste-up. Pagemaker can be used to create elaborate documents, as long as the user is already a skilled graphic designer. However, Pagemaker is unable to automatically turn text and pictures into sophisticated designs on its own. Likewise, the Adobe Acrobat software addresses the problem of imitating paper documents on screen. However, Acrobat still does not allow for automatic redesign or reformatting based upon changing an output media. The Internet Studio software available from Microsoft Corporation is able to take a document and to separate form from content. However, this software is only capable of producing Web pages. If the user desires to take the same information and turn it into a different media such as a data sheet, a manual or a brochure, the user must manually do all of the reformatting his or herself.

In addition to the inability to automatically adjust content and/or design for a desired media, prior art software tools typically only provide a two-way separation between the form and content of a document. In these prior art tools, content structure is typically related to the output media, and the content structure is also tagged as to how it should be presented in the output media. This presents problems when the same content must be rendered in different output media. In addition, other software tools may be able to render a document into a different media, but are unable to maintain the original design and the relationship between the content elements of that original design.

Also, SGML-based tools and style sheet tools (included with many word processors and desktop publishing tools) may allow the intent of content structures to be recorded as tags, but do not allow a specific design to saved and reused, and automatically rendered to a medium. Also, database packages, other forms packages, report packages and "long document" systems (such as Interleaf) have a variety of drawbacks. They do not provide computation-intensive solutions to a design problem such as global fitting, flexible design changes or media changes. They do not support rich design structures, nor do they support interactive experimentation. Also, they do not allow for repurposing/multipurposing among different media.

Therefore, it would be desirable for a user to be able to author a document once, and then have a system to adapt the document automatically for changes in the content, design or output media while maintaining the relationships between the content elements of the document.

SUMMARY OF THE INVENTION

An embodiment of the present invention provides for a three-way separation of the information in a document. In a particular embodiment, the document is separated into its content, design and media aspects. Through this representation, an embodiment of the present invention is better able to support automatic rendering to multiple forms of media. For example, embodiments of the present invention support the automatic integration, composition and layout of content from multiple sources into intelligent dynamic document templates instantly publishable in media such as print, Intranet, Internet, and in an OLE embedding.

In one embodiment, a content drop table data structure is used to assist in dropping content onto a composition. The drop table is associated with a receiving component type in a composition. The drop table includes a component type indicator indicating with which type of component the content drop table is associated. The table has two columns of types that may be matched. A first list of potential dropped content types is representative of the types of content that may be dropped upon a receiving component type in the composition. A second list includes subcomponent types that are compatible with the receiving component type. Thus, for each potential dropped content type of in the first list, there is an associated group of at least one subcomponent type from the second list of subcomponent types that indicate the type of subcomponent that matches with the potential dropped content type. When a content object having potential dropped content types is dropped upon a component of the composition, a matching subcomponent type may be determined by reference to the content drop table.

In another embodiment, a computer-implemented method adds content to a composition having a chosen design and automatically calculates a layout for the composition. The composition is represented by components in a design tree and includes content elements associated with the components. Initially, a content object is dropped upon a receiving component of the composition. The dropped content object has at least one potential type. A potential type of the content object is matched with a compatible type of the receiving component. Next, the design tree is modified to incorporate the content object, and media layout values are calculated for each content element of the composition. The design tree is used in the calculations such that the content elements are laid out in said chosen design.

In various embodiments, the dropped content may change the existing content, may replace it completely, or may be inserted into the existing content. Also, dropped content may change properties of the existing content, or may result in new components being created in the design tree. If content is dropped in an incorrect location, a tree structure of the present invention may be used to determine where to place the content.

BRIEF DESCRIPTION OF THE DRAWINGS

The invention, together with further advantages thereof, may best be understood by reference to the following description taken in conjunction with the accompanying drawings in which:

FIG. 1 shows diagrammatically how an embodiment of the present invention may be used to input content elements, a design description and a media specification in order to produce a new information presentation.

FIG. 5b illustrates in greater detail the composition of FIG. 5a.

FIG. 7 shows in detail the footer component of FIG. 6 having various properties that are represented in a content facet, a design facet and a media facet.

FIGS. 12a, 12b and 12c show the brochure of FIG. 9 after it has been rendered to HTML media.

FIG. 13 illustrates an embodiment of the content tree for the brochure of FIG. 9.

FIG. 17 illustrates in more detail a particular component from the HTML media tree of FIG. 16.

FIG. 23b is an embodiment of the design tree for the product layout of FIG. 23a.

FIG. 23c is an embodiment of the media tree for the product layout of FIG. 23a.

FIG. 23d shows the relationship between the design tree and the media tree for the product layout of FIG. 23a.

FIGS. 25a–25f illustrate examples of possible geometries for a one-way media division.

FIGS. 28a–28e illustrate examples of possible geometries for an N-Way media division.

DETAILED DESCRIPTION OF THE INVENTION

Figure 1A:
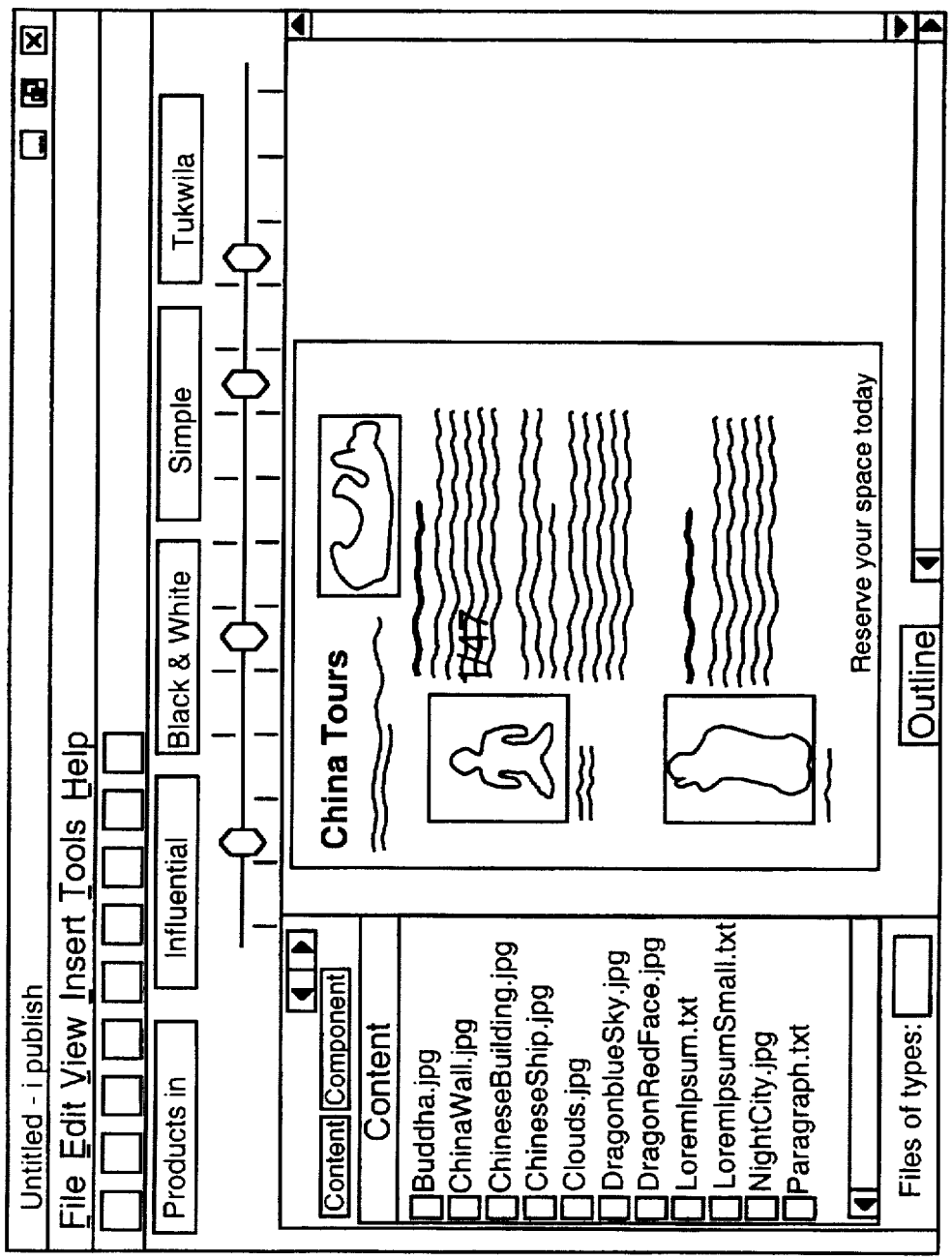
FIG. 1a is first example of a user interface for a travel brochure according to one embodiment of the present invention.

The present invention relates to a number of features that facilitate automatic and dynamic composition and recomposition of program objects including design descriptions, content elements, and output media specifications. Unlike conventional word processing, desktop publishing or Web authoring software, the present invention dramatically improves document production in at least three ways. The present invention is able to automatically integrate a wide variety of types and combinations of content (e.g., text, pictures, data, graphics, OLE objects, video, sound, etc.). Also, the invention automatically performs document layout, styling and fit of specified content elements into a selected design. Additionally, the invention is able to automatically reformat the content to a new document type or design, to support a wide variety of distribution mechanisms, including, for example, the printed page, a computer screen presentation, as an OLE embedded object, or via the Internet as an HTML page. Various embodiments of the present invention use a combination of content, design and media features to improve document production.

In some embodiments, powerful content processing capabilities make assembly of content from a wide variety of resources (another disk, over a network, from the Internet, for example) as simple as executing a drag and drop action. These capabilities provides a significant benefit to the user by addressing two key user problems: (1) the frequent difficulty of incorporating data from disparate file formats; and (2) the awkward and time consuming content preparation work typically necessary in manually preparing multi-format content (e.g., removing program specific formatting commands and symbols).

Automatic layout and formatting may be also be performed using built-in graphic design expertise. Embodiments of the present invention will automatically fit content to the selected design (newsletter—modern, European, wired, traditional, etc.), represent it in the selected media view (printed page, screen, HTML, etc.), position text and graphics, change type specifications, jump stories, add pages, size graphics, or make other needed adjustments to the layout. If the user changes text or graphics schemes in the document, or even the overall design, the fit is automatically recalculated and necessary adjustments are made to format and/or style. These intelligent design features make it possible to deliver sophisticated design expertise to non-design professionals in "unbreakable documents". These features empower users to make design decisions based on what is appropriate and "looks good", rather than being constrained by their particular level of design or tools expertise.

The concept of "fit" also refers to every aspect of how a document is rendered to a particular medium. For example, various properties of content elements help to express the design of that element or of the overall document. These properties affect the layout/format of an element, although may not necessarily affect the overall layout of the whole document. In other words, even though these properties may not affect the overall "fit" of a document, the are nonetheless an aspect of design. Examples for text are: font size, typeface, italic, bold, underline, drop capitals, foreground and background colors, and inter-character/line spacing. Examples for images are: crop rectangle, pan position, zoom factor, bit mask and palette. Examples for general content are: borders, orientation, and serial/parallel arrangement of subcomponents.

Embodiments of the present invention also support automatic reformatting for multiple media outputs. A "Write Once—Publish Anywhere" work flow is supported by eliminating the complex tasks of totally reformatting or recreating a document for publication in an alternative medium (i.e. converting a printed newsletter into a graphically rich Internet document.) This media-intelligent automatic reformatting eliminates the need for a user to own multiple authoring tools for content assembly such as PageMaker, Express (from Quark, Inc.), Publisher (from Microsoft Corporation), Web and multimedia authoring tools, or other DTP applications. This automatic reformatting eliminates this need for multiple tools by automatically re-composing the output to a wide variety of media environments. Embodiments of the present invention allow any business user with basic computer skills to be able to quickly and easily produce professional-looking documents ready for a variety of media such as print, screen, the Internet, etc.

Embodiments of the present invention may be used within a variety of application programs. Turning now to FIG. 1, an embodiment of a use of the present invention is shown at 10. An application program 12 that embodies the present invention has a design engine module 14 and a facets engine module 16. The application program 12 also includes a user interface 18 which currently is presenting a composition 20. If the user wishes to modify the composition, the user may add new content elements, a new design description or a new media specification through the user interface or the like in order to be processed by the application program 12. Once the processing is complete, the application program outputs the new content, design and media to be presented through user interface 18'.

In this example, the user has added a new content element 22 that now appears on the user interface 18' to the right of the content element 20'. The user has also specified a new design description for the content elements. Content element 20' shown in user interface 18' now has a design in which the text appears below the image, instead of appearing to its right, as in the original content element 20 of user interface 18. It is also possible for the user to keep the content the same and modify either the design of the composition or the medium to which is output. Generally, a user may change one or all of the content, design and media aspects of the composition and have the composition be automatically adjusted by the application program 12.

The content elements that are added to the composition may be of any type and may take a wide variety of different forms. By way of example, representative types of content include text, images, data, graphics, OLE objects, video, sound and others. Also, these content elements may be dropped or located in any suitable manner at any location within the user interface. The design description specified by the user may also be of any kind. By way of example, the design specified by the user may be a custom design that the user has created through the use of the application program 12, or the design may come from a design template that is stored in a design catalogue of the application program 12. Many different types of designs are possible. By way of example, the user may specify a horizontal brochure format, a vertical brochure format, a single page or multi-page format, or other designs such as reports, newsletters, memos, home pages, white papers, schedules, programs, agendas, calendars, flyers, tables, catalogues, galleries, Web sites, maps, organizational charts, slides presentations, etc.

Additionally, the user may specify any desired medium to which the composition will be rendered. By way of example, a medium typically may be a sequence of screen pages of a computer, paper pages, a Web site on the Internet written in Hypertext Markup Language (HTML) or any other suitable language, a site on an Intranet system, or an OLE embedded object. Other types of media are possible as well. For example, the composition may be rendered to live HTML (perhaps incorporating JAVA applets, or Shockwave objects etc.), a multiple page OLE format, a multimedia format, a three-dimensional HTML format (VRML), an audio format, a TAPI format, a universal in-box format, or any abstract medium that may be the subject of further automated processing (such as data to be output to an Excel model that is not directly consumable by the user).

The user interface 18' illustrates an example of the application program 12 rendering the user specified content, design and media for a computer screen format. The composition may be rendered to the screen format in any suitable manner such as by standard window drivers and API's known in the art. The composition may be rendered to paper media by specifying regions on paper pages including formats and styles where content elements are to be printed. A composition may be rendered to HTML format by also specifying regions within Web pages including formats and styles where content elements are to be located, and by translating the information into the HTML language. The design of the composition contains knowledge of what HTML is able to express, thus allowing a translation into HTML. In other words, the expressible geometries available in an HTML format are included in the design facets of many components of a composition. This information may be inherited from particular prototype components of the system. A composition may be rendered to an OLE embedded object by using a standard set of published interfaces such as those available from Microsoft Corporation.

The application program 12 that includes the design engine module 14 may be any suitable application program that is able to take advantage of the capabilities of the design engine. Alternatively, the application program 12 may include an embodiment of the design engine 14, or may call a server application that includes or calls the design engine 14. By way of example, the application program 12 may perform an automatic, server-side generation of HTML pages or other presentations. This may be done dynamically without user intervention. And the content used may come from a database or other data source. In addition, the design engine of the present invention may be used with a wide variety of user interfaces, such as user interface 18.

The design engine 14 defines a composition framework and framework rules for representing documents and their components. The design engine 14 also contains a knowledge base of professional document and component designs commissioned specifically for this purpose. In one embodiment, the design engine models documents as deeply nested combinations of three dimensions: content elements, design descriptions and media specifications. The design engine manages these dimensions independently, resulting in more efficient, richer, more flexible and more automated interaction for a user creating documents. The design engine automatically adjusts the composition whenever the user changes any of these dimensions. With this capability, the design engine may use the same interface to support compositions that vary from printed materials and screen presentations to other media such as the World Wide Web.

The design engine takes as input content elements, a design description and a media specification, and is renders the content to the medium in accordance with the design description. The design engine is constructed such that it inherently has the capability to present the information in any one of a variety of media. Preferably, the design engine is built upon technology provided by the facets engine as described in U.S. patent application entitled "Method and System for Implementing Software Objects", Ser. No. 08/546,316 filed Oct. 20, 1995, by inventors Marc B. McDonald and Michael B. Orr, which is hereby incorporated by reference in its entirety. The facets engine provides an object-oriented platform upon which the design engine may be built. A brief explanation of the facets technology will now be provided below to assist the reader in understanding particular embodiments of the present invention. However, it should be appreciated that in other embodiments, the capabilities of the design engine may be implemented using a technology other than that provided by the facets engine.

Figure 1B:
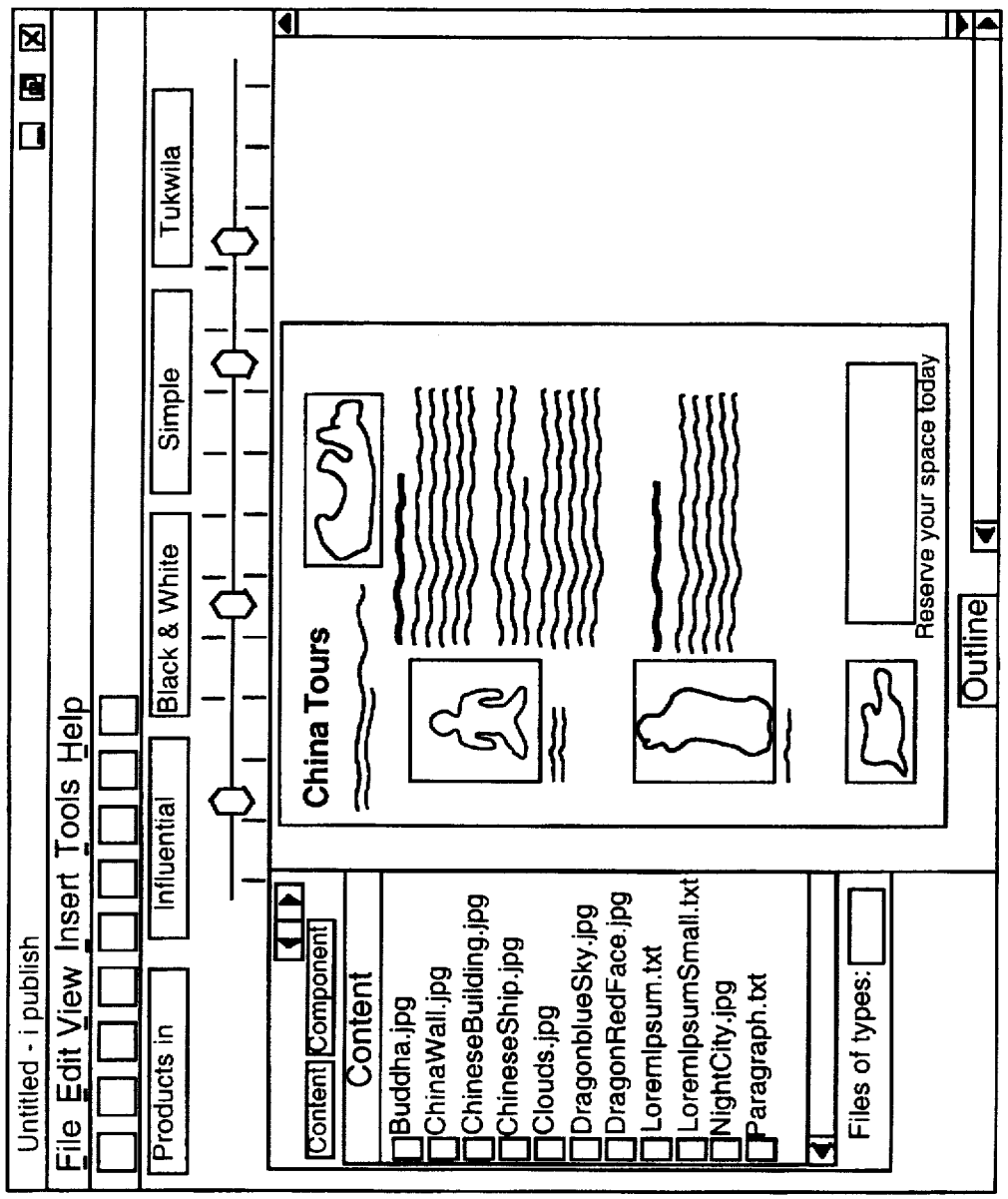
FIG. 1b is second example of a user interface for a travel brochure according to one embodiment of the present invention.
Figure 1C:
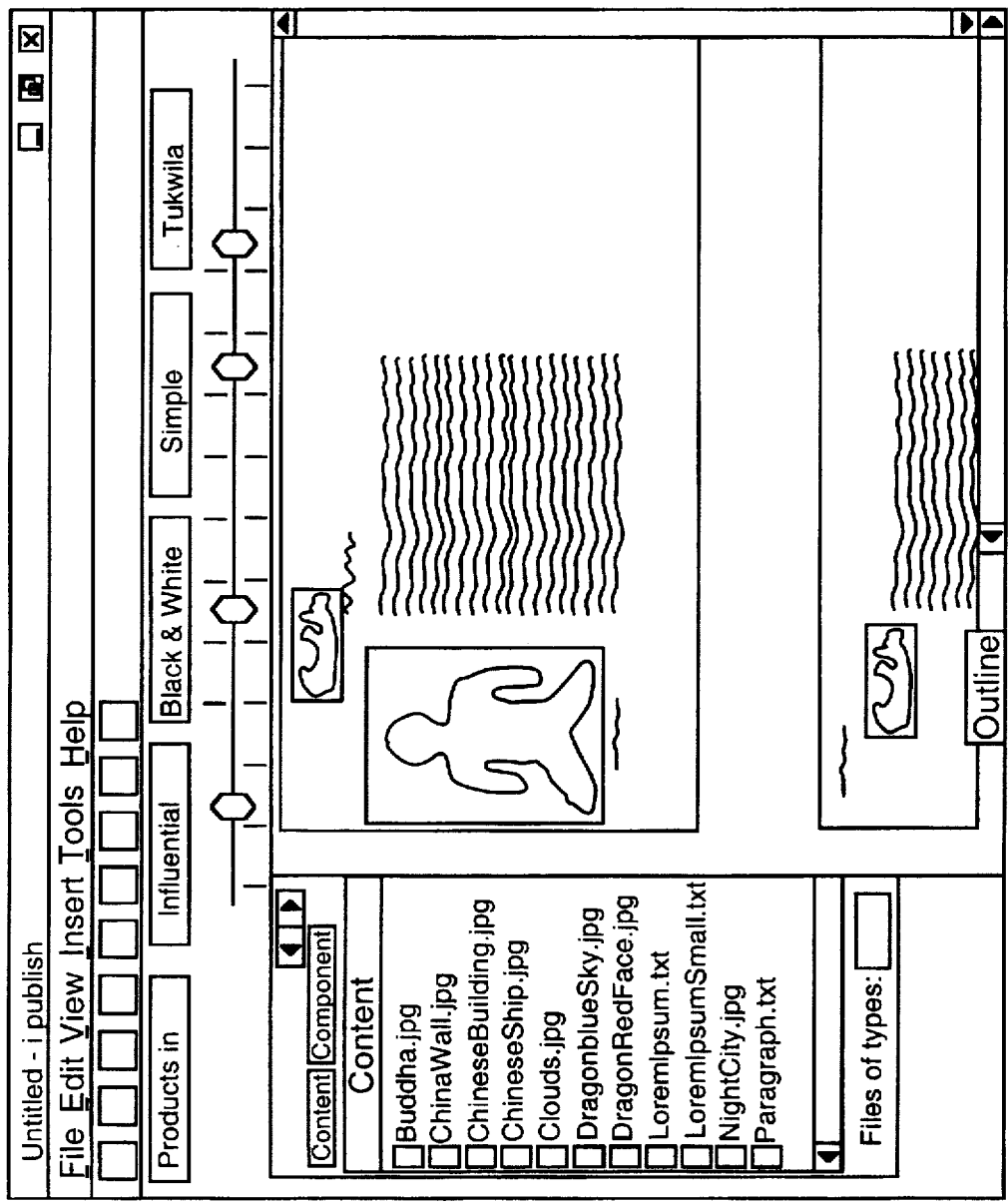
FIG. 1c is third example of a user interface for a travel brochure according to one embodiment of the present invention.
Figure 1D:
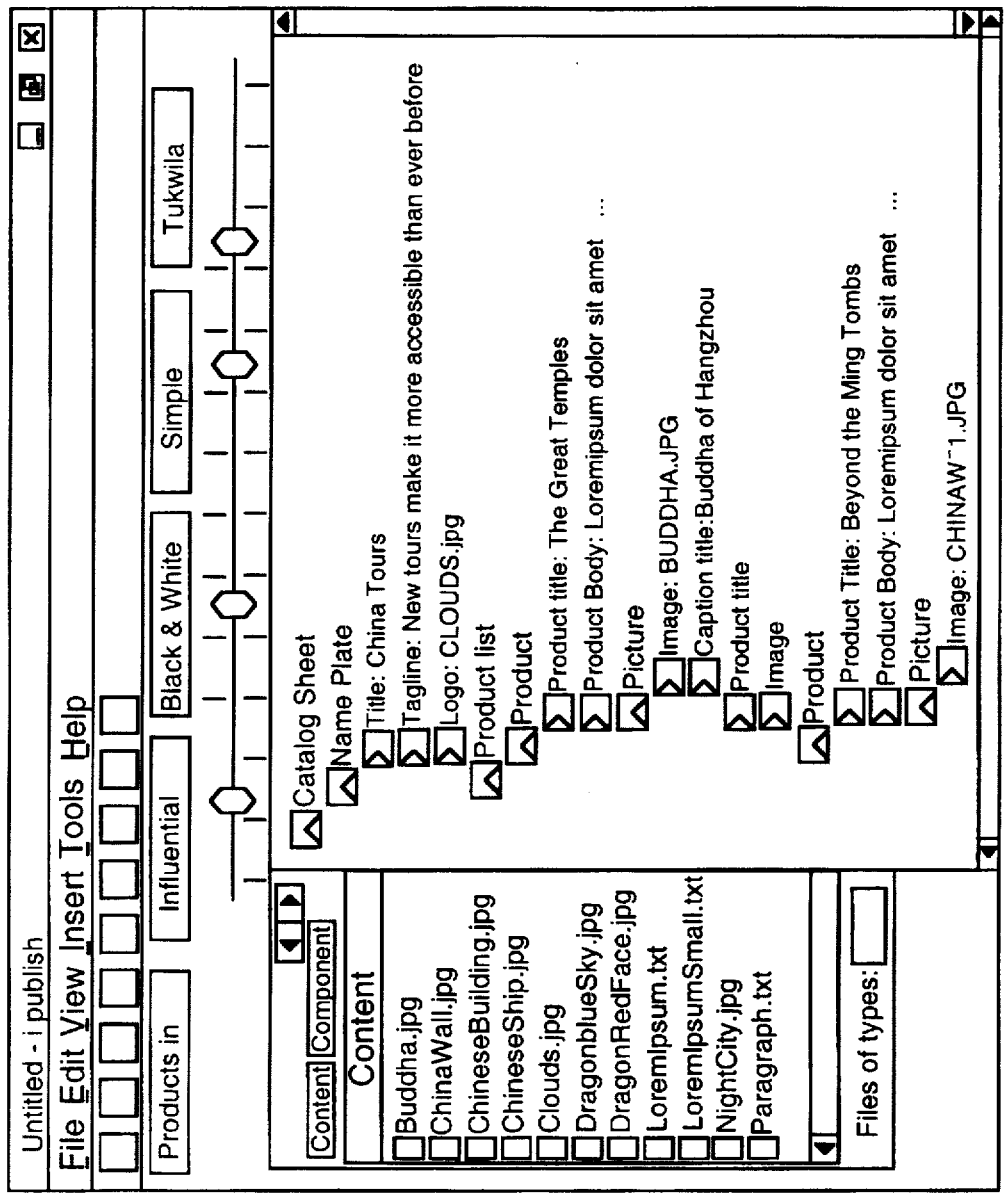
FIG. 1d is fourth example of a user interface for a travel brochure according to one embodiment of the present invention.

FIGS. 1a, 1b, 1c, and 1d show examples of a user interface 18 as it might appear in conjunction with a "China Tours" brochure. FIG. 1a shows a user interface 25 having a list of available content on its left-hand side, along with a one page "China Tours" brochure having two photographs/destinations and accompanying text. FIG. 1b shows a similar user interface 26 in which a third photograph/destination and accompanying text (currently blank) has been added to the bottom of the one page brochure. The layout has been adjusted to accommodate all three photographs and text on one page. FIG. 1c shows a similar user interface 27 showing in detail a different design for the "China Tours" brochure in which a small logo (from the top of the brochure of FIG. 1a) now appears next to each photograph in the brochure. In this figure, each photograph now appears on its own page, such as might be presented in a Web page format. FIG. 1d shows a variation of a user interface 28 having available content on the left-hand side, and also a listing on the right-hand side of the hierarchy of the design for the brochure, and the associated content for each design component.

FACETS TECHNOLOGY

As described in the above-referenced application "Method and System for Implementing Software Objects", the use of facets eliminates significant problems associated with multiple inheritance in object-oriented systems, such as brittle classes and derivation conflicts. These issues have prevented object-oriented programming from fulfilling the promised revolution of software productivity and code reuse. By using facets, however, programmers can easily create objects which do not depend on inheritance in native class libraries, yet still have access to all of the properties and behaviors of the native class objects. In other words, facets eliminate significant problems associated with inheritance in object-oriented systems.

Increased programmer efficiency and easier implementation of complex models are achieved through the use of facets by improved encapsulation and inheritance methods that permit the programmer to understand the properties and behavior of an object without requiring a complete understanding of the class library in which the object is based. Additionally, the use of facets avoids inheritance anomalies by specifying inheritance in accordance with a technique that permits a programmer to define an object without resorting to complex arbitration rules on inheritance hierarchies. Complex applications can be designed, compiled and understood by a programmer with the full benefits of object-oriented coding, including reusable code and single and multiple inheritance.

Specifically, the use of facets allows different properties of an object to be declaratively inherited from different parent objects. A set of properties within an object can be grouped together and treated as a specific aspect of the object. Such an aspect is referred to as a facet-type property subgroup of the object (or more simply as a "facet" of the object), and a facet can be inherited from different parent objects. Inheritance of a property within a facet may be based upon either an "Is-a" or a "Has-a" relationship. Property values inherited based upon an "Is-a" relationship are independent of the location of the object, and the parent of each facet is determined by declaration. Property values inherited based upon a "Has-a" relationship will derive from the parent object or objects in which the child object is placed.

An object may be placed in more than one container parent, with properties within each of the facets of the object being inherited from a different one of its parent containers. The parent from which each facet is inherited can be specified. Alternatively, when a child object is contained in multiple parents, each child object facet is inherited from the parent in which the child object is contained in a parent object facet having the same name as the child object facet. Individual properties within a facet can be declared as inherited or not inherited. The values of properties that are not inherited will be independent of the property values in the parent object. Thus, the properties that a child object inherits is controlled by the child object itself: by its place in a container object and by declaration in the child of which properties are inherited from the parent.

By specifying inheritance at the level of a facet and individual properties, a programmer can define an object to behave the way he or she wants; the properties and behavior of an object will not depend on arbitration rules operating on complex multiple inheritance hierarchies. A programmer can understand the properties and behavior of an object by looking at its declaration without having to understand the complete class library upon which it is based. Thus, the use of facets technology is preferred for one embodiment of the design engine, but is not required.

DOCUMENT COMPONENT FRAMEWORK

Figure 2:
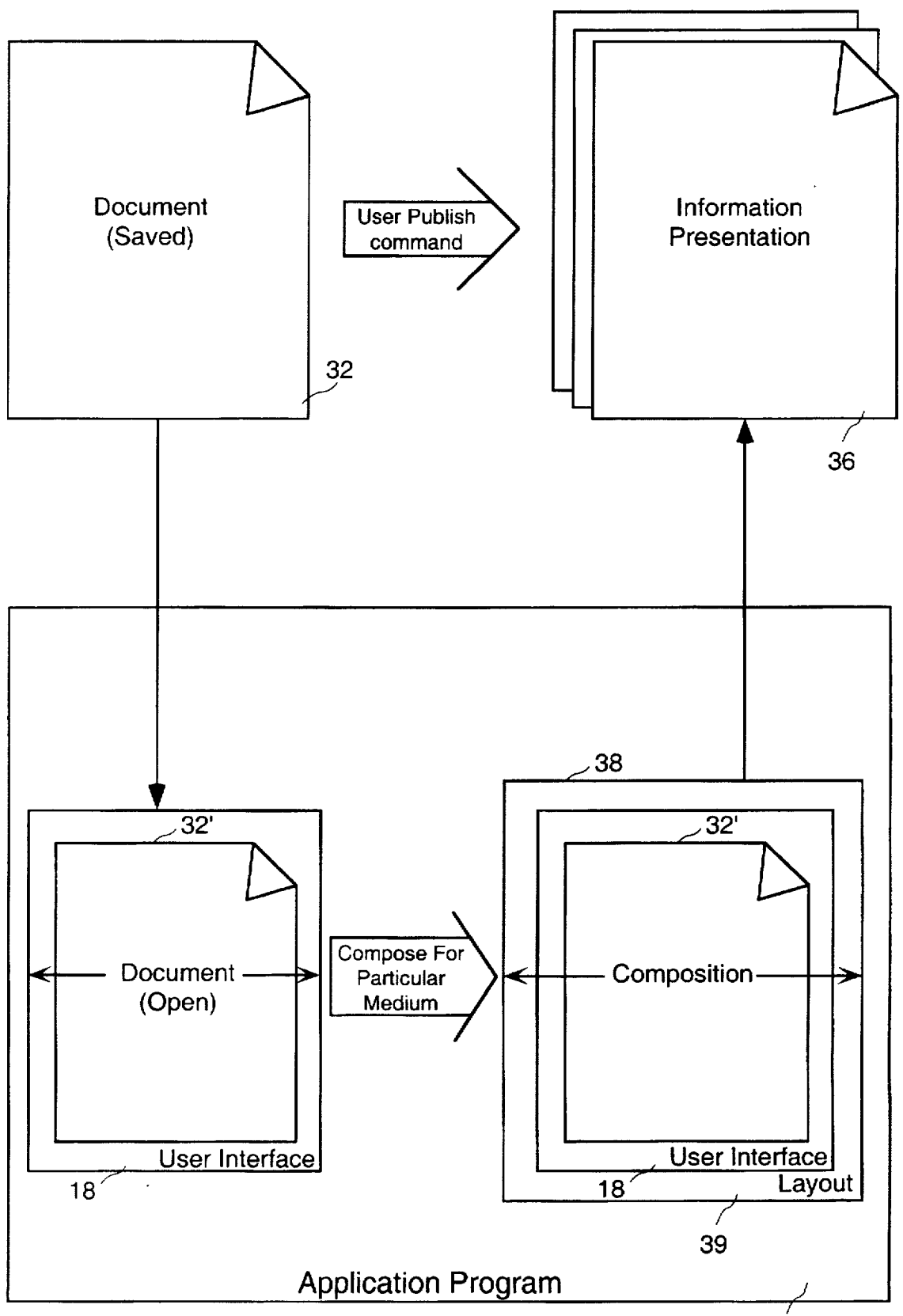
FIG. 2 illustrates an embodiment of the present invention in which a saved document is input and composed for a particular medium in order that it may be rendered in a particular information presentation.

Referring next to FIG. 2 the relationship between an application program 12, a document 32, a composition 38 and its information presentation 36 in accordance with one embodiment of the invention will be described in more detail. The document 32 represents information that has been saved by the user within a computer system to persistent storage. This document may include any combination of content elements, design descriptions and media specifications. Once the application program 12 is executing, the document 32 may be loaded into the application program as an open document 32' and may appear to the user through a user interface 18. Once the document 32' has been composed for a particular medium, it appears as a composition 38 having a particular layout 39. That is, composition 38 represents the document 32' in a particular layout/format (or style).

Once the application program 12 is directed by a user to render the composition (via a "publish" command or the like), the composition 38 is rendered to a particular medium in the form of an information presentation 36. This information presentation may appear initially in a form suitable for viewing on a computer screen. For example, if the presentation has been rendered for paper media, the user interface may show this paper media in a print preview format. Likewise, if the presentation has been rendered for a Web site, the user interface may show these Web pages on the computer screen for the user to view. The information presentation 36 represents the actual pages created by the application program for paper, HTML or any other medium.

One definition of terms suitable for understanding the present invention follows. The document component framework creates value ultimately by supporting the construction of information presentations. An information presentation is typically a materialization of information in a way that makes it accessible to a human being or an automated process. A presentation may be physical (e.g., a set of printed pages), ephemeral (e.g., an on-screen image), distributed (e.g., a hypermedia Web), abstract (e.g., a source code file), or in some other form. Also, a presentation may be static (e.g., printed pages) or dynamic (e.g., a stock ticker). In one embodiment of the present invention, a presentation may be a sequenced set of printed pages, a sequenced set of screen images able to be viewed from within a user interface, an OLE object embedding, or a single-rooted set of linked HTML pages.

A composition typically combines content, design and media in a usable form. In general, content is information substance, in forms such as communication-bearing text, images, symbols, data structures and other. Media, in general, is presentation space, in forms such as paper, sequenced computer screens, linked hypertext pages and other. A design is typically information presentation specifications, in forms such as definitions of allowable content and media combinations, and methods for rendering presentations of particular content to particular media. Thus, a composition may be viewed as a combination of compatible content, media, and design objects capable of producing a specific presentation of specific information in a specific form. In one embodiment of the present invention, design, media, and content are the primary facets of a composition. A composition typically results from a request to render a media-specific presentation of an open document. The present invention is able to elaborate the document structure as necessary to compute fully explicit layout and drawing information.

A composition may be viewed in different ways. In one aspect, the persistent, storable form of a composition is referred to as a document. A document may be stored in many forms. By way of example, a document may be a computer file (or other long-lived object) designed to serve as the basis for a composition. The concepts of a composition and a document are closely related. However, while a composition—a specific configuration from which a presentation is rendered—may fully specify target media and an explicit layout, a document is likely to leave these properties unresolved so as to support different user choices at different times. A document object may support presentations to a wide variety of supported media; this generally corresponds to the user's notion of an identifiable publication. The fully resolved nature of a composition, on the other hand, makes it a more convenient reference point for understanding the structure of the component framework. In other words, a document is typically a persistent object that may support multiple media, while a composition typically represents a single media presentation.

CONTENT, MEDIA, DESIGN FACETS

As suggested in the preceding sections, in one embodiment of the present invention the document component framework's modeling strategy involves factoring a composition into independent content, media, and design facets. This approach has many advantages: it is simple to grasp and promises powerful capabilities, such as one-step experimentation with design changes, easy repurposing of content for different media, and the ability to save design representations that are far more adaptable than traditional templates. Each of these facets may have its own hierarchical structure, and the hierarchies may not necessarily coincide.

Thus, because information may be viewed in many instances as content, media and design, there are various advantages to representing a composition by a content facet, a media facet and a design facet. These advantages are further discussed below, along with a more detailed explanation of the content, media and design facets.

The content facet of a composition may be considered to be the communication substance it contains in forms such as text, images, and symbols that may, at least in principle, be broken away from other factors as pure information. In a passage of body text, the words generally function as content, but the typeface generally does not. Particularly in the case of text (and other elements "attached" to text), content has an inherent structure that interacts with, but is not determined by, the structure of media (presentation space) or design. In a magazine article, for example, title, headings, body passages, illustrations and other elements form a hierarchical structure that may collide unpredictably with other structures such as page and column breaks. Thus, it makes sense to separate this pure content from the artificial constrictions of a page break in paper media, for example.

Additionally, in any document, content and other presentation features must be coordinated across a hierarchy of scales from individual text characters and image pixels up to the entire document, or even a series or family of documents. At all levels of scale, recognizable features exist that have some independence from a specific document or document type. One example might be an array of illustrations containing titles, images, and captions in a particular relationship. Such a structure could be reused across catalogs, reports, newsletters, and other documents keeping the same relationship, but the specific formatting of each element would likely change according to context. In this example, an entire hierarchy of features and relationships is preserved from one medium to another, but its presentation is interpreted differently in different settings. This is characteristic of situations involving the reuse of document elements.

Thus, separation of content from media allows reuse of the content in different media while preserving relationships.

The media facet of a composition is structured hierarchically by the allocation of presentation space (or regions) to the different features (or content elements) of a composition. This allows layout and locality concerns to be separated from design and rendering concerns, and recognizes the fact, noted above, that the hierarchical structure of presentation space is distinct from the structure of content. In this interpretation, subordinate parts of a composition are associated with their own media objects, which are combined, perhaps in multiple levels of aggregation, to form the composition-level media facet. In the simplest cases, this reduces to a facet-oriented terminology for layout in which each page (presentation space) is divided into regions which are assigned to the various parts of a composition.

In any chosen presentation space, any assemblage of content may be rendered in an unlimited variety of ways, but a particular composition is rendered in a specific way. Everything about a composition that defines its specific renderings, among all those possible for its content, is considered to make up that composition's design facet. Thus, the framework interprets design not only as "style", in the sense of rendering choices made "at the last minute" in a superficial way, but as the controlling factor for the whole logical construction of a document and the compositions it supports.

Like content and media, a composition's design may exhibit a hierarchical structure, with recognizable parts ranging from the primitive presentation styles of text and graphic content elements, up through the organizational and presentation modes of intermediate structures, to the overall structure and appearance of the entire composition. At all but the lowest level of this hierarchy, design is expressed by assembling components of a more primitive nature and making associations with content and media. The use of components will now be discussed in more detail.

COMPONENT ARCHITECTURE

A variety of object-oriented programming techniques may be used to implement the present invention. By way of example, techniques such as the class-instance model, the object programming model and the object prototype model may be used. In a preferred embodiment, the notion of specialization in the component framework is based upon object-prototype relationships, rather than class-instance relationships. Also, in addition to derivation-based inheritance, in which an object inherits property bindings from the prototype object on which it is based, the component framework relies upon containment-based inheritance as developed in systems such as Apple Computer's Hypercard and Asymetrix's ToolBook. In containment-based inheritance, an object inherits property bindings from a container or owner object.

The fundamental abstraction supporting the framework is the component. In the problem domain view a component is a coherent entity within a document or composition that can be independently created and destroyed, inserted and removed, and/or changed in state; the entire document or composition is considered to be such a component. And in the software architecture view a component is a software object representing such an entity as a node within a composition's content, media, and design hierarchies.

The most typical component is a straightforward document part such as a paragraph, list, illustration, or article. In order to serve as the common prototype for all framework objects, however, the component concept is generalized to cover encapsulated content objects (trivial media and design facets), encapsulated media (trivial content and design), document and component "blanks" on a palette (place holder content), and entire documents and compositions (no container in the design hierarchy). The component prototype thus provides the common representation that brings entire documents and compositions, intermediate-level objects, primitive content elements, and media into a single, interconnected structure.

Components may reside simultaneously in several independent hierarchies and therefore in several different container objects. For instance, the descriptive text body in a catalog item resides simultaneously within a text file (content), within one or more regions of one or more pages (media), and within a catalog item (design). The three facet-specific containment contexts, together with derivation from a prototype object, define a total of four object relationships that help determine a component's property bindings and thus its state as a software object.

This view of a component implies that the attributes of a composition's content, media, and design facets are distributed across the states of component objects. The architecture of the framework also preserves the converse property: the attributes of a component are partitioned into component-level content, media, and design facets that reside within the more encompassing facets of the entire composition. A more detailed illustration of the different facets of a component will be discussed below with reference to FIGS. 5a, 5b, 6 and 7. Thus, the various facets of components not only exhibit different structures (such as a content tree, a media tree and a design tree), but they also can be represented using independent sets of properties (state variables).

Figure 4A:
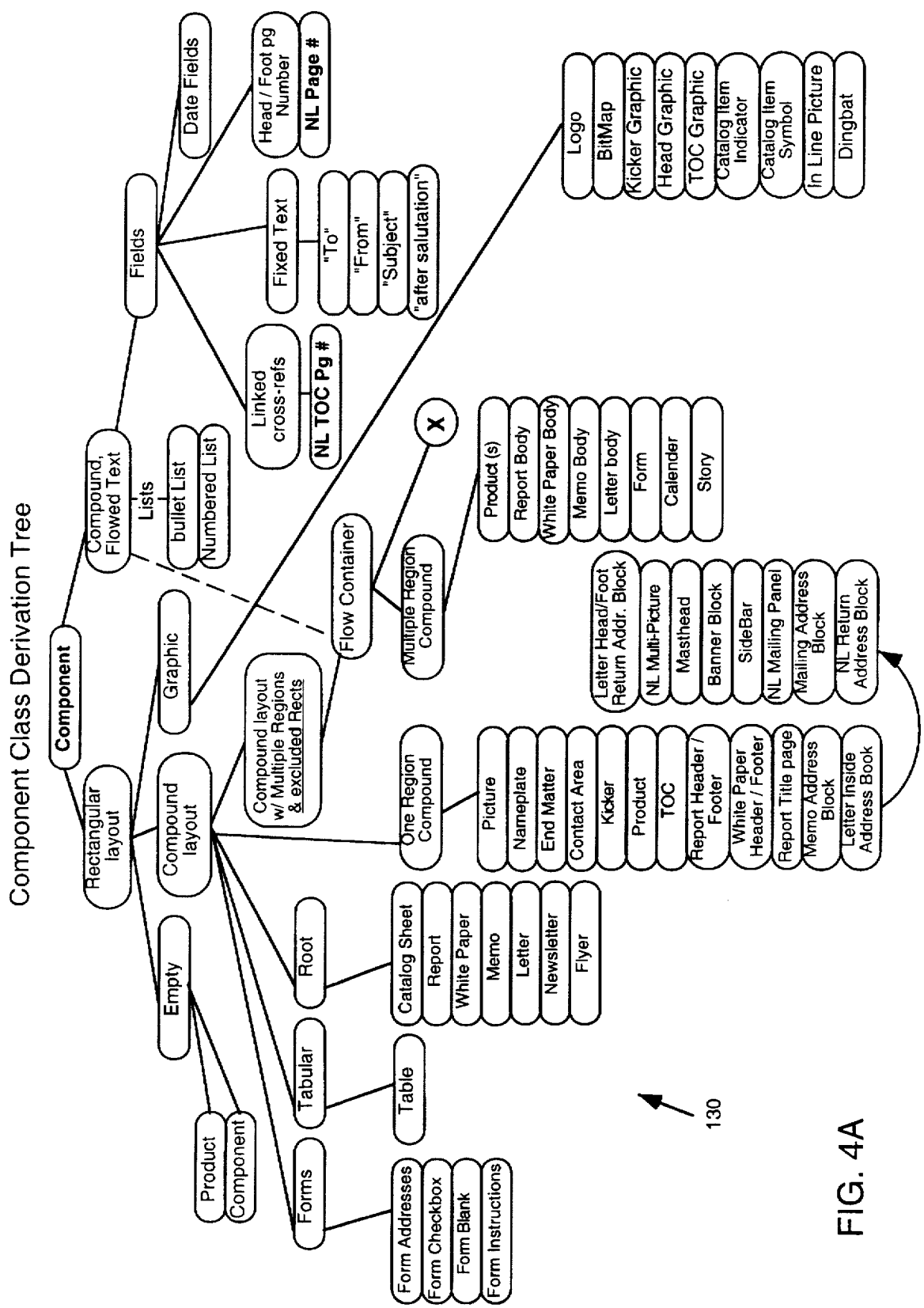
FIG. 4 illustrates examples of possible design components in a component class derivation tree according to one embodiment of the present invention.
Figure 4B:
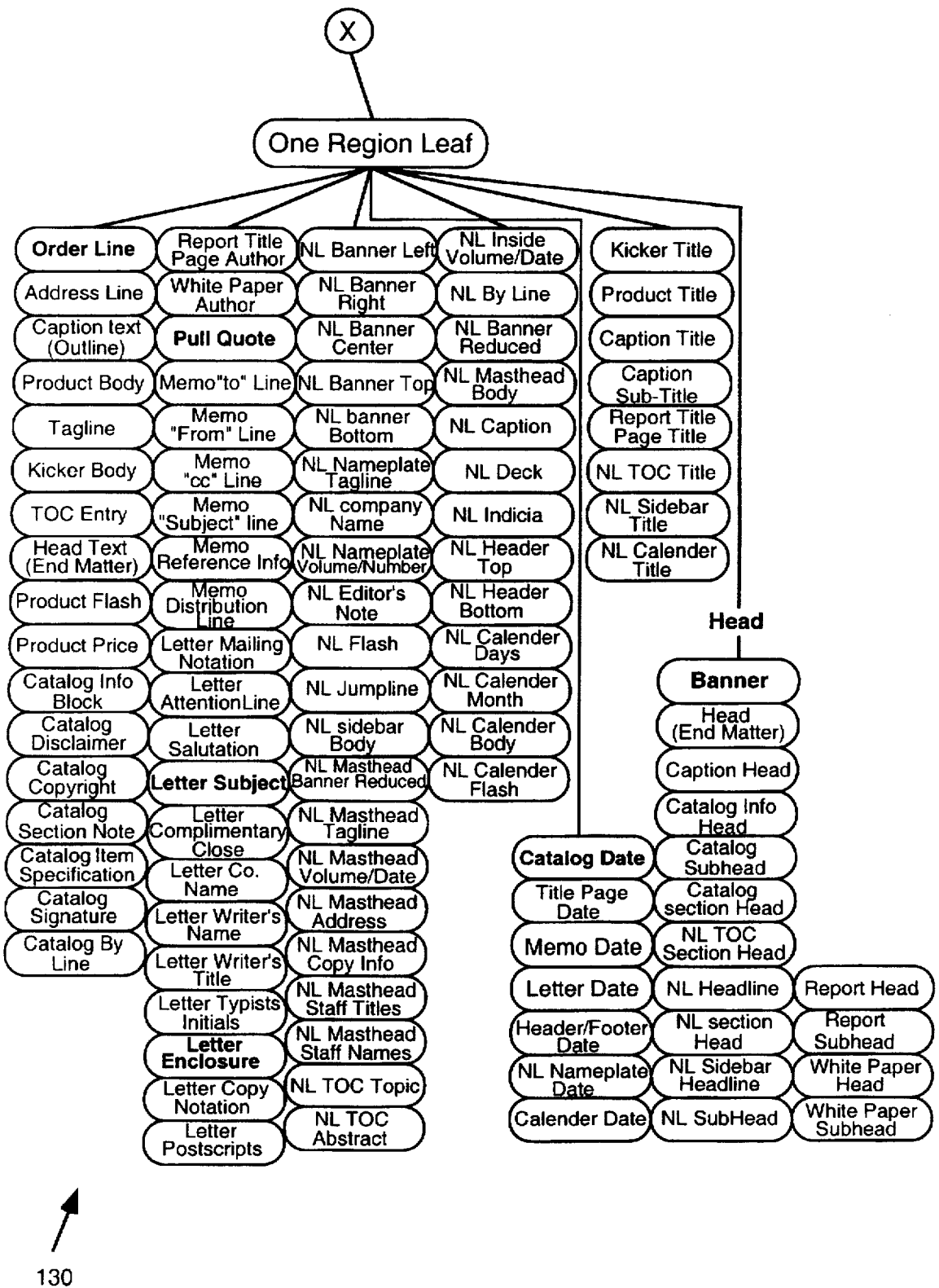

An example of the many possible types of design components is shown in FIG. 4. FIG. 4 at 130 shows a component class derivation tree that includes many of the common types of design components that may be used in a design by the user or that may be used in a standard design in the design catalogue of the system. For example, beneath the base component "tabular", is the leaf component "table". A user may include this component "table" within a design if the user wishes to place a table at a particular point in the document. Typically, a user uses the leaf components to arrange a particular design; alternatively, a standard design from the system catalogue will use these leaf components to build up a particular design. When creating a custom design, the user may select from these components through the user interface in order to create the new design. Additionally, the user may select a standard design including components that are pre-arranged from a system design catalogue.

Included with each component is knowledge about how that component may be rendered in a particular media. For example, for rendering to HTML, macros may be used for the HTML elements in rendering to a particular geometry. A further discussion is included below with reference to FIGS. 12a–12c.

Returning now to a discussion of components in general, other types of prototype components will now be described. Derived from the component prototype are three other kinds of prototypes that support the separated representation of content, media, and design. These other prototypes are content objects, media objects and design objects and are all types of components.

Content objects combine content encapsulations with unbound media facets and unspecified design facets. Content can be encapsulated either as a link to an external object, or as an embedding. Built-in content encapsulations represent both free-standing objects, such as text files, and nested sub objects, such as the sections and paragraphs of text files. Because a content object is a component, though a lopsided one in terms of facets, it can also participate in containment inheritance by being specified as the content facet container (parent) for an application-level component.

Media objects combine media object encapsulations with unbound content facets and unspecified design facets. Built-in media encapsulations represent both free-standing objects, such as printed documents, and nested sub objects, such as the individual page regions associated with components of printed documents. Because a media object is a component, though a lopsided one in terms of facets, it can also participate in containment inheritance by being specified as the media facet container (parent) for an application-level component.

Design objects implement specific styles for presenting compatible content to supported media. A design is considered to be a document shell, or just shell, if its instantiations are thought of primarily as free-standing documents that do not require a container context. This is a soft distinction, since most document shells may also be constructed inside a containing document. A design is considered to be a component format, or just format, if its instantiations are thought of primarily as subcomponents of larger documents. Sometimes this is a soft distinction, since some component formats may also be constructed as free-standing documents.

In one embodiment of the content, media and design triad of facets, design has a separate but somewhat more than equal status, at least from the point of view of a design-centric framework application. This is reflected in one possible interpretation of design facet containment as the logical component structure of a composition, and in a preferred technique of deriving application component instances from design prototypes. Thus, in this embodiment, a component that has non-trivial bindings for all three facets is a specialization of some built-in design type, as well as typically being contained in another component via the design facet (logical structure). In the content and media facets, only the containment relationship is available. This accounts for the extra indirection needed to reach "specific" content and media objects from document components—an extra level of containment is being used to provide a derivation path for the content and media representations. This can be though of as asserting that the component instance is contained in its "own" content and media facets.

Figure 6:
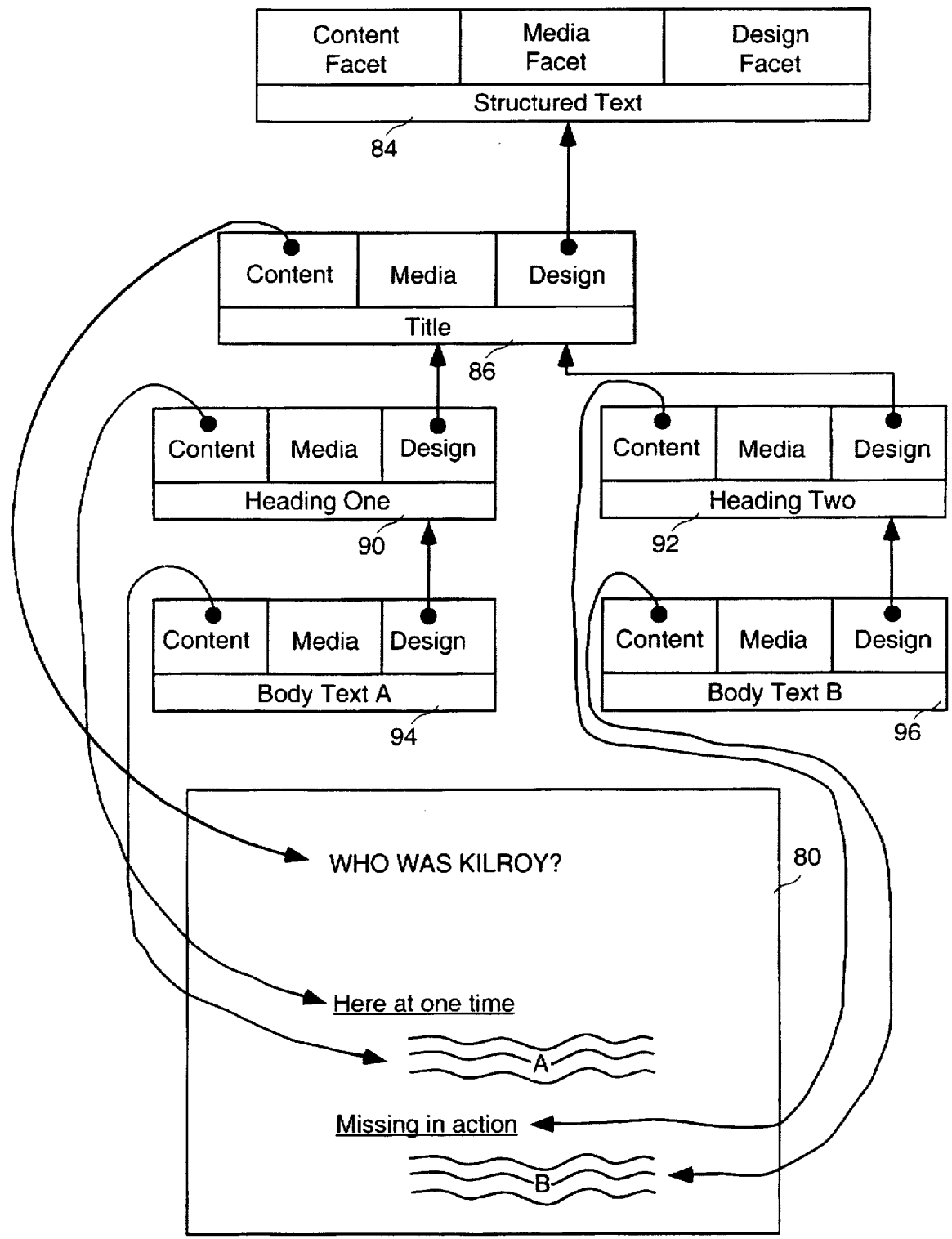
FIG. 6 illustrates an example of how structured text may be represented in one embodiment of the present invention by using content, design and media facets.
Figure 6A:
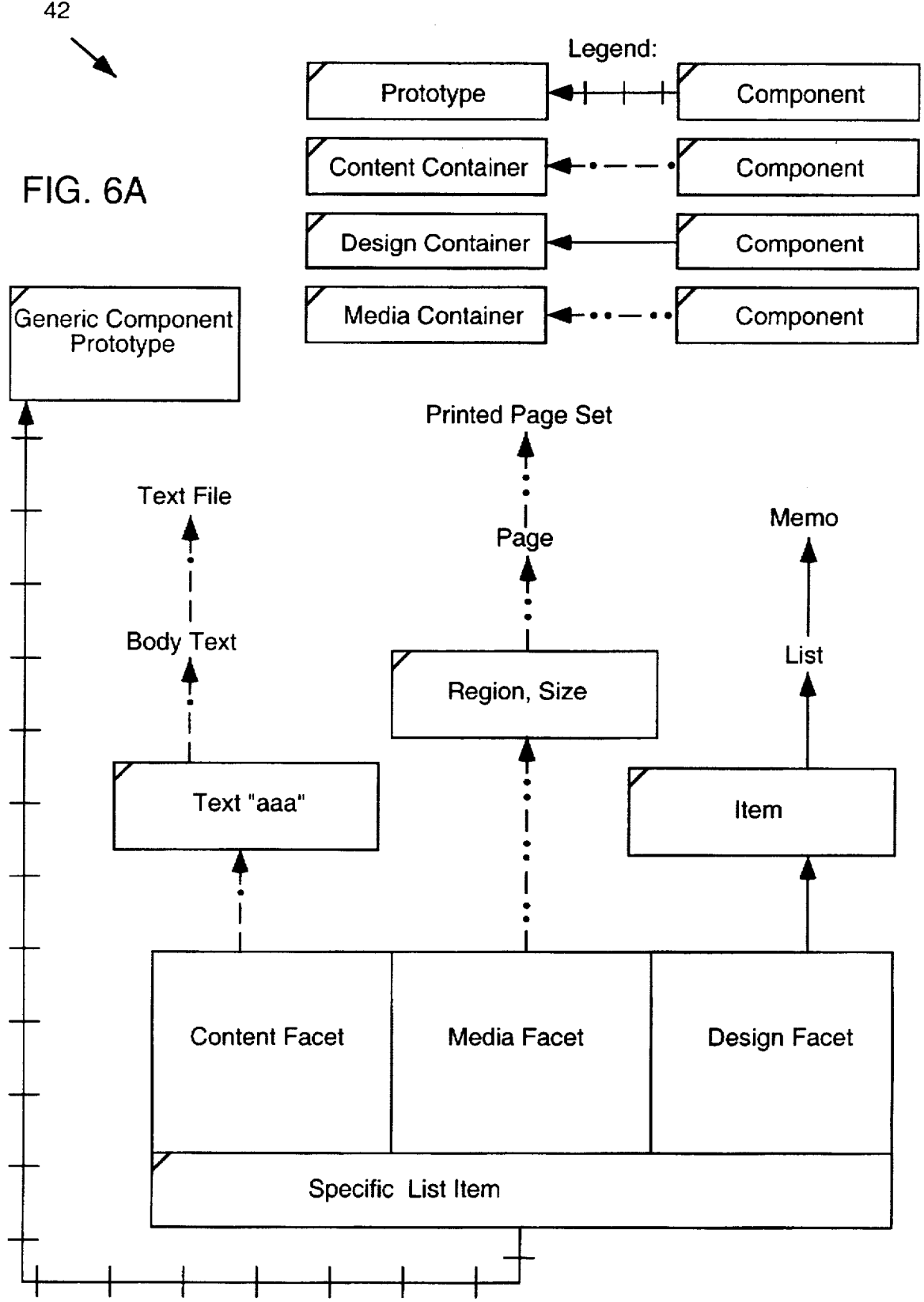
FIG. 6a illustrates another example of how a list item of a memo may be represented in one embodiment of the present invention by using content, design and media facets in a containment relationship.

An example 42 illustrating this containment is shown in FIG. 6a. This is an example of a memorandum that has only a list with a number of list items. The component "Specific List Item" represents one item from that list, and is contained in each of a content, media, and design hierarchy. Also, this "Specific List Item" component is a specialization of a Generic Component Prototype. The content facet of "Specific List Item" shows the text "aaa" of the item is contained within Body Text, which in turn is contained in a Text File. The media facet of "Specific List Item" shows the specific item is contained within a particular Region (having a Size), that in turn is contained in a Page, which is contained in a Printed Page Set. The design facet of "Specific List Item" shows how the specific item is contained within a List, which in turn is contained in a Memo.

CONTENT, DESIGN, MEDIA TREE EXAMPLES

Figure 5A:
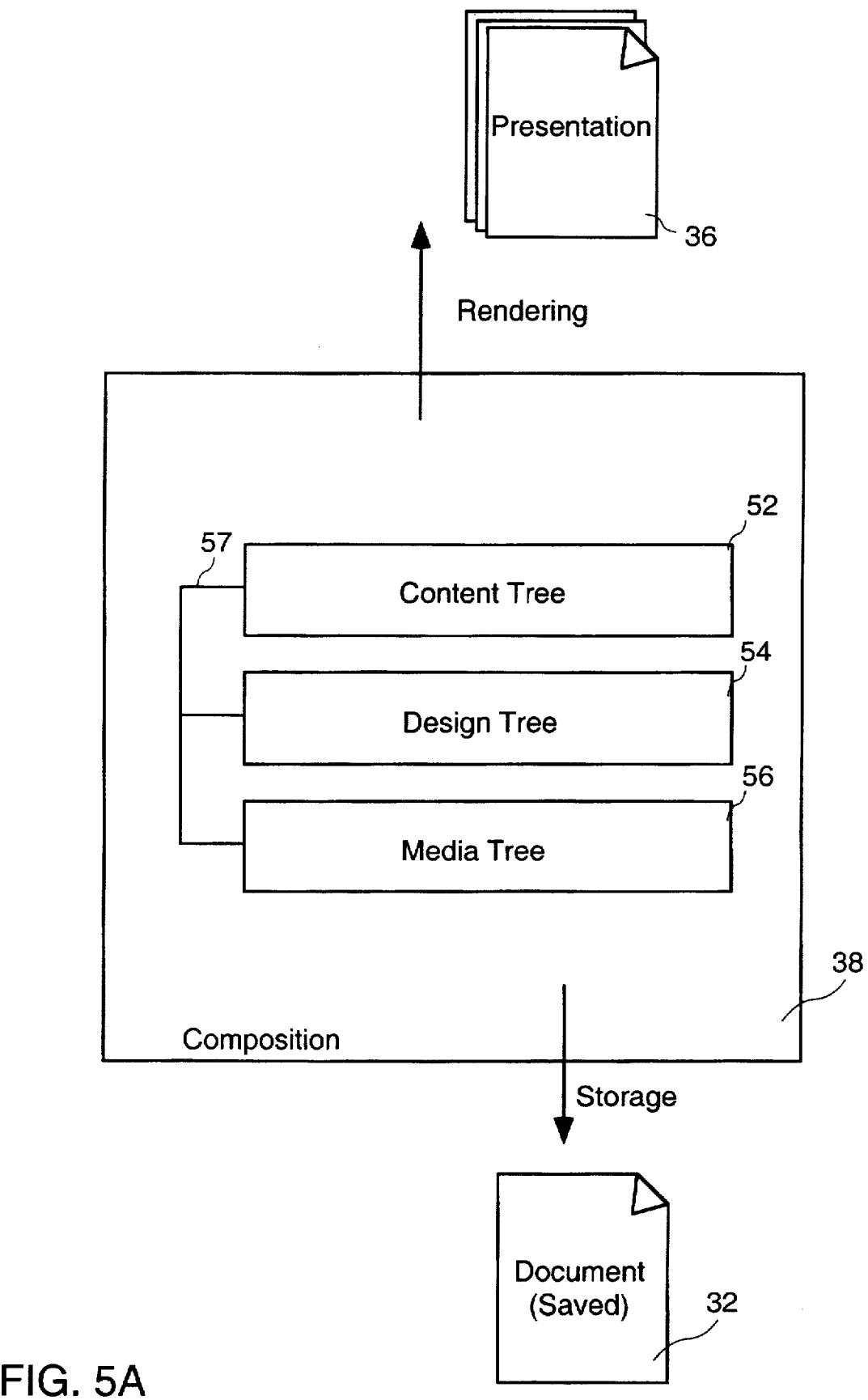
FIG. 5a illustrates symbolically the internal structure of a composition in an embodiment of the present invention in which the composition is represented by a content facet tree, a media facet tree and a design facet tree.
Figure 5B:
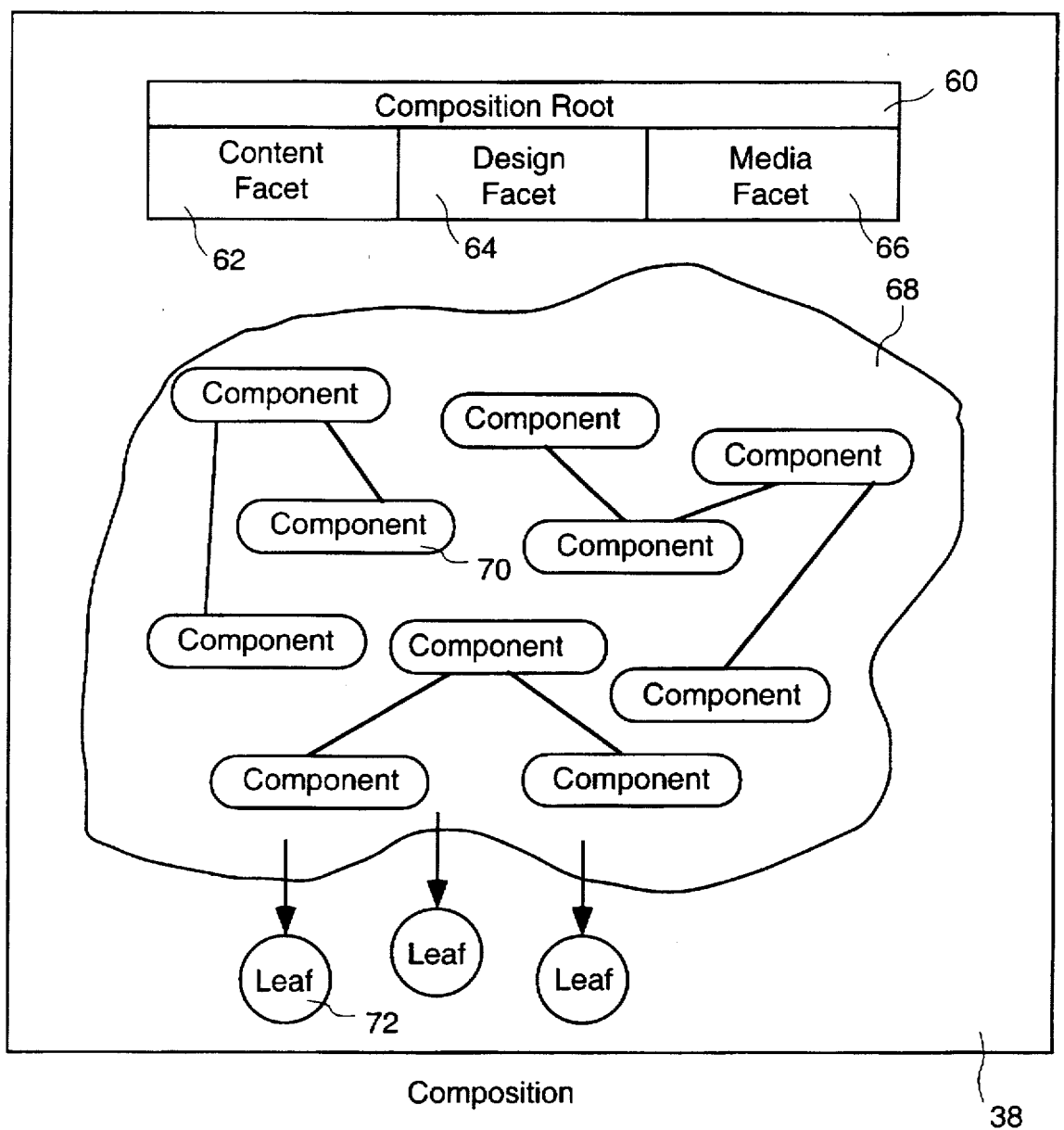

As discussed above, because information may be viewed by content, design and media aspects, it is helpful to represent this information in a content tree, a design tree and a media tree within a composition as shown in FIGS. 5a and 5b. FIGS. 5a and 5b diagrammatically illustrate the relationship between a composition, the content, design and media trees, and components. FIG. 6 below provides a particular example of a representation of text using components having a content, design and media facet.

FIG. 5a shows in more detail a composition 38 from FIG. 2. The composition 38 may be stored as a saved document 32 in a computer system, or the composition may be rendered to a particular medium in the form of an information presentation 36. The information contained within the composition 38 may be divided up in a variety of manners. Preferably, the composition is represented in the form of a content tree 52, a design tree 54, and a media tree 56. These trees are preferably linked in some fashion 57 as will be explained in greater detail below. These content, design and media trees may be based upon any suitable object-oriented technology as discussed above, although the use of the facet technology as described above is preferable.

This composition 38 of FIG. 5a is shown in more detail in FIG. 5b. FIG. 5b illustrates how, within a composition 38, the content, design and media facet trees may be represented in a general sense. In one embodiment, a composition root object 60 serves as the root for each of the content facet tree 62, the design fact tree 64, and the media facet tree 66. Each of these trees has an independent but possibly overlapping hierarchy of child components, such as component 70, within an intermediate set of components 68. That is, these three trees may follow different paths through the set of components 68. In other words, an individual component 70 may be unique to only one of the three trees, may be shared between two of the trees, or may be common to all of the trees. Leaf nodes such as leaf 72, are typically common to each of the three trees and contain such information as actual content elements and coordinates for the layout of the content in a particular media. In a preferred embodiment, the composition root object and the leaves are common to all three trees. In other embodiments, most or all components may appear in each of the three trees.

Each element of the composition such as an image pixel, a character, a graphic symbol, a word, and up to and including the whole document, may be associated with a component. Typically, a component of large granularity is created by a user action, such as a user dropping a paragraph of text onto a composition. This paragraph would be represented at first by a paragraph component. This paragraph component may be fragmented as needed in order to fit content to a layout. For example, each line of the paragraph may be represented as a subcomponent. The fragmentation process is also quite dynamic. For example, fitting a paragraph involves trying and discarding many possible fragmentations, and this fitting may be redone after each significant user action. Editing may also create new subcomponents by creating attribute changes or by forcing a refit. For example, if a middle portion of a line of text is selected to appear in italics, then the line of text would be fragmented into three subcomponents. The newly italicized portion of the line would be one subcomponent, while the portions before and after it would be the other two components.

In one embodiment of the present invention, each component has a content facet, a design facet, and a media facet. Although, a facet for a particular component may be unused, as in the case of a media facet tree component that is located between two nodes of the design facet tree but not actually in the design facet tree. In this example, the design facet of this media component may be unused because there is no link to the design facet tree.

FIG. 6 illustrates how a piece of structured text 80 may be represented using an embodiment of the content, design, and media facet trees of the present invention. The structured text shown at 80 has a title "WHO WAS KILROY?", a first heading "Here at One Time", and a second heading "Missing in Action". The first heading also has a body of text A and the second heading has a body of text B.

This structured text 80 may be represented using the content and design facets of components as follows. In this example, the root object for this structured text is the Structured Text component 84. This component 84 may also have a link (not shown) to a container Document. The design tree representation for this structured text 80 may be determined by following the design facet links from Structured Text component 84 on down the hierarchy of design facet links. For example, Structured Text component 84 contains (by way of a design facet link) Title component 86. Title component 86, however, contains both a Heading One component 90 and a Heading Two component 92 by way of their respective design facet links. In turn, Heading One component 90 contains Body Text A component 94, and Heading Two component 92 contains Body Text B component 96. Thus, it can be seen how the design tree for a particular composition is represented by links formed through the design facet of the various components in the composition.

Likewise, the content tree representation of the structured text 80 may be determined by following content facet links from each component. The Title component 86 has a content facet link to the title of the structured text 80, namely "WHO WAS KILROY?". The component Heading One 90 has a content facet link to the first heading "Here at One Time". Similarly, each of the other headings, and body text has a content facet link pointing to the particular content represented by that component. The link from a component to another component or from a component to content may be formed in any suitable fashion. Which inheritance links are used in a given tree structure is determined by part of the object definition for each component on a per-property basis. These properties of a component are divided up and inherited via different paths. As described above, the concept of facets introduces the notion by which the properties of a component are partitioned such that the different facets of that component participate in the three different containment hierarchies, namely the content facet tree, the design facet tree and the media facet tree. Using the concepts of facets is preferred because of improved correspondence with document reality.

Although not shown in FIG. 6, these components are also linked via their media facets. The media facet of a component, such as Title 86, contains properties including the positioning of the title and its dimensions. It is possible that there may be other components within a composition that participate only in the media facet tree via their media facets, and are not part of either the content nor design facet trees. Likewise, there may be components that participate in each of the content, design and media trees through their respective content, design and media facets. Further examples showing a media facet tree for a composition are described below.

FIG. 7 is an example of a footer component 120 showing in detail its content, design and media facets. The footer component 120 may have any number of properties defined upon it or that it has inherited through a hierarchy of components. By way of example, selected properties associated with the content facet, design facet and media facet are shown for this footer component. It should be appreciated that many other types of properties may be associated with each of these facets, and other properties may be defined upon the footer component that are not associated with any of the facets.

In this example of FIG. 7, the content facet contains a property named Text which has as a value a pointer to a text string containing the text for the footer. The design facet for this footer component includes the properties Text Face, Text Attribute, Justification and Relative Size. Example values corresponding to these properties are shown in FIG. 7. The media facet for this component includes the properties X Position, Y Position, Width and Height, which help to define the geographical region on a page where this footer may appear. These geographical properties may in general be relative to media facet containers. For example, coordinates may be relative to a particular containing region. That is, which particular page a region appears on may be determined by searching up the media facet links until a Page component is encountered.

It should be appreciated that many other different kinds of properties may be present within a media facet to help define the extent of the component and to locate the component within the content rendering space for a particular medium. By way of example, properties such as color, texture, and percent transparency of the media surface may be associated with a media facet. A discussion of the extent of a component is detailed below with reference to FIG. 34 at step 758.

BROCHURE COMPOSITION EXAMPLE

FIGS. 8 through 12c below provide an example of a brochure that may be created and rearranged in various embodiments of the present invention. Examples of possible content, design and media trees to represent this brochure composition follow in FIGS. 13 through 18. FIGS. 19 through 28e provide further examples of uses of the present invention and its features, while FIGS. 29 through 38 describe procedures for implementing embodiments of the present invention.

Figure 8:
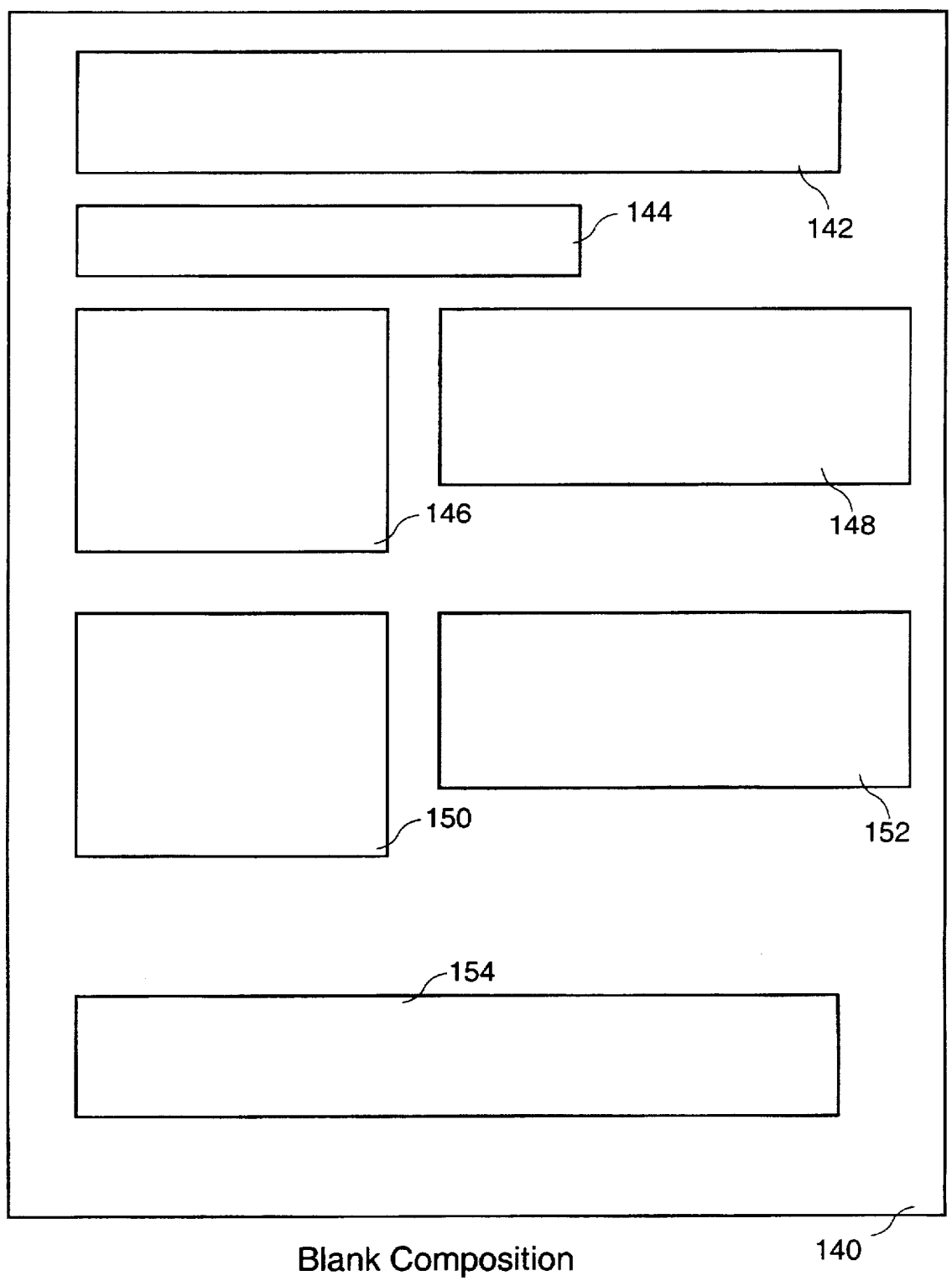
FIG. 8 illustrates an example blank brochure composition rendered for paper media.

An example of a blank composition that has been created by loading a standard design from a system design catalogue is shown in FIG. 8. A blank (or empty) composition is one for which a design exists, but no content has been added. This blank composition 140 includes a nameplate 142 and a title 144. Also included are images 146 and 150 each with corresponding text areas 148 and 152. A footer 154 is located at the bottom of the blank composition 140. These elements of the blank composition are represented in the design tree for the composition by corresponding components for which no content has as of yet been associated. At this point in the process of creating a composition, the user may wish to drag and drop content onto various portions of the screen in order to create a more elaborate composition. Alternatively, the user may rearrange the design shown in order to create a custom design.

Figure 9:
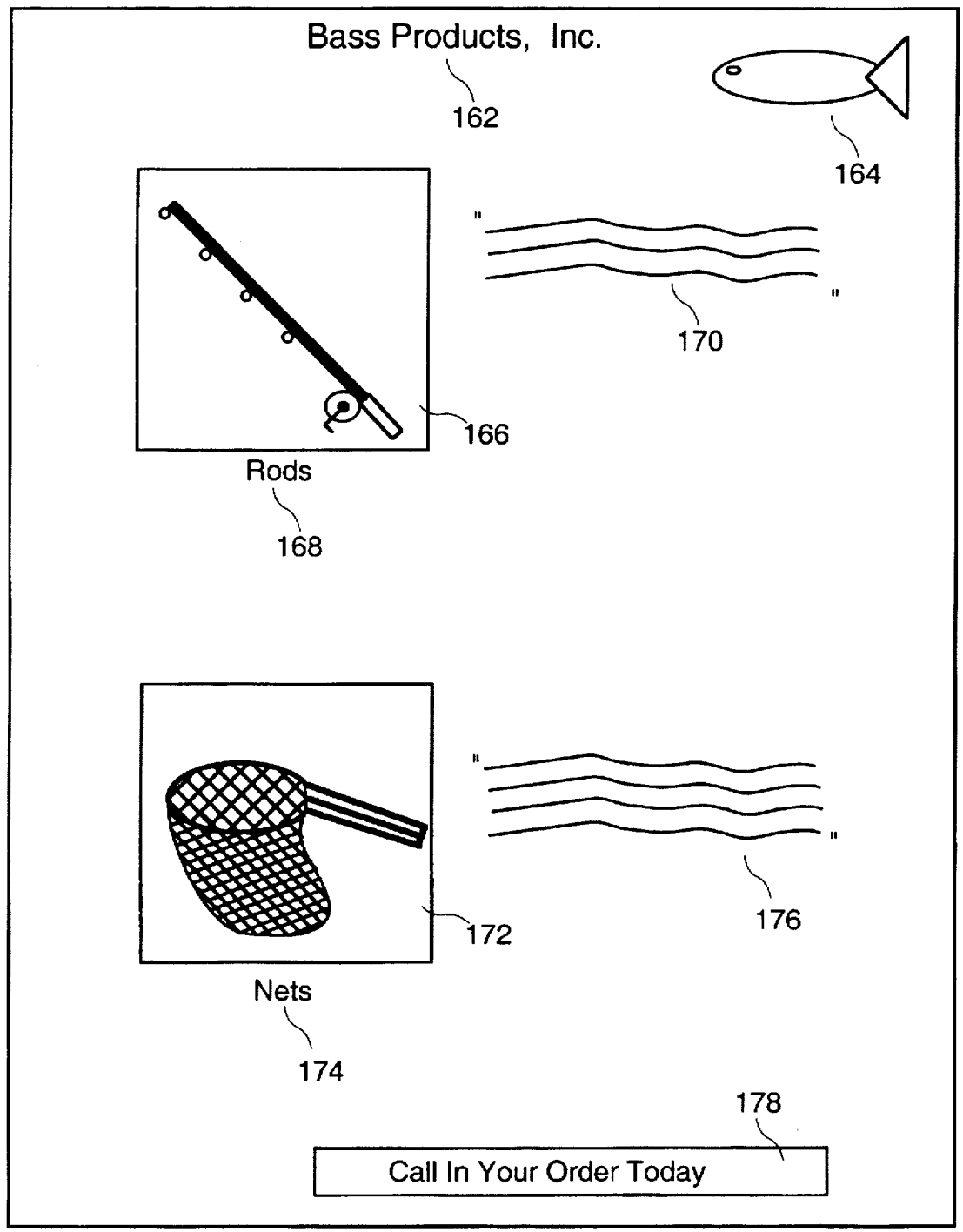
FIG. 9 shows an example brochure having two products that is rendered for paper media.

An example of a design that has been filled in by the user is shown in FIG. 9. This document design specifies a paper page media fixed at one page in length. A user may have added content to this design by dragging and dropping text and images from various sources. Alternatively, a user may also perform editing of the content directly in the composition through the user interface. FIG. 9 shows a brochure composition 160 that might be used in the mail order business for fishing supplies. The brochure composition 160 has a title "Bass Products, Inc." 162, a fish logo 164, two products and a footer. The first product has a picture of a rod 166, a caption "Rod" 168, and product text 170. The second product has a picture of a net 172, a caption "Nets" 174, and product text 176. A footer "Call In Your Order Today" 178 is located at the bottom of the composition. In this example, this brochure composition has been rendered for a single page of paper media.

Figure 10:
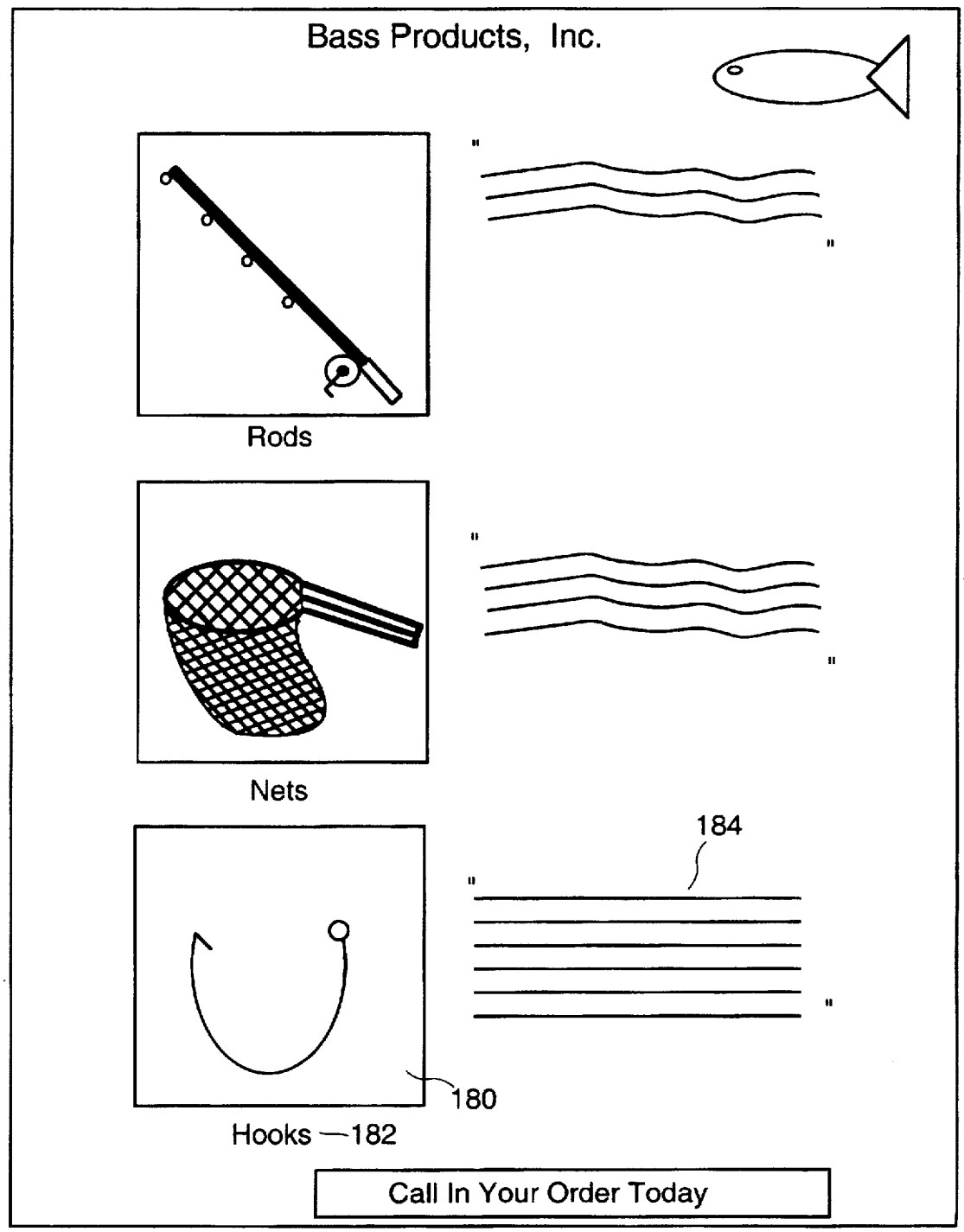
FIG. 10 shows the brochure of FIG. 9 to which another product has been added.

FIG. 10 shows the result after the user has added new content in the form of a new product to the brochure composition 160'. In this example, the user has dragged and dropped a new product towards the bottom of the brochure composition of FIG. 9 and a method of the present invention has automatically reformatted and placed the new product along with the existing products onto the single page of paper media. As shown in FIG. 10, a new picture of a hook 180, a caption "Hooks" 182, along with product text 184 have been added to this composition.

Figure 11:
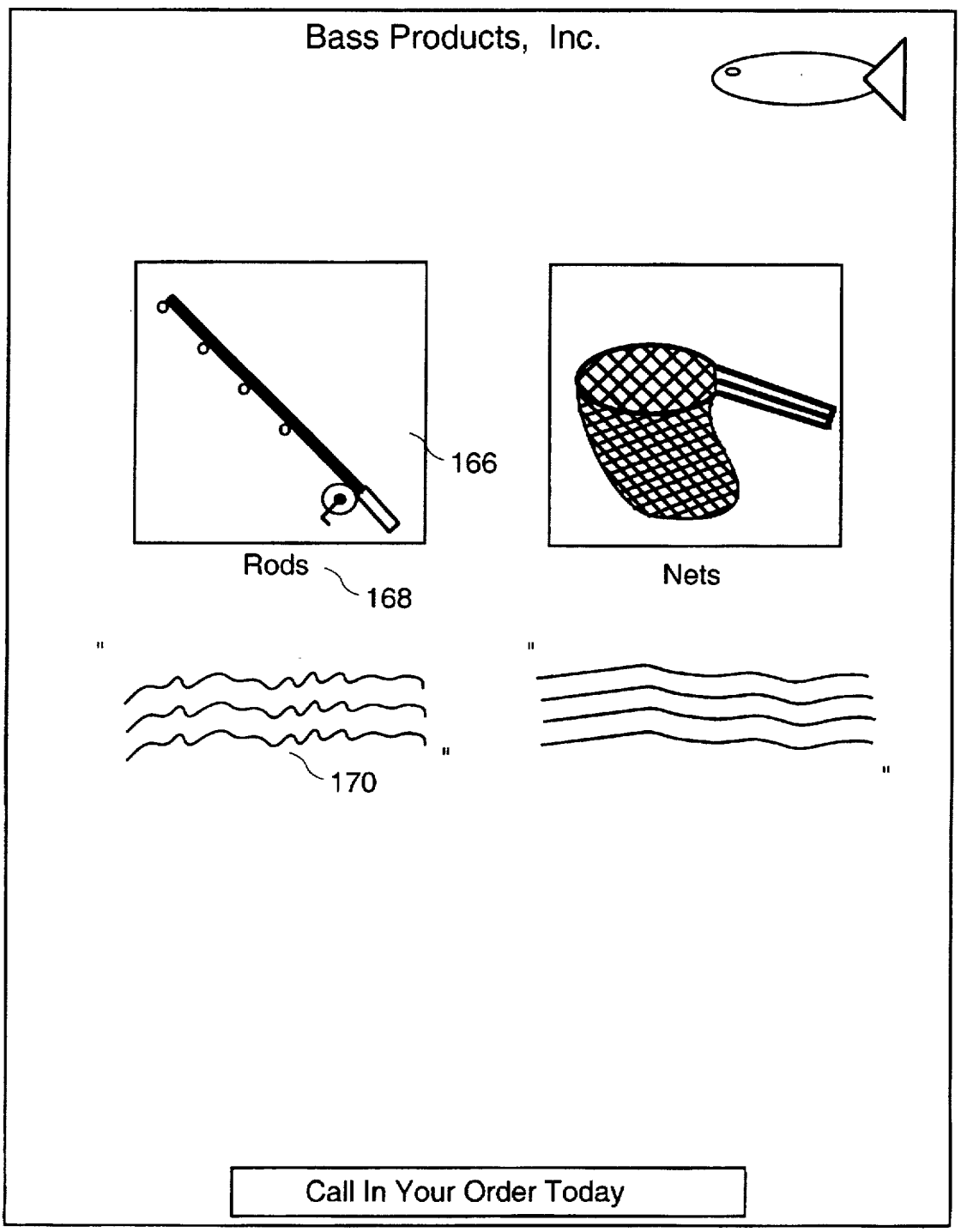
FIG. 11 shows the brochure of FIG. 9 after the design has been changed.

FIG. 11 illustrates an additional example in which the user has not added new content but instead has changed the design of the brochure composition. In this example, the user has selected a vertically oriented design in order to produce brochure composition 160". Here, a method of the present invention has automatically oriented the picture, caption and product text for each product in a vertical order on the single page of paper media. For example, the caption "Rods" 168 now appears below the picture 166, and below the caption now appears the product text 170. Likewise, the second product has been oriented vertically. A method of the present invention has automatically recomputed a layout for this brochure based upon the chosen vertical design for a paper page medium.

FIGS. 12a, 12b and 12c illustrate at 190 the brochure composition of FIG. 9 that has been rendered to HTML media. In this example, the single page paper media layout of FIG. 9 has been automatically transformed into a three-page HTML layout suitable for presentation on the World Wide Web, for example. This rendering to a different media may occur when a user executes a command from the user interface to publish the composition to a new media.

FIG. 12a shows a title page 192, FIG. 12b shows a first page 194 for the first product, and FIG. 12c shows a second page 196 for the second product. The title page 192 of FIG. 12a includes the title "Bass Products" 162 and the fish logo 164 from FIG. 9, but these content elements have been automatically scaled and located in a different position on the title page. Also included in the title page is now a "What's New" link 198 that links the user to another Web page. Also automatically created is a brochure table of contents 198 that includes forward links to "Rod Products" 200 and "Net Products" 202. Also included on this title page 192 is a link to a "Talk to Us" Web page 204. The first page 194 includes the image caption and product text from the original FIG. 9. Also included with this first page is the title and fish logo from FIG. 9 and a new link "Home Page" 206 with a backward link to the title page 192. The second page 196 for the second product likewise includes the original image, caption and product text from FIG. 9 and also includes the title, fish logo and new "Home Page" link 208.

By various methods of the present invention the content and design of the brochure composition of FIG. 9 has been automatically rendered for HTML media. Each component of the composition of FIG. 9 has associated properties that dictate how the component will appear in various media. For example, general properties may be used to indicate how a component should appear. These properties may include:

complex vs. simple, classic vs. modern vs. postmodern, energetic/dynamic vs. calm, warm vs. cool, dark vs. light, elegant/rich vs. plain, fast vs. slow, etc. It should be appreciated that other properties (such as those discussed above) may also be used.

Also, by various design choices built into the present invention, each medium to which a composition may be rendered contains knowledge about how it will appear. Prototypes of objects also contain knowledge. For example, specifically programmed into prototypes of media objects are defaults for primitive content types. In prototypes for content objects are abstract attributes (such as "emphatic", "playful", etc.) that can affect the primitive rendering routines for a particular medium. That is, the content types set up attributes that can be turned on or off by components and read by a medium. Also, component prototypes set attributes that establish (by inheritance) rendering defaults. More specialized prototypes and specific instances of components selectively override inherited attributes as appropriate. Overrides at the specific instance level can also be specified interactively by the user. For example, via a property sheet. Overrides can be directed to the primitive media dependent parameters as well. An example of a general prototype might be "text", while an example of a specialized prototype would be "title". An example of a specific instance would be a particular title in a particular document. As is known in the art, a "prototype" refers to a build-in object relatively near the root of the (an) object derivation tree. A prototype is used to transmit pre-built behaviors to user-specialized objects while still allowing the possibility of user overrides.

For example, various new elements have been added automatically to the new HTML media pages such as the "What's New" link on the title page 192 and the "Home Page" links 206 and 208 of pages 194 and 196.

Alternatively, the brochure composition of FIG. 9 may be rendered to any other suitable media. By way of example, the brochure FIG. 9 may be rendered to screen media which is suitable for viewing on the screen of a computer in order to make slides for a later presentation. A screen media format may be similar to the HTML pages of FIGS. 12a, 12b and 12c. Also, it is contemplated that a user may wish to change more than one aspect of a composition at a given time. For example, a user may wish to add content to a composition and also to render it to a different media.

Turning now to FIGS. 13 through 18, an embodiment of the brochure composition shown in FIGS. 9 through 12c is shown as being represented in embodiments of a content tree, a design tree and a media tree. It should be appreciated that the tree structures of FIGS. 13 through 18 are illustrative examples of one way of linking the content, design and media of the brochure composition. These trees are symbolic ways of viewing the content, design and media facets of the composition and as such may appear in other forms while still representing the composition. Showing these trees as separate entities assists in understanding how the use of facets technology allows separation of the content, design and media of a composition.

In other words, the embodiments of the trees as shown in FIGS. 13 through 18 are the internal representation of the brochure composition. As explained above, the content, design and media trees are not necessarily completely distinct trees, but may share intermediate nodes. Also, the content, design and media trees may typically share a common root and may have leaves in common, as will be shown below in the example of FIG. 18. The formation of these components into hierarchical trees may be performed in any suitable manner as will be appreciated by one of skill in the art of object-oriented programming. Preferably, the content, design and media trees represent containment relationships based upon an object prototype model that makes use of the facet technology.

FIG. 13 shows one possible representation 220 of a content tree of the brochure composition of FIG. 9. The content tree has a root, Document Content, and a first node "Bass Products" that represents the title of the brochure. Below the title are nodes representing the fish logo, the first product (a rod), and the second product (a net). Below the rod image are nodes representing the caption "Rods" and the product text for that product. Below the net image are nodes representing the caption "Nets", and the product text for that product. It is contemplated that this content information may be organized in a different hierarchical fashion yet still represent the same information. By way of example, the caption for each product may be an intermediate node having the image of the product and the product text below it as leaf nodes, instead of the caption being a leaf node. Alternatively, an intermediate node below "Bass Products" may be labeled "Product One" and would have three child leaf nodes, namely the rod image, the caption and the product text. In one embodiment of the present invention, each node containing content is associated with a particular component in the design tree. For example, a component labeled "Picture" in the design tree would have a link to the image of the rod. Such links from design components to content elements are also shown in FIG. 6.

Thus, the content tree represents the information of the brochure composition, apart from any interpretation as a document. However, the content tree may change depending upon the media to which it is rendered. For example, when a composition is rendered to HTML format, elements such as the "What's New" or "Talk to Us" links may be added to the title page as shown in FIG. 12a, thus adding new content elements to the content tree.

Figure 14:
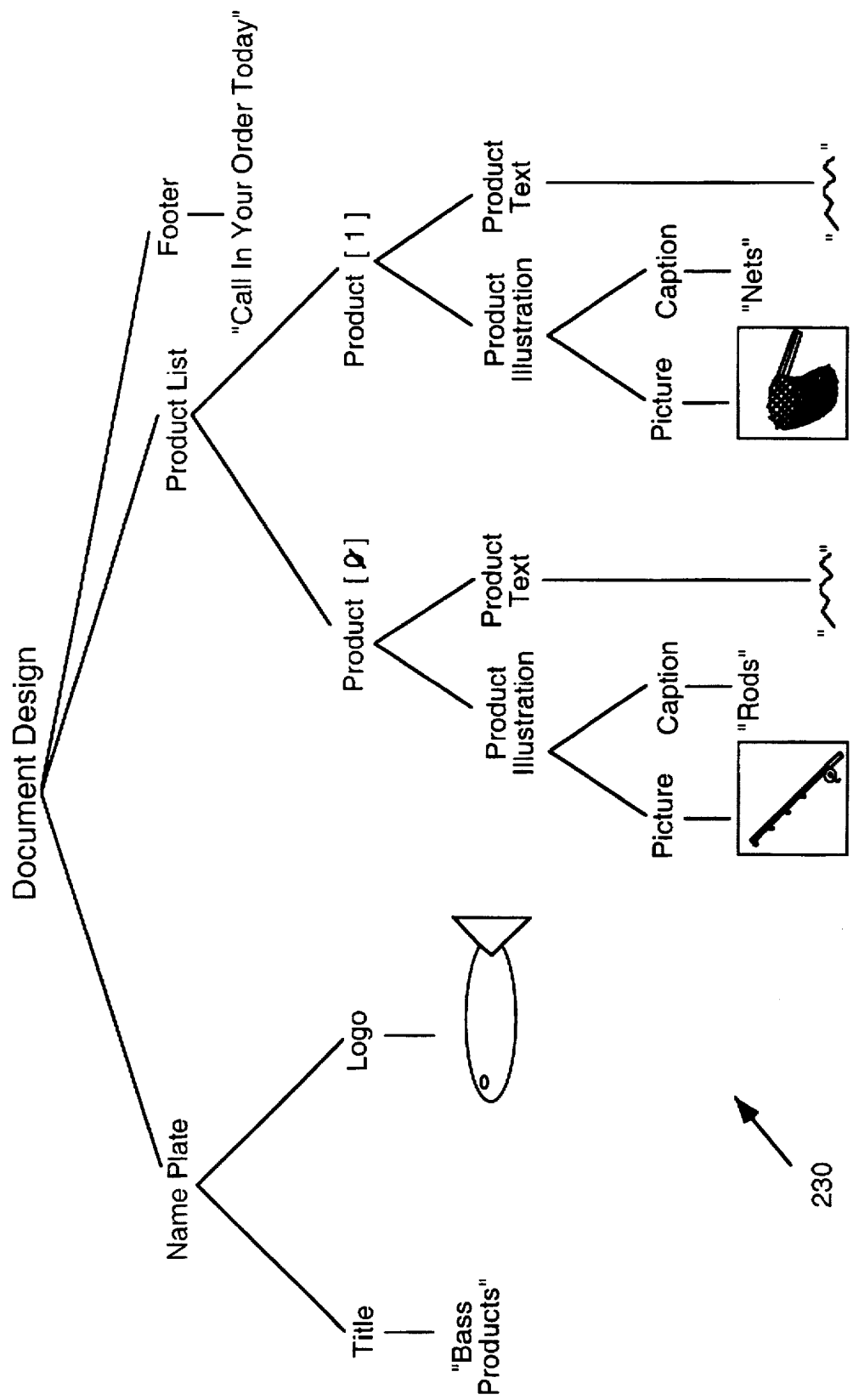
FIG. 14 illustrates an embodiment of the design tree for the brochure of FIG. 9.

FIG. 14 shows an embodiment of a design tree 230 for the brochure composition of FIG. 9 that has been rendered for paper media. The nodes within the design tree represent components, such as may be found in FIG. 4. The leaf nodes of the design tree represent the content of the brochure composition and are shared with the leaf nodes of the content tree of FIG. 13. In this fashion, it may be seen how the content and design trees have different intermediate nodes, but may share the same leaf nodes, namely the content information. The leaf nodes also contain design and media information. For example, printing a line of text requires not only the text (content), but also the font and style information (small scale design), and a region on a particular page (media). Thus, a leaf may contain information suitable for direct rendering by an API, driver call, HTML output routine, etc, in order to render the content into a particular information presentation.

The design tree 230 has a root, Document Design, having three component children: Nameplate, Product List, and Footer. The component Nameplate has subcomponents Title and Logo that are each linked to their corresponding content. The Footer component has a link to its corresponding content, namely the string "Call in your order today." The component Product List has subcomponents Product 0 and Product 1. The component Product 0 has two subcomponents: Product Illustration and Product Text. The component Product Text is linked to its corresponding text. The component Product Illustration has two subcomponents: Picture and Caption, each of which is associated with its corresponding content. The hierarchical structure for Product 1 is similar to that for Product 0 as can be seen in FIG. 14.

From this design tree, it should be appreciated that the components of the design are represented independently of a medium to which the content may be rendered. That is, components represent elements of the composition without having to specify exactly where that element will appear on the paper page. However, it is possible that the design tree may vary depending upon the media to which the content is rendered, although the design tree is still independent of the exact location of the content in that media. For example, if the brochure composition were to be rendered in HTML media, two new components may appear below each of the components Product 0 and Product 1. For example, component Product 0 would have additional subcomponents Product Forward Link and Product Backward Link. The Product Forward Link would contain content labeled "Rod Products", that would provide a forward link from the title page to the page of Product 0 (as seen at 200 in FIG. 12a). Likewise, the component Product Backward Link would be associated with the text "Home Page" and would form a link from the page upon which Product 0 appears back to the title page of the HTML media (as seen at 206 in FIG. 12b).

Also, in HTML media three additional Title components may be created for each of the new pages. In one embodiment of the present invention, new "Bass Products" components are created for each page of the new media. An illustration of a "Bass Products" component for a particular media is shown below in FIG. 17. The design tree may also change if content does not fit within a particular medium. For example, if a large text paragraph does not fit at the bottom of the page, the paragraph is split into two pieces. Instead of one component representing the large paragraph, a new design component is created to represent the second half of the paragraph on the second page. This new component would also be added to the design tree. Other component additions to the design tree are possible for other types of media and content rearrangement.

Figure 15:
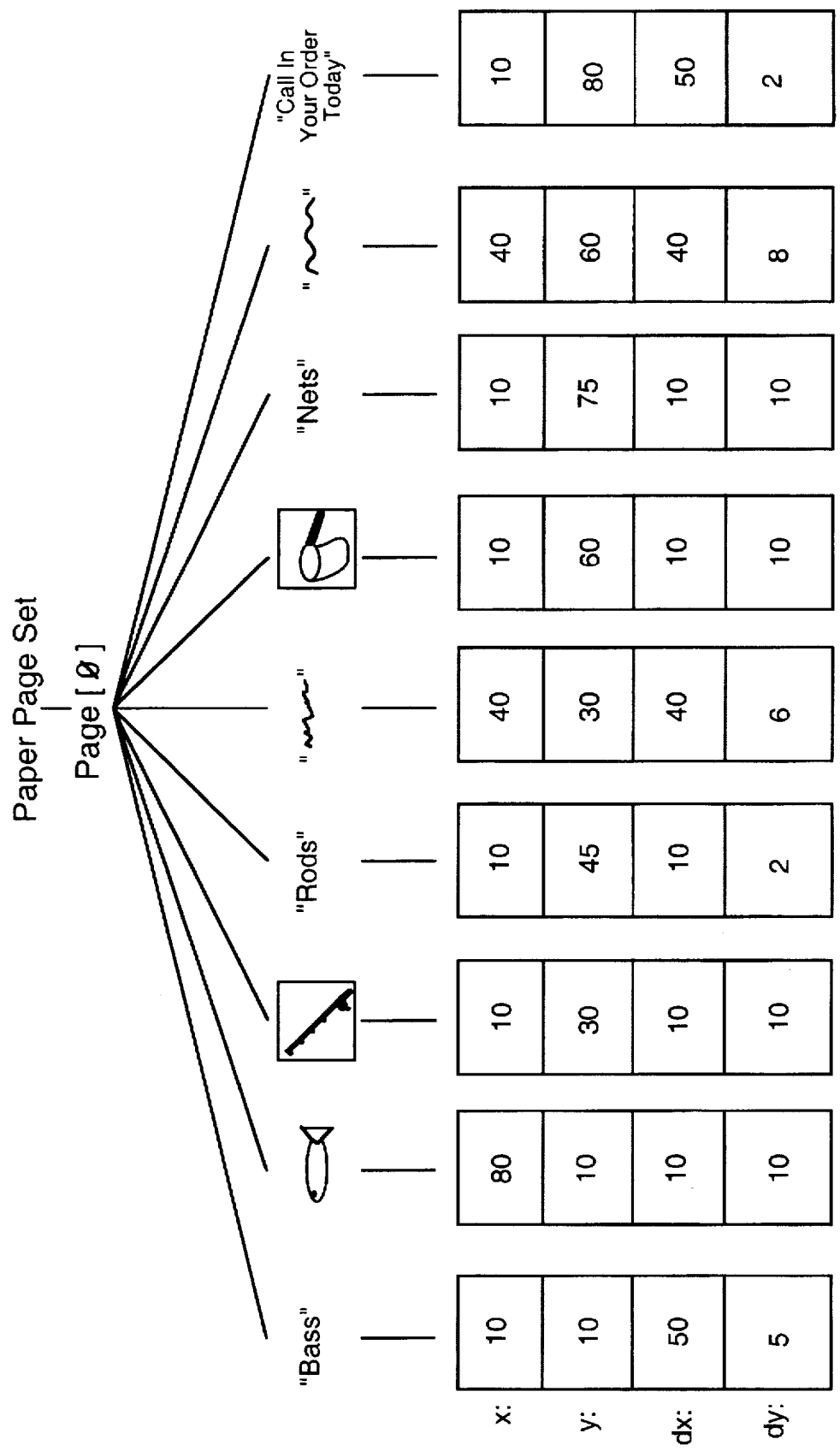
FIG. 15 represents an embodiment of the media tree for the brochure of FIG. 9 rendered for paper media.

FIG. 15 represents an embodiment of a media tree 240 for the brochure composition of FIG. 9 in which the brochure has been rendered to paper media. The purpose of the media tree is to provide a layout, or location for each item of content of the brochure composition. The media tree has a root, Paper Page Set, with one child component Page 0. In this example, the brochure composition is being rendered to a single paper page, hence there is only one child component, Page 0. Directly below the Page 0 component is the content for this brochure composition, namely the title "Bass Products", a fish logo, a picture of a fishing rod, etc. The media tree shares these leaf components with the content tree of FIG. 13. Also shown in FIG. 15 are the media facet coordinates for each item of content indicating a layout position for that content on the single paper page.

In this simple example, the layout coordinates form the extent of the item of content. In general, the extent of an item of content indicates how much of the content rendering space in a particular medium the content occupies. By way of example, the extent of a content item may be its rectangular coordinates, may indicate a three-dimensional position, a length of time, a segment of sound, a segment of video or other portion of a particular medium. In this example, the extent for each item of content are X and Y coordinates and the item's width and height. For example, the title "Bass Products", has an X coordinate of 10, a Y coordinate of 10, a width (dx) of 50, and a height (dy) of 5. Coordinates for the other content items are provided in a similar fashion as shown below each content item in FIG. 15.

In one embodiment of the present invention these coordinates are represented as properties of the media facet for the component representing that content item. It should be appreciated that other coordinate systems aside from a rectangular coordinate system may be used, such as polar coordinates, etc., in addition to specifications that are not coordinates. Thus, it can be seen how the media facet tree represents the layout for the content of the brochure composition, yet is distinct from the design for that composition.

Figure 16:
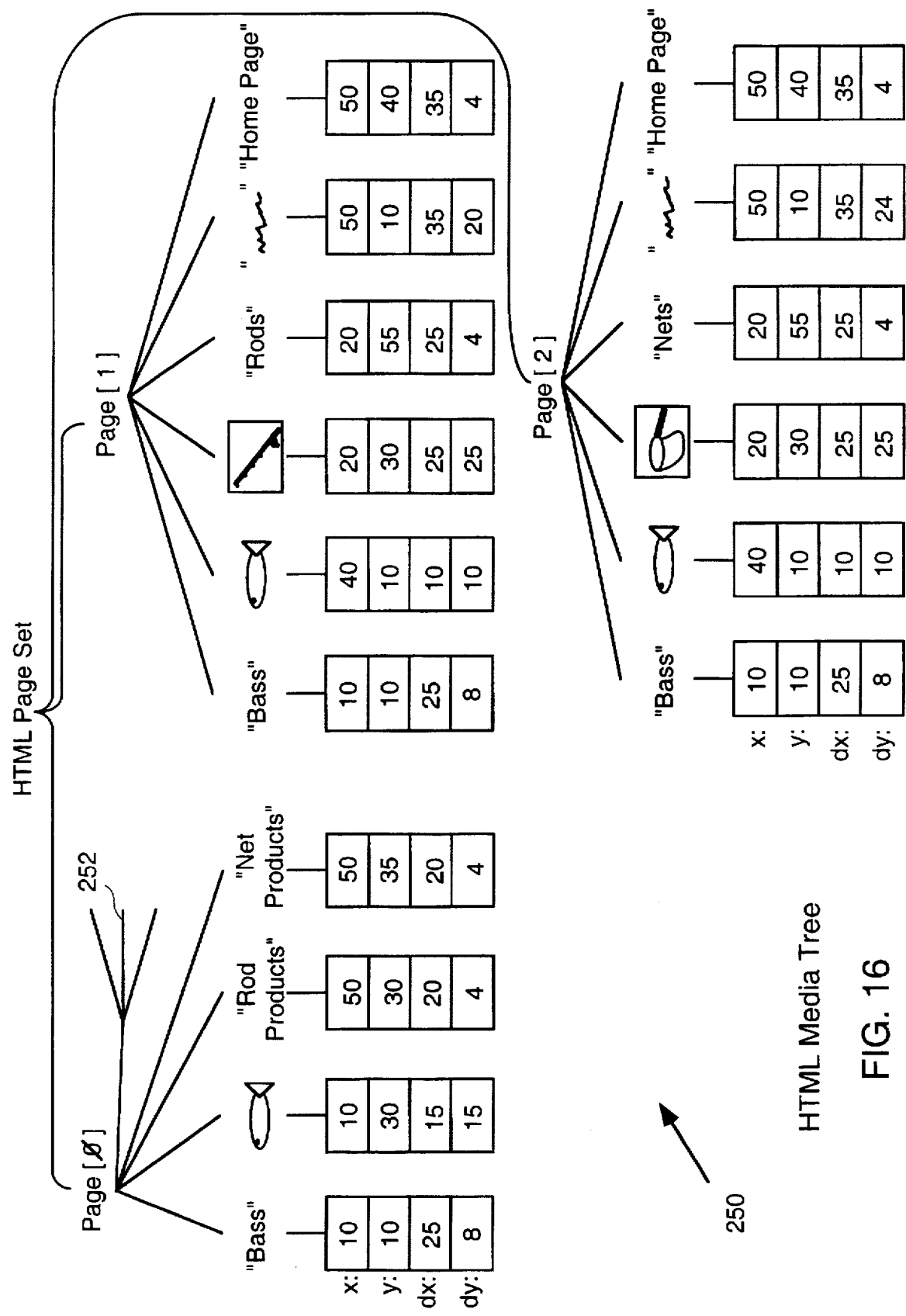
FIG. 16 illustrates an embodiment of the media tree for the brochure of FIG. 9 rendered for HTML media.

FIG. 16 shows an embodiment of a media tree 250 for the brochure composition of FIG. 9 as it would appear after the composition has been rendered for HTML media. This media tree may be compared with the media tree of FIG. 15 in which the composition is rendered to paper media. In this example of FIG. 16, the media tree 250 has a root HTML Page Set and three child components, namely Page 0, Page 1 and Page 2. This media tree for HTML media has three pages instead of the single page for paper media because a composition to be rendered in HTML format has different requirements and a different layout as compared to that for paper media. In this example, the brochure composition of FIG. 9 would appear as shown in FIGS. 12a, 12b and 12c when rendered in HTML media. Hence, the media tree of FIG. 16 has three different pages. Page 0, Page 1 and Page 2. The number of pages used by a particular composition for a particular media layout is a matter of the content and the design choice for that media, and the composition may take multiple forms for a particular media. For example, a property that may be explicitly set may control whether the number of pages is fixed or is allowed to vary with the amount of content. The layout of the brochure composition in HTML media as shown in FIGS. 12a, 12b and 12c, and as represented by the media tree of FIG. 16 is one such illustrative example of how a layout and a media tree might appear for a composition.

The media tree of FIG. 16 may best be interpreted by reference back to FIGS. 12a, 12b and 12c. Page 0 of the media tree represents the layout as shown in FIG. 12a. Page 1 represents FIG. 12b, and Page 2 represents FIG. 12c. Page 0 has seven children, namely, the title "Bass Products", the fish logo, "Rod Products" and "Net Products", "What's New", "Brochure" and "Talk to Us". The first four children are shown with layout coordinates in FIG. 16, while the last three are not shown, but would have links as shown at 252. These children in the media tree represent the items of content shown in FIG. 12a. As in the paper media tree of FIG. 15, each content item has associated with it its extent, in this case, its X and Y coordinates and its height and width.

Page 1 of the HTML media tree has the six children as shown which represent the content from FIG. 12b. Likewise, each of these content items has an associated extent as shown below each content item in FIG. 16. Similarly, Page 2 of the media tree has six children corresponding to the content items of FIG. 12c along with their associated extents as can be seen in FIG. 16. As can be seen in Page 0, Page 1 and Page 2, the title and logo are repeated. An optimization may be to share content elements by reference to a single instance. It should also be pointed out that new content items have been created for this HTML media because of the unique requirements for that media. For example, the new content items "Rod Products" and "Net Products" have been created and appear within Page 0. Likewise, the content item "Home Page" now appears on Page 1 and also on Page 2.

FIG. 17 shows at 260 the content item "Bass Products" from Page 0 in more detail. The content item may be represented internally as an object or other similar data structure. Preferably, the content item is represented as a component. Shown in particular for the content item "Bass Products" is how that content item may have associated with it various properties that relate to different media. The function of these different properties for the different media is to allow the content item to be represented appropriately for a given media. For example, this content item currently has values for its HTML media properties because it is being rendered in HTML media as shown in FIG. 16. Accordingly, the properties associated with its paper media properties are left blank or are unused. Many other different types of properties unique to, or appropriate for HTML or paper media may be included with this content item although they are not shown here.

Also shown for this content item "Bass Products" are a set of properties associated with a potential rendering of the content item to VRML media. Shown are properties representing the content item's X, Y and Z coordinates, and its height, width and depth. The additional properties of a Z coordinate and depth would be appropriate for a content item rendered in VRML media because of the three-dimensional nature of that media. Other properties that may be appropriate for this media are color, brightness, rotation and sound. For example, music sounds or even a video clip may be associated with a particular content item in a composition, and these sounds and video may be associated with the content item via its properties. It should be appreciated that many other different kinds of properties may be associated with a particular media type.

Figure 18:
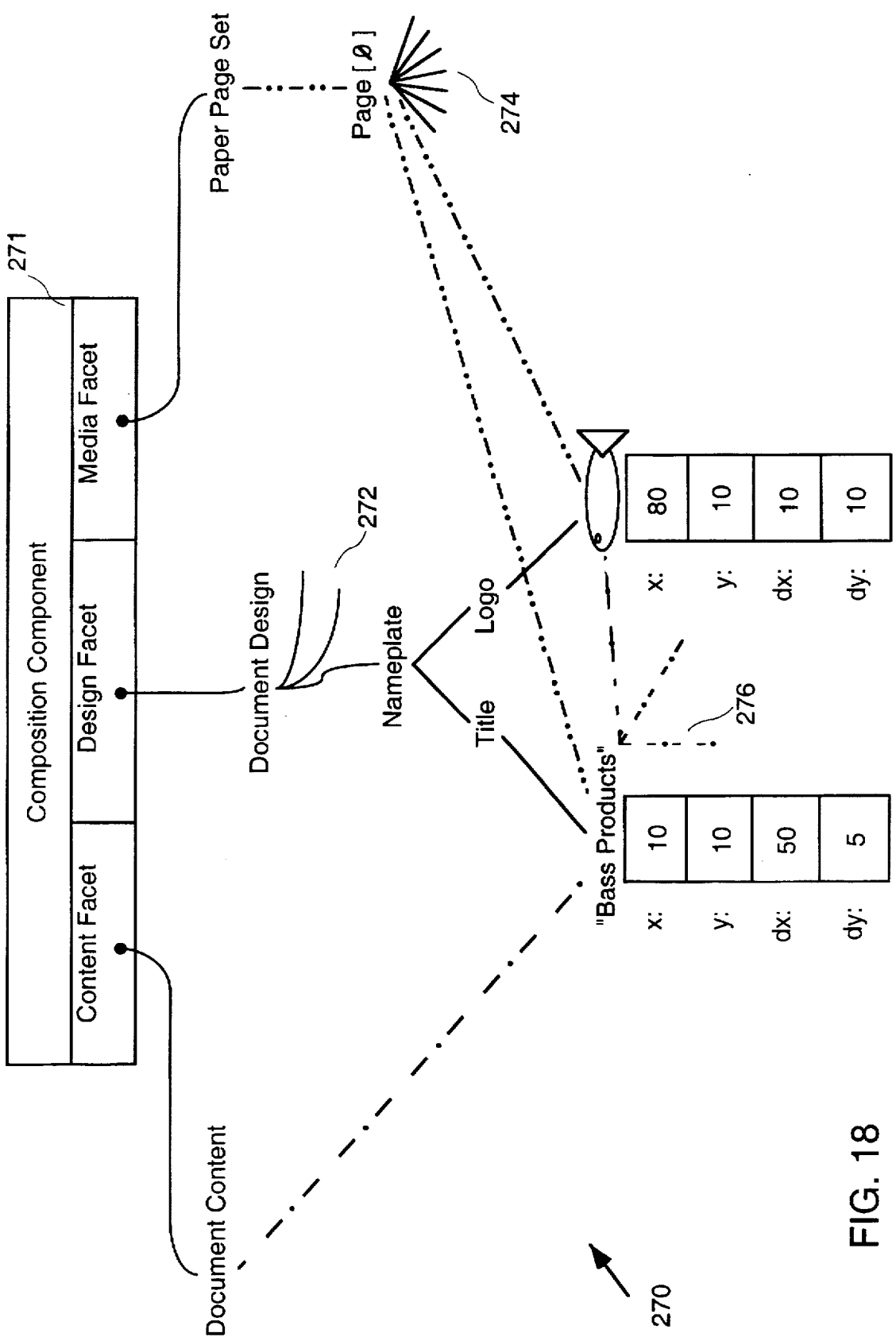
FIG. 18 illustrates in more detail an embodiment of the relationship between the content, design and media trees for various of the components of the brochure of FIG. 9.

FIG. 18 at 270 shows in more detail the title and logo from Page 0 of the paper media tree of FIG. 15. Along with this portion of the media tree, relevant portions of the content tree and design tree of FIGS. 13 and 14 are also shown in order to demonstrate the relationship between the three trees.

In this example, the root of the brochure composition is a Composition Component 271 that has a content facet, a design facet and a media facet. These three facets are the respective roots for each of the content, design and media trees. These three partial trees as shown in FIG. 18 are portions of the three trees that are shown in FIGS. 13, 14 and 15. For example, the root of the content tree is Document Content that is linked to its child content item "Bass Products". The "Bass Products" content item is linked to the fish logo and is also linked to the image of the fishing rod and to the image of the net (not shown) via links 276.

The root of the design tree is Document Design that has child component Nameplate and links 272 to the components Product List and Footer (not shown). As in FIG. 14, the Nameplate component has subcomponents Title and Logo which have links to their respective content items that are also shared with the content tree. The root of the media tree is the component Paper Page Set which has one child component Page 0. Page 0 has as children the title "Bass Products" and the fish logo as well as links 274 to the other content items that are shown in FIG. 15 but are not shown here in FIG. 18. Thus, FIG. 18 illustrates how although the content, design and media trees may be viewed conceptually as separate, they may have a common root and common leaves, and at times may share common intermediate components, although not in this example.

EXAMPLE OF ADDING CONTENT TO A COMPOSITION

Figure 19:
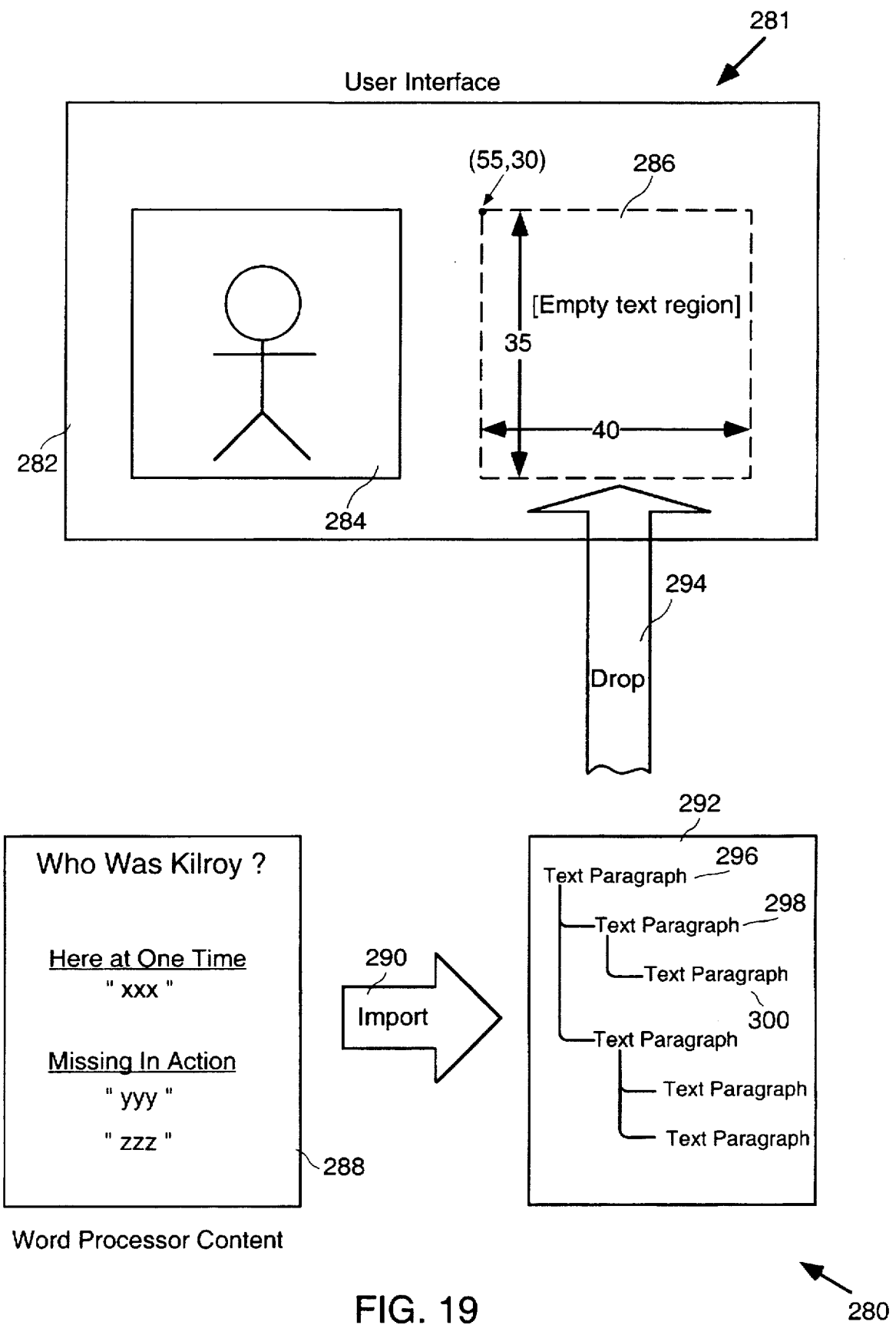
FIG. 19 illustrates a process by which structured text may be added to a composition according to one embodiment of the present invention.
Figure 20:
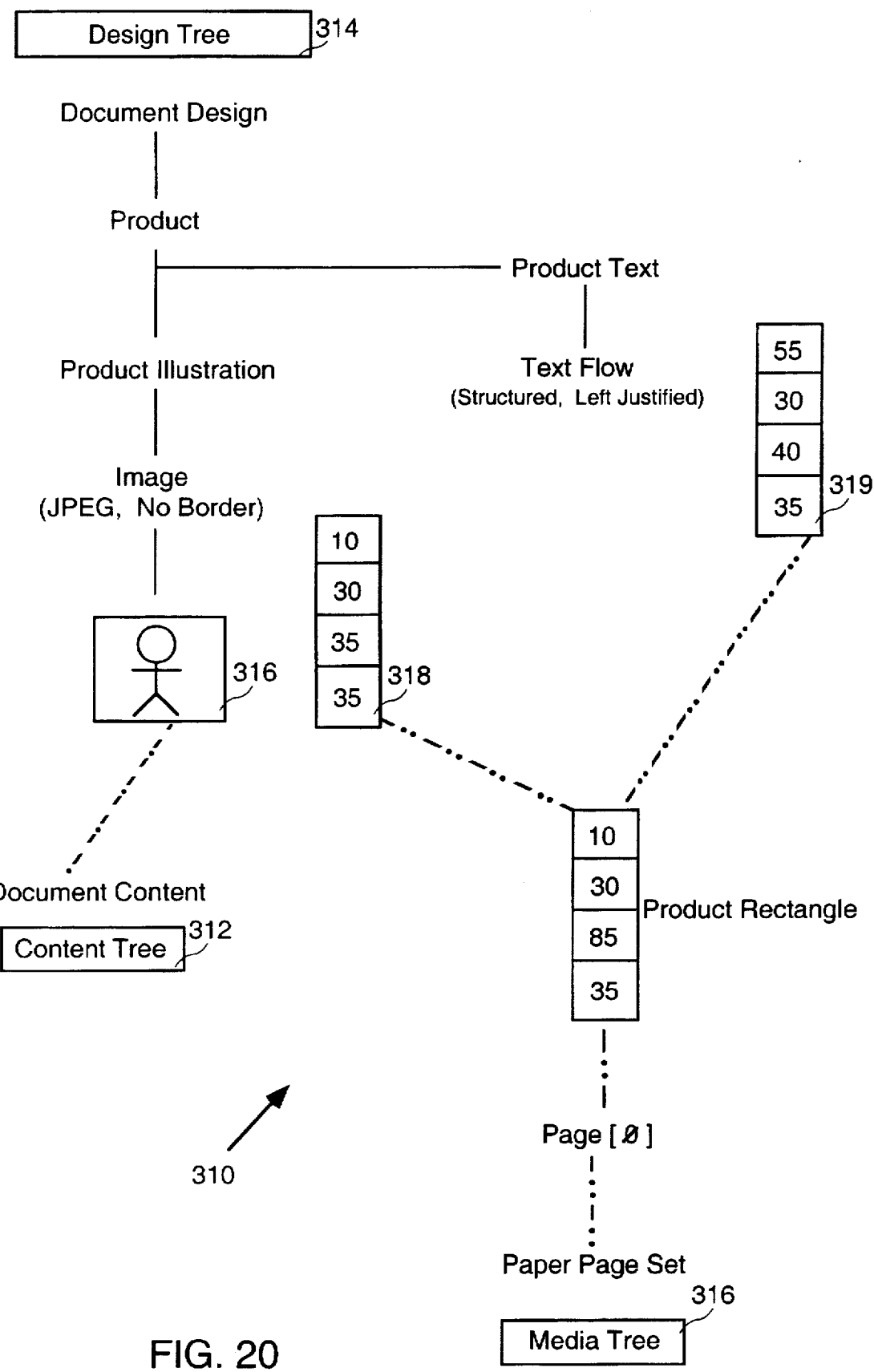
FIG. 20 illustrates an embodiment of the composition of FIG. 19 before the new structured text has been added.
Figure 21:
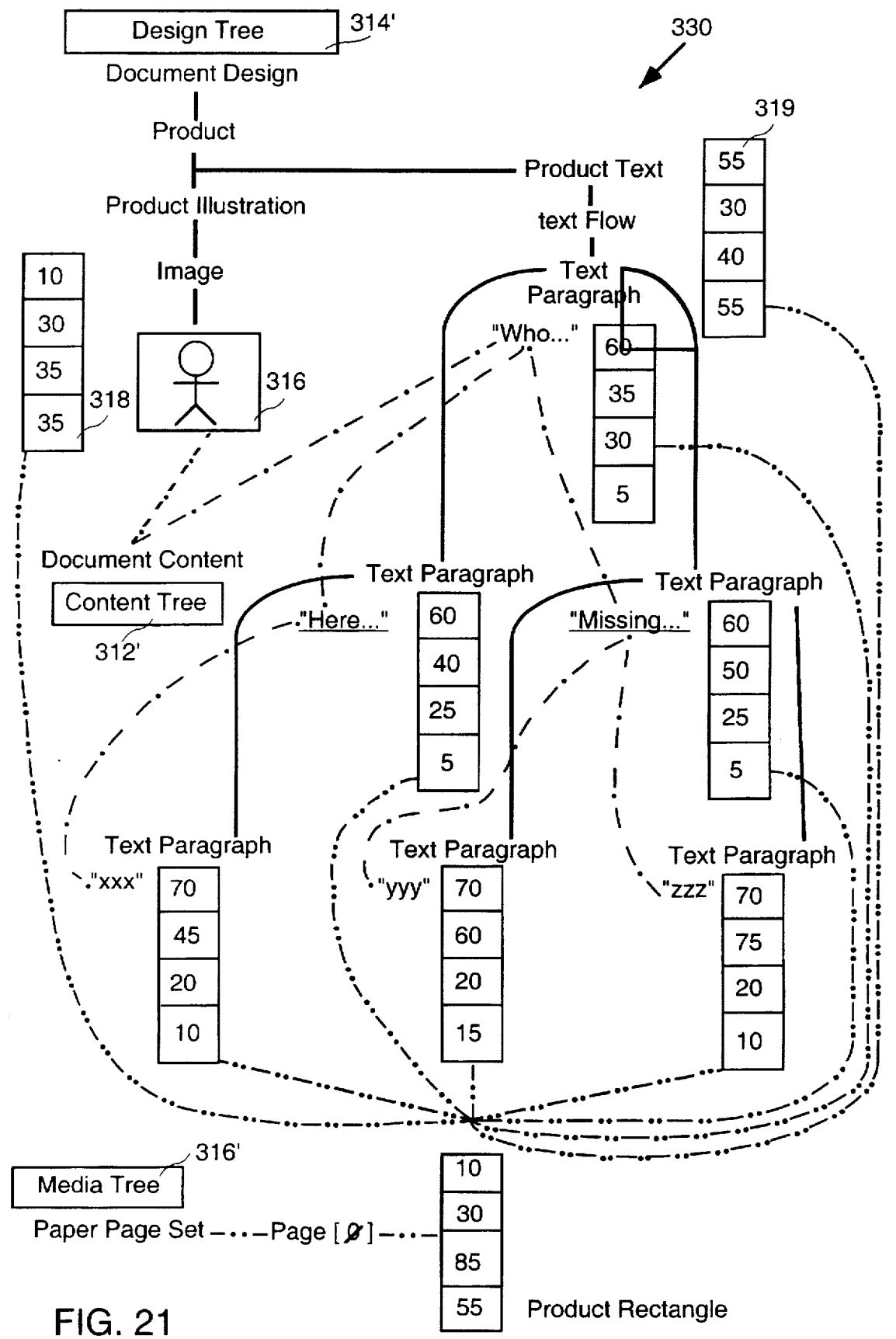
FIG. 21 illustrates an embodiment of the composition of FIG. 19 after the new structured text has been added.

An example of how the content tree, design tree and media trees are manipulated when content is added to a composition is illustrated in FIGS. 19 through 22. These Figures illustrate graphically how content may be added to a composition and how each tree is changed accordingly, in one embodiment of the present invention. A more detailed discussion of the steps involved in this process is contained below in the flowcharts of FIGS. 29 through 36. In general, FIG. 19 shows content that is being dropped onto an existing composition, FIG. 20 shows the content, design and media trees before the drop, and FIG. 21 shows the same trees after the content has been dropped onto the composition.

FIG. 19 illustrates one technique 280 for adding content to a composition. Shown in FIG. 19 is a user interface 281 of a computer system that includes a composition 282. Located within the composition 282 are currently a photograph 284 and an empty text region 286. The empty text region 286 may be represented by a particular text component that at this point has no context associated with it. In this example, a user wishes to drop content from a word processor 288 onto the composition 282. The word processor content 288 includes a title, a first subheading with a body of text "xxx", and a second subheading having two text items "yyy" and "zzz".

In a first step 290, this word processor content is imported into an embodiment of the present invention in the structure shown at 292. The import of this content may be performed in a wide variety of manners. By way of example, the import of content may be performed by an object broker which is able to recognize, define and group content into particular objects.

In this example, the object broker has recognized the word processor content as structured text, and has grouped the content into a hierarchy of text paragraph components. For example, component text paragraph 296 corresponds to the title of the content "WHO WAS KILROY?", text paragraph 298 corresponds to the first subheading "Here At One Time", and text paragraph 300 corresponds to the body of text "xxx".

This content may be dropped via a technique 294 onto the composition 282 in any suitable manner. It is contemplated that this drop process may be performed in a wide variety of manners. By way of example, content may be dragged from a location on the user interface and dropped onto the location of the composition using any suitable pointing device, such as a mouse. Alternatively, the drop may be performed by the user double clicking a pointing device, or by the user identifying content in another location within the composition in any other suitable manner. The content may also originate from any suitable source. By way of example, the content may appear within the user interface, the content may be identified by a file name, a URL address, a portion of a database, or any other similar means used to specify content using a computer system. Additionally, content may be input automatically to a computer system via a computer interface, a network connection, a modem interface, an infrared or radio link interface, a sound recognition interface, a video interface, or any other similar means of inputting data into a computer system. Content may also be input via a mail/messaging system, a data acquisition device, a telephone system, scanner, etc.

Turning now to FIGS. 20 and 21, FIG. 20 illustrates the internal representation of the content, design and media trees before the content is dropped, while FIG. 21 illustrates the representation of these trees after the content has been dropped onto the composition.

FIG. 20 shows embodiments 310 of each of the content, design and media trees for the composition 282 of FIG. 19. The content tree 312 has a root Document Content with one link to the only item of content currently in the content tree which is the data 316 for the photograph 284 of the composition. The design tree 314 has a root Document Design that has one child component Product. Product has two subcomponents Product Illustration and Product Text, representing respectively place holders for the photograph 284 of the composition and the empty text region 286 of the composition. Product Illustration in this example has one subcomponent Image. In this example, Product Illustration has no caption, thus, there is no additional subcomponent for a caption located below the component Product Illustration in the design tree. The Image component of the design tree has various properties associated with it such as the quantity JPEG indicating the type of data, and a "no border" flag indicating that the photograph should have no border. A wide variety of other properties describing how the photograph should appear in this composition for a particular media are possible.

The Product Text subcomponent of Product in the design tree has one subcomponent Text Flow which indicates a region for text and various properties for text that may be placed such as "structured" and "left justified". In this example, the Text Flow component indicates a region for text identified by the X and Y coordinates 55 and 30, and a width and height of 40 and 35. At this point, there are no subcomponents to Text Flow because there is no content in this region. It should be appreciated that a wide variety of other properties in addition to "structured" and "left justified" may be used in association with a design component such as Text Flow to indicate how content should appear in a given media. Representative examples of other such properties are described above.

The media tree 316 of FIG. 20 has a root Paper Page Set with one subcomponent Page 0. On Page 0 is one subcomponent Product Rectangle which allocates media regions 318 and 319 for the Image 316 and the Text Flow component respectively. In other words, the media region defined by the coordinates of the component Product Rectangle (namely 10, 30, 85, 35) is divided into two regions, one of which includes the photograph, the second of which is currently an empty text region. At this point in time, the composition is ready for content to be dropped upon it. Once the content has been dropped onto the composition via a drop technique 294 as shown in FIG. 19, then the content, design and media trees appear as shown in FIG. 21 according to one embodiment of the present invention.

FIG. 21 shows embodiments 330 of the content, design and media trees after the content 288 of FIG. 19 has been dropped onto the composition 282. As will be explained in detail below, each of the three trees has been changed due to the dropped content. Starting with the design tree 314', the component Text Flow has had numerous subcomponents added beneath it in the design tree hierarchy. The Text Paragraph components shown in a hierarchy 292 of FIG. 19 have been added in this same hierarchy as subcomponents to the Text Flow component. For example, below the Text Flow component is a single subcomponent Text Paragraph that represents the title of the content, "WHO WAS KILROY?". Below this first Text Paragraph component are two subcomponents, namely two more Text Paragraph subcomponents representing the first subheading "Here At One Time", and the second subheading "Missing In Action". In a similar fashion, these two Text Paragraph components have components below them in the design hierarchy representing their respective bodies of text "xxx", "yyy" and "zzz".

The content tree 312' still contains the root Document Content with a link to the Image 316, but now also has a link to the title of the content, "WHO WAS KILROY?". This title, in turn has content links below it connecting to the first and second subheadings, which in turn have links to their respective bodies of text. For example, the second subheading "Missing In Action", has two content links, one to text body "yyy" and one to text body "zzz".

In a corresponding fashion, the media tree 316' now has additional links defining new regions for each of the new content items that have been added. The media tree still has links to the original media regions 318 and 319 for the Image and Text Flow components respectively. Although, the positions for Text Flow has changed slightly reflecting the impact of the new content on fitting. Additionally, the Product Rectangle component now has media links to each of the new Text Paragraph components defining a specified media region within the Product Rectangle media region for each piece of new content. For example, the Product Rectangle component now has a link to the Text Paragraph component representing the body of text "xxx" that has media X and Y coordinates of 70 and 45, and a width and height of 20 and 10 respectively. In a similar fashion, the Product Rectangle media component has links to each of the other new Text Paragraph components defining a particular media region for their respective content items as is shown in FIG. 21. The coordinates for the Product Rectangle have also changed from (10, 30, 85, 35) to (10, 30, 85, 55) because of the dropped content. Also, the height of Text Flow has changed from 35 to 55. Alternatively, a different design might require that the extents of each of these components must remain the same, in which case different attributes for the dropped text such as font and text size would be modified in order to render the text in the same amount of space.

Figure 22:
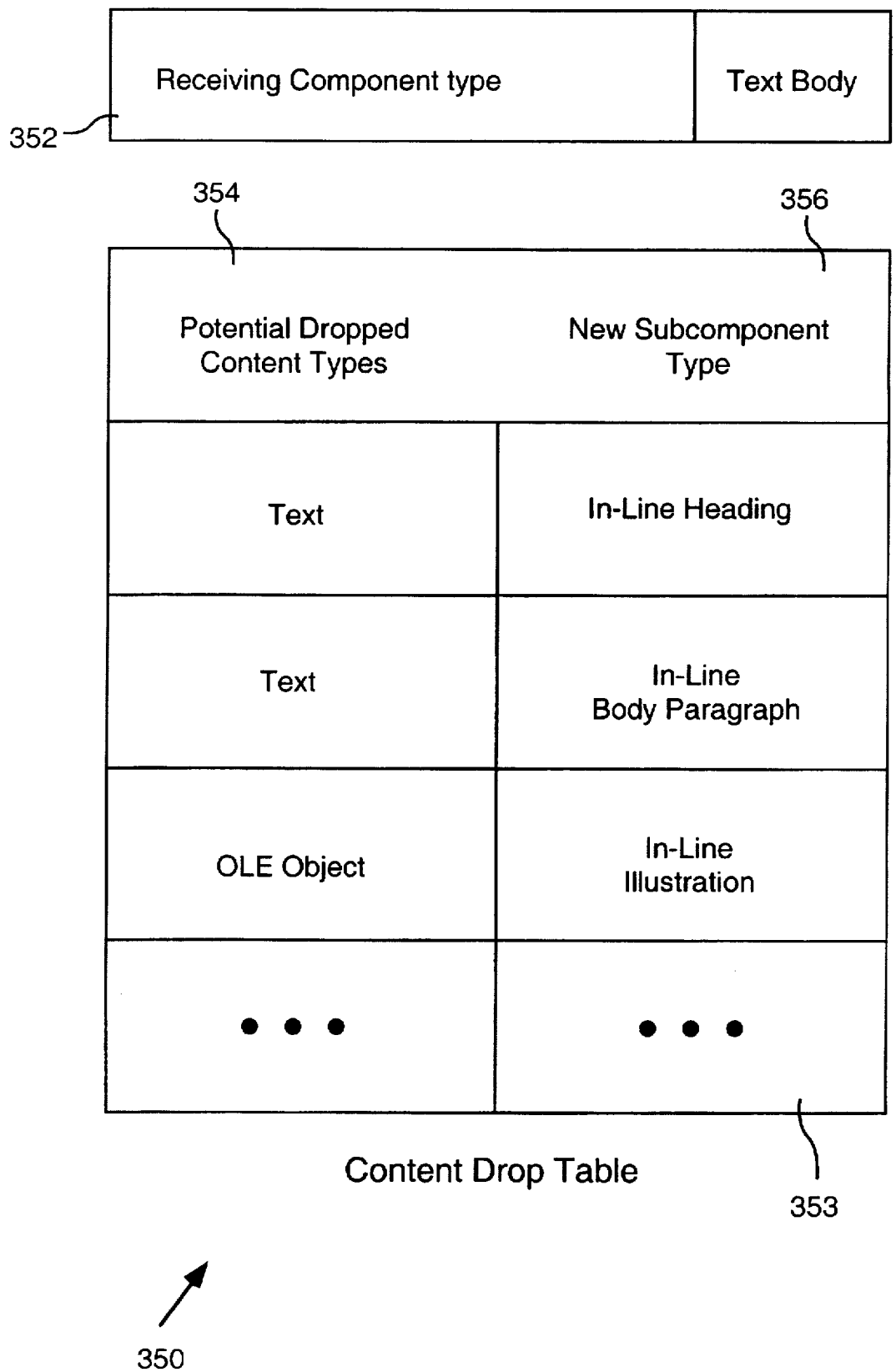
FIG. 22 illustrates an embodiment of a content drop table for a particular component.

When content is dropped onto a composition (such as is shown in FIGS. 19 through 21) an embodiment of the present invention makes use of a content drop table 350 as shown in FIG. 22 in order to determine whether content may be dropped in a particular location, and if so, what type of component should be created for that dropped text. A content drop table may be implemented in a wide variety of manners. By way of example, the content drop table 350 of FIG. 22 is one such implementation. An example of a specific use of a content drop table by a receiving component of a composition will be discussed in more detail below with reference to step 512 of FIG. 29 and step 554 of FIG. 30.

In one embodiment of the present invention, a content drop table such as the one shown in FIG. 22 exists for each component of a composition. Alternatively, the concept of a content drop table may be applied to a group of components, or to a complete document. A component type in a composition that may receive a drop is termed a receiving component type. The content drop table 350 has an identification section 352 and a body 353 that has columns 354 and 356. The identification section 352 of the content drop tables indicates for which receiving component type the content drop table applies. In this example, the content drop table 350 is a drop table for a receiving component type of type Text Body.

The purpose of the content drop table is to attempt to match a potential dropped content type with a possible appropriate subcomponent type for the given receiving component type. In this example, a receiving component of type Text Body has been designed to accept content of either type Text or OLE Object and map these specific content types to a particular new subcomponent type. The drop table shows that dropped content of type Text may either match an In-line Heading component or an In-line Body Paragraph component for a new subcomponent. A dropped content of type OLE Object will only match an In-line Illustration subcomponent. The first column 354 is labeled "Potential Dropped Content Types" because a dropped item of content may possibly be interpreted as different types of content. The object adaptor that recognizes this dropped content is able to identify the potential component types of dropped content. For example, a short amount of text dropped onto a composition might be interpreted as a type of caption, body text, heading, etc.

The content drop table may be used in the following manner. Assume that a word processor clip is dropped onto a composition. The Universal Object Adaptor first constructs a list of the possible types such as text, OLE Object, etc. Next, the table is stepped through one row at a time. If the type listed in the left-hand column is not compatible with the identified possible types of dropped content, then that row is skipped. However, if it is compatible, then an attempt is made to construct a component of a type as listed in the right hand column using the dropped content. If this attempt is successful, then the process is done, if not successful, then the next row of the table is tried. It is also possible for a user to explicitly choose which component type to create via a drop technique or other interaction with a user interface. It will be appreciated by those of skill in the art that other priority schemes for interpreting and matching content types are possible. The use of this drop table will be discussed further with reference to FIGS. 29 and 30 below.

MEDIA DIVISIONS

Another useful feature of the present invention is the concept of a media division. A media division allows a particular region of a medium to be split into other related regions according to a set of rules and properties. The concept of a media division will now be discussed with reference to FIGS. 23 through 28. FIGS. 23 and 24 illustrate an embodiment of how a media division may be used within the present invention and FIGS. 25 through 28 provided illustrative examples of various kinds of media divisions. The use of a media division in the context of an embodiment of the present invention will then be further explained in more detail below with reference to FIGS. 34 and 35.

Figure 23A:
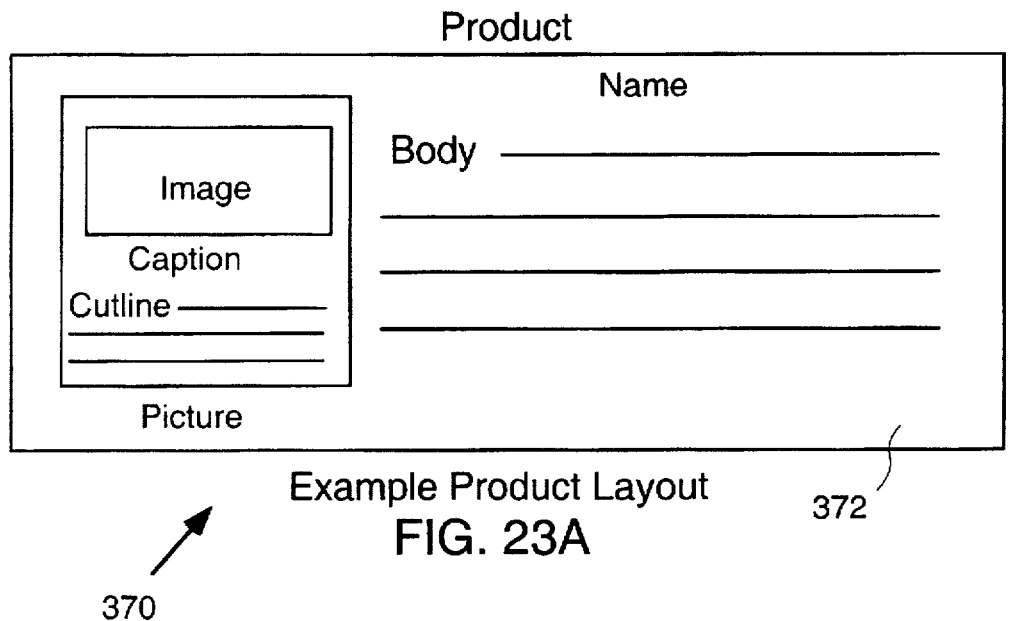
FIG. 23a illustrates an example of a product layout in a particular brochure.

FIGS. 23a through 23d provides a simple product example to show a motivation for the use of a media division. FIG. 23a shows an example product layout 370 for a particular product that may appear in a composition 372 as shown. This example product has a picture region on the left side of the composition and a name and body text on the right side of the region. Within the picture region is the image itself along with a caption and a cutline both below the image. On the right side of the composition, the body text appears below the name of the product.

Figure 23B:
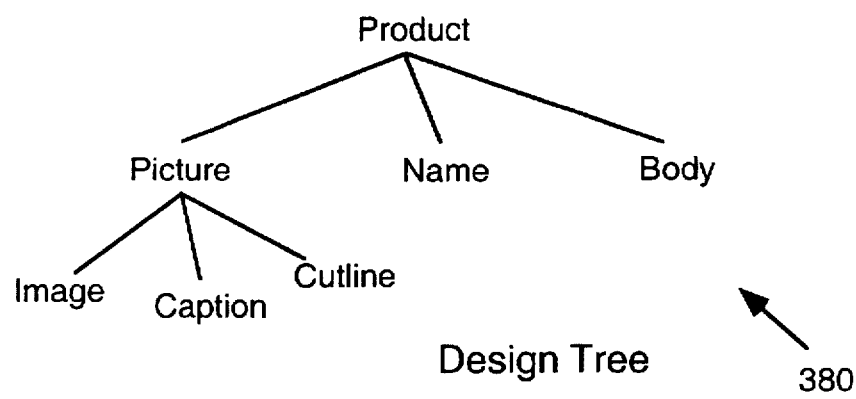
Figure 23C:
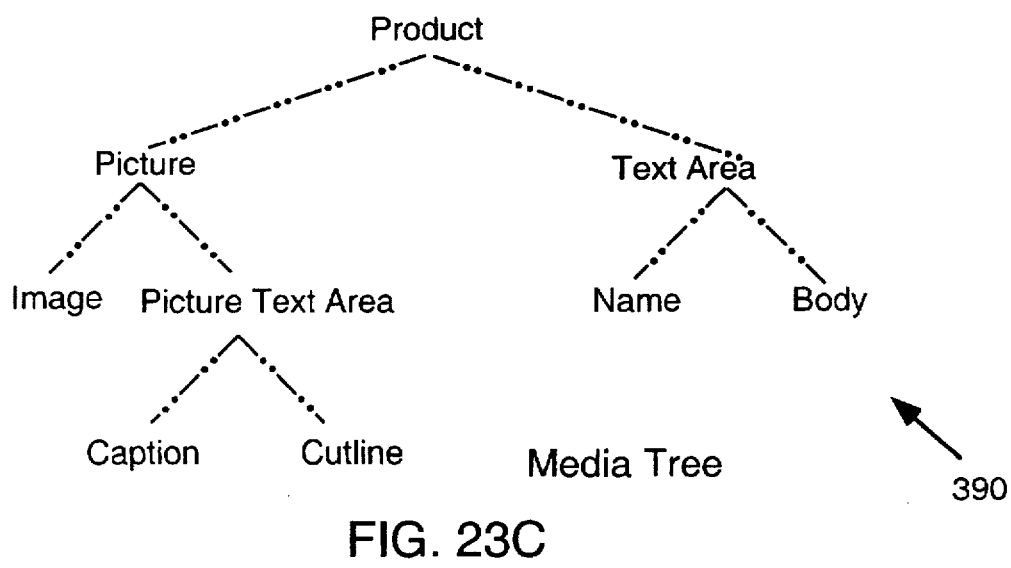
Figure 24:
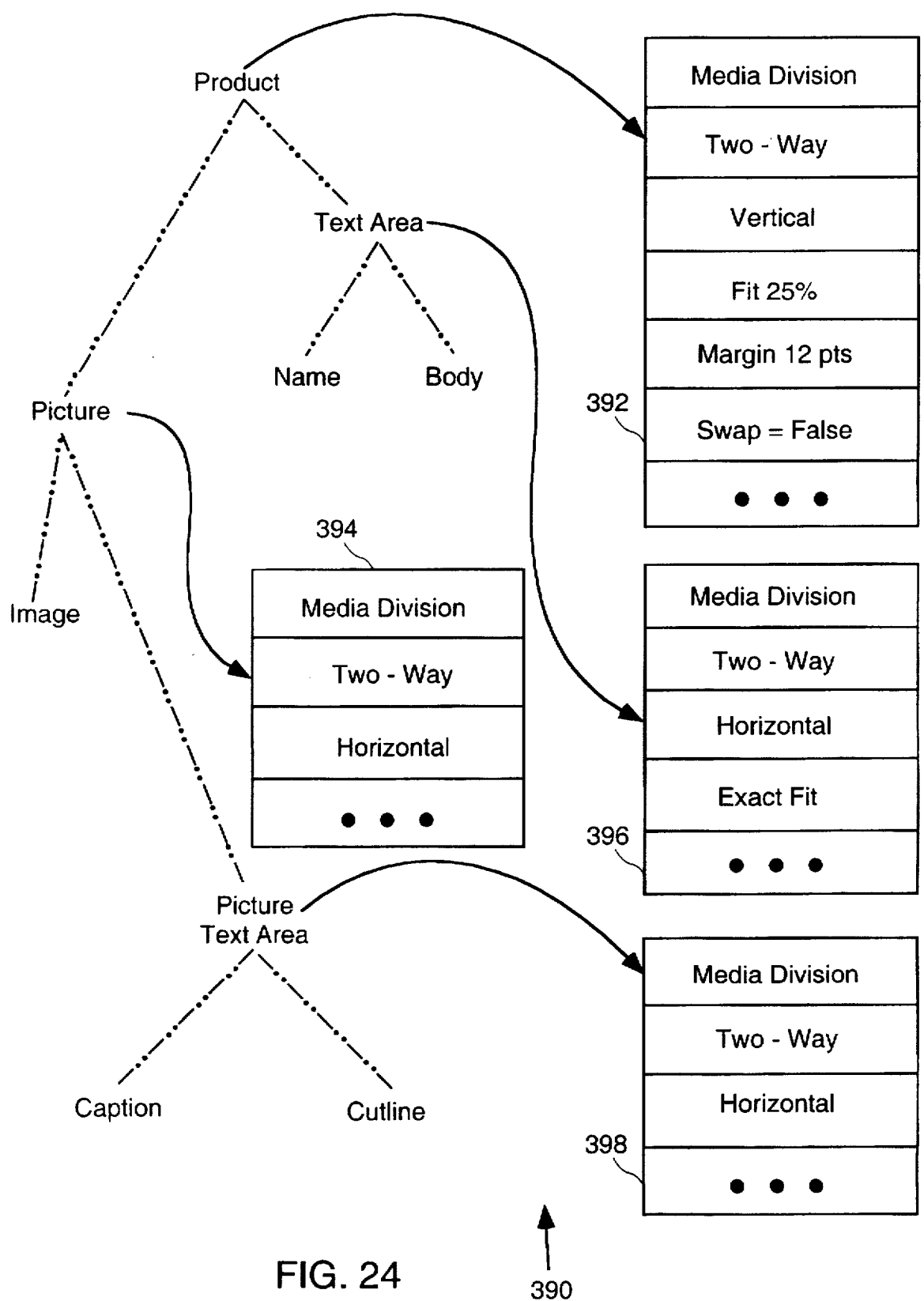
FIG. 24 illustrates an embodiment in which media division objects are associated with various components of the media tree of FIG. 23c.

FIG. 23b shows an embodiment of the design tree 380 representing the design hierarchy for the example product of FIG. 23a. The top level component Product has three children, namely Picture, Name and Body. The intermediate component Picture contains three subcomponents, namely the Image, the Caption and the Cutline. It should be noted that the design tree 380 provides a hierarchical break down of the organization of the example product, but is not required to provide information as to the layout of each individual component. On the other hand, the media tree 390 of FIG. 23c provides more detailed information about the layout of each of the components within the design tree by way of properties of the media facet of each component. Although not shown, each component of the media tree has an associated extent defined by various properties, indicating the position within the media where the component is located.

The media tree 390 of FIG. 23c may be thought of as inherently representing the geometric containment of regions within regions. In other words, each node or component of the media tree corresponds to a region on a page (for paper page media) or to some other region for a different media. The media tree 390 has a root Product with two children Picture and Text Area. The Picture component indicates the left hand side of the composition in which the picture information will appear. The Text Area component indicates the right hand side of the composition in which the appropriate text will occur. The Text Area component has two children Name and Body. The Picture component has two subcomponents, Image and Picture Text Area, while Picture Text Area has children Caption and Cutline. In a geometric sense, the component Picture has been divided horizontally into two regions by a virtue of its having the two children Image and Picture Text Area. This can be seen from the example product of FIG. 23a in which the image appears above the text of the picture (including the caption text and cutline text). By convention, a region that is divided by a horizontal line into an upper part and a lower part is termed a "horizontal" division, while a region divided by a vertical line into parts side by side is termed a "vertical" division.

This horizontal division of the region for Picture may be contrasted with the vertical division of the overall Product component. That is, between the Picture component (representing the picture region on the left hand side) and the Text Area component (representing the text region on the right hand side) there is a vertical division of information between the picture and the text area as can be seen from FIG. 23a. In FIG. 23a, the picture information appears on the left hand side of the composition while the text area contains textual information that appears on the right hand side of the composition. Also, the component Picture Text Area has two subcomponents Caption and Cutline. Because Caption and Cutline appear one above the other, the picture text area region has been divided horizontally. Similarly, the Text Area component is divided horizontally into a Name component and a Body component. An embodiment of a technique for specifying how these various components are divided either vertically, horizontally or otherwise will be discussed below with reference to FIG. 24.

In this simple example, both the design tree and the media tree appear fairly similar. However, in a more complex composition, the design tree and media tree may be quite different. For example, consider the body text of FIG. 23a. Currently this body text only appears on one page. Thus, the body text may be contained in one media region of the page and only one media component is needed in FIG. 23c to represent the location of the body text on the one page. However, if this body text were to extend into a second page, or to be split across columns, this body text would be represented by different media components in the media tree. While at the same time, the design tree would still represent the body text by a single component Body. In this case, the design and media trees would appear differently. Also, it should be appreciated that other more complex representations of information in a design tree and a media tree are possible. In another example, in an HTML version of a brochure with a home page having various products on subsequent pages, the live link present on the home page is part of the products by design, but is part of the first page by media (i.e., far from other product components).

For illustrative purposes, the design tree of FIG. 23b and the media tree of FIG. 23c are presented as separate trees. However, it should be noted that these trees have various of the components in common. For example, the components Product, Picture, Name, Body, Image, Caption and Cutline are components that are common to both trees. Accordingly, the design and media trees of FIGS. 23b and 23c may be more appropriately viewed in a single, yet more complex tree structure of FIG. 23d. In this example, it may be seen how various components are shared between the two trees, while at the same time, the media tree has additional components such as Text Area and Picture Text Area. For example, because the name and body of the example product of FIG. 23a occur together in a particular media region, they are represented below a media component Text Area within the media tree below the component Product. This additional media component helps to define a media region for both the name and the body. In a similar fashion, the picture of FIG. 23a may be viewed in a geometric sense as being divided into an upper media region representing the image, and a lower media region representing the text for the picture which in this case is the caption and the cutline. Thus, in the media tree both the caption and the cutline of FIG. 23a are contained within a particular media region that is appropriately designated a Picture Text Area in the media tree.

An embodiment of a technique for representing the concept of dividing a media region is shown in FIG. 24. FIG. 24 shows in more detail the media tree 390 of FIG. 23c along with the corresponding media divisions that assist in the division of the media for its components. The media tree uses a media division at each component in order to decide how to divide the available region for that component among the children of that component. In other words, each parent component which represents a particular region, or extent, is responsible for placing its children within that region or in some relationship to that region.

A media division may be viewed as a set of properties of a particular component describing a set of rules that dictate a layout for the children of that component. A media division may include any number of different properties and may divide up an extent of a component in a variety of manners. By way of example, specific media divisions are illustrated in FIG. 24, and particular types of media divisions will be described below with reference to FIGS. 25 through FIG. 28. The properties, rules and values for a media division may be represented as being associated with a particular component in any suitable manner. By way of example, a media division may be represented as a separate object that is linked to a particular component. The media tree 390 of FIG. 24 illustrates how the components Product, Text Area, Picture and Picture Text Area each have an associated media division. The use of these different media divisions will now be explained.

The media division 392 associated with the Product component may have any number of properties associated with it that help define how the media region for Product may be divided amongst the children of Product. Media division 392 shows various properties and values associated with the Product component. By way of example, media division 392 has a property with a value "two-way" indicating that the media region for Product should be split into two pieces for two different children. The value "vertical" indicates that the media region for Product should be split by a vertical line into a left side and a right side as can be seen in FIG. 23a. The value "fit 25%" indicates that the first child on the left hand side of the region allocated for Product component should be placed into an absolute measurement of 25% of this region. The value of "margin 12 points" indicates that a margin 12 points wide will separate the region for each child. The property "swap" with the value of "false" indicates that the fit value of 25% should be measured from the left hand edge of the parent region and not the right hand edge.

The component Text Area has a media division 396 that is also a two-way division thus providing two regions for components Name and the Body within the text region of their parent component. Unlike media division 392, media division 396 is a horizontal division meaning that a horizontal line divides text area into a top portion and a bottom portion for the text of the name and the body respectively. This media division also has an "exact fit" property value indicating that the name and the body text should not be allocated to a particular percentage or absolute measured portion of the region of the parent, but that a first child (for example, Name) should be allocated as much space as it needs, and that the remaining space should be allocated to the second child, for example, Body Text.

The component Picture has a media division 394 also indicating that its region should be split in a horizontal fashion into two portions for its two children Image and Picture Text Area. The component Picture Text Area has a media division 398 which also splits the region allocated for it horizontally into two portions for its children, Caption and Cutline.

It should be appreciated that many other types of properties and values may be included in a media division to specify how a child may be placed within the extent of the parent or to specify how a child may be placed in relationship to the parent. It is not always required that a child be placed within the region of the parent; the child may also be placed outside the region allocated to the parent. By way of example, the fit property for a media division may be an absolute fit or exact fit. An absolute fit may give a percentage of the region to be allocated to the child, may give specific media units indicating how much region should be occupied, or may give an aspect ratio for the child. An exact fit value in a media division indicates that the first child placed is given as much of the region as it requires and the rest of the region is left over for the second and subsequent children. Other properties that are useful in a two-way media division include bottom-up versus a top-down fit, the type of balance (e.g., absolute, exact, negotiated), optimal place for a dividing line, minimum or maximum acceptable dividing line, acceptability of a dividing line away from optimal, options for treating text/content of a child that flows to a different page (e.g., keep second child on initial page, move second child to end of flow on another page), no page break, break page if forced, always break page, etc.

FIGS. 25 through FIG. 28 illustrate various types of media divisions that may be used in embodiments of the present invention. It is contemplated that other kinds and forms of media divisions are possible. FIGS. 25a–25f illustrate examples 400 of a one-way media division. A one-way media division is used when a parent component has only one child component and the parent component is attempting to place that child component in some relationship to the region occupied by the parent component.

FIG. 25a is an example of a child component 402 being placed in the interior of a region occupied by a parent component 404. Such a one-way media division may place the child in relationship to the parent by measuring a margin from each of the edges of the parent region. FIG. 25b is an example of a child component 406 being placed in a corner region of the parent component 408. FIG. 25c is an example of a child component 410 being placed along the edge of a region occupied by the parent component 412. FIG. 25d is an example of a child component 414 being placed in a location that overlaps with the region occupied by the parent component 416. FIG. 25e is an example of a child component 418 placed within the region occupied by the parent component 420 yet in a different orientation to that of the parent. FIG. 25f is an example of a child component 422 being placed at a distance from the region occupied by the parent component 424. A child component may also coincide completely with the region occupied by the parent component, or may occupy any portion of the region of the parent component, such as a left-hand side or a right-hand side.

Figure 26A:
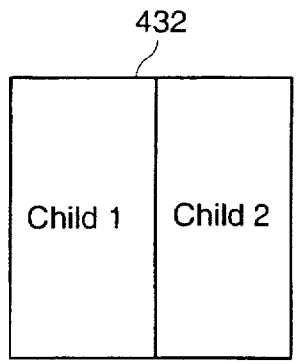
FIGS. 26a–26h illustrate examples of possible geometries for a two-way media division.
Figure 26B:
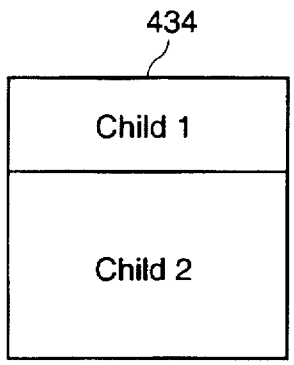
Figure 26C:
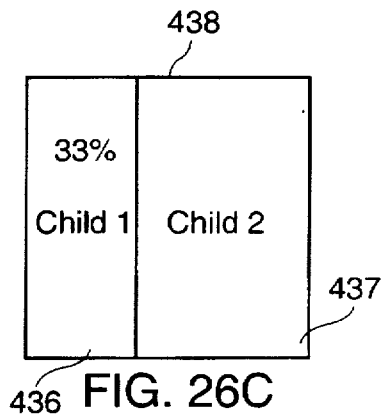
Figure 26D:
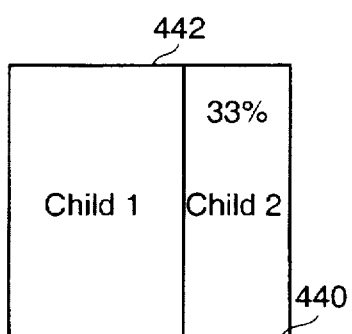
Figure 26E:
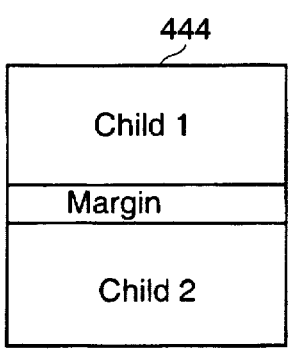
Figure 26F:
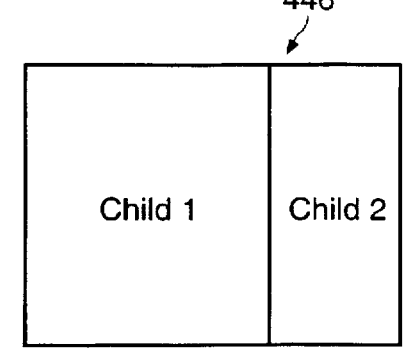
Figure 26G:
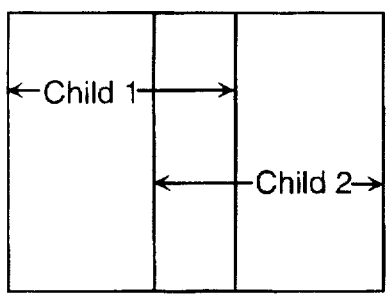

FIGS. 26a–26h illustrate examples 430 of a two-way media division. A two-way media division may be used when two children components must be placed in some relationship to the region occupied by the parent component. A two-way media division may also appear as shown in FIGS. 25a through 25f in which one child component corresponds to the child component shown in FIG. 25, and the second child component corresponds to the parent region of FIG. 25. The two child components of a two-way media division may also overlap one another in any fashion irrespective of the location of the parent region. FIG. 26g is one possible example of two child regions overlapping.

Figure 26H:
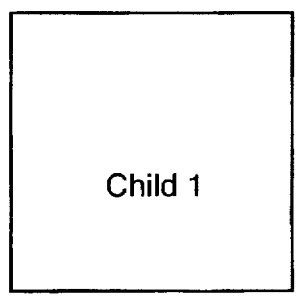
Figures 26A, 26B, 26C, 26D, 26E, 26F, 26G, 26H:

FIG. 26a is an example of a vertical two-way media division in which child 1 occupies a left hand region of the parent region 432 and child 2 occupies a right hand region. FIG. 26b is an example of a horizontal two-way media division in which child 1 occupies a top portion of the parent region 434 and child 2 occupies a lower portion. FIG. 26c is an example of an absolute fit two-way media division in which an absolute value of 33% indicates a region 436 for child 1 and the remaining region 437 is left over for child 2. FIG. 26d is similar to FIG. 26c expect in this example the swap property has been set to "true" indicating that the 33% absolute value should be measured from the right hand edge. In this example then, child 2 occupies 33% of the parent region 442 (region 440) while child 1 occupies the left over region 441. FIG. 26e is an example of a horizontal division that has a margin between a child 1 and a child 2 inside a parent region 444. FIG. 26f is an example of a two-way media division 446 in which child 2 is placed adjacent to child 1; in this example, child 1 coincides with the parent region. FIG. 26g is an example of a two-way media division 448 in which child 1 overlaps the region occupied by child 2. FIG. 26h is an example of a two-way media division 450 in which child 1 is placed apart from the region occupied by child 2; here, child 1 coincides with the parent region.

Figure 27A:
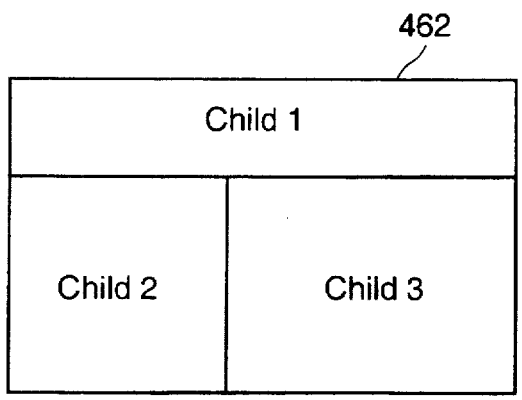
FIGS. 27a–27c illustrate examples of possible geometries for a three-way media division.
Figure 27B:
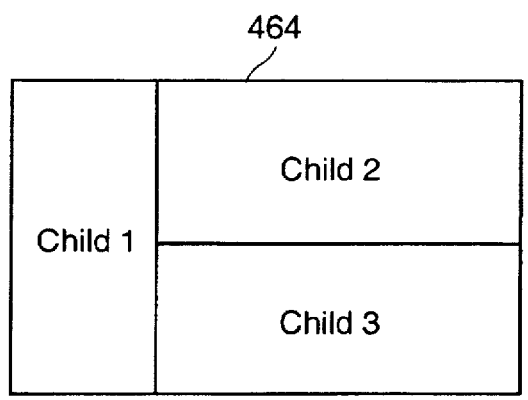
Figure 27C:
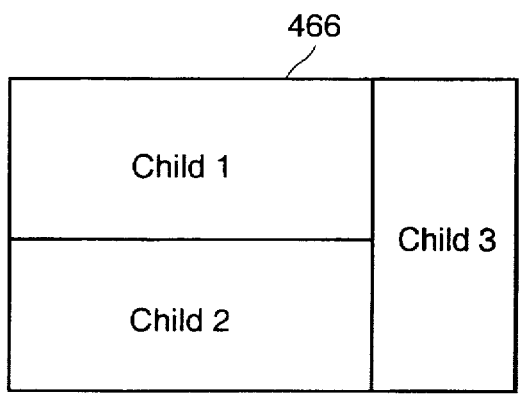
Figure 27D:
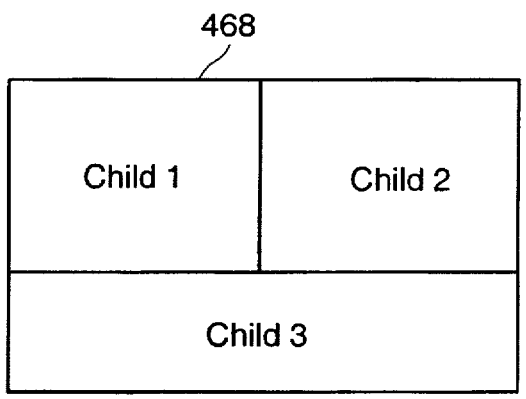
Figure 27E:
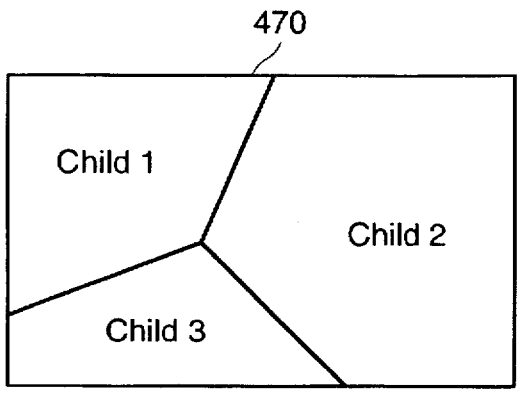
Figures 27A, 27B, 27C, 27D, 27E:

FIGS. 27a–27e illustrate examples 460 of three-way media divisions. FIG. 27a is a first example of how a parent region 462 may be divided amongst a child 1, a child 2 and a child 3. FIG. 27b is a second example of how a parent region 464 may be divided amongst three children. FIG. 27c is a third example of how a parent region 466 may be divided amongst its three children. FIG. 27d is a fourth example of how a parent region 468 may be divided amongst three children. FIG. 27e is a fifth example of how a parent region 470 may be divided between three children in a non-rectangular fashion. It should be appreciated that for any media division, the region occupied by a child may be specified in any manner, and not necessarily by a rectangular coordinate system. For example, a two-way media division may split a parent region by an angular or curved line, and not necessarily by a horizontal or vertical line.

Also, a three-way media division may appear as any of the two-way media divisions in which a third rectangle (or other shape) is placed in some relationship to the other two child regions, such as inside, next to, or overlapping. Also, a three-way media division may only specify the relationship of the three child regions irrespective of the location of the parent region. For example, a three-way media division may specify a relationship in which three child regions are adjacent in some manner, are overlapping, or are each separated by a certain amount of space.

FIGS. 28a–28e illustrate examples 480 of an N-way media division. An N-way media division indicates a region of media that is being allocated for any number of children. In a preferred embodiment, an N-way media division refers to allocation of a parent media region using horizontal divisions. For example, FIG. 28a is an example of an N-way media division in which the parent region 482 is being divided into absolute percentages for each of its children (which may be of any number). FIG. 28b is an example of a top-down exact fit allocation in which the parent region 484 is being filled by its four children in an exact fit fashion and the extra media is left over at the bottom of the parent region 484. FIG. 28c is another example of an exact fit media division in which the parent region 486 is filled by exactly fitting its three children into the region and the extra space in the region is divided up equally and interspersed before and after each child. FIG. 28d is another example of an exact fit media division in which the three children are fit exactly into the space they require in the parent region 488 and any extra space in the region is inserted between the children. FIG. 28e is an example of an abstract parent region 490 that is being divided up into any number of regions for any number of children that the parent may have. It should be appreciated that a parent region may take many forms and may be divided up in any fashion, including allocating a child region outside of the parent region.

Many other types of media divisions are possible. For example, a three-dimensional medium may be divided up into three-dimensional units. A media made up of sound or video may be divided up into time units of sound or video. Also, a media division that represents a whole page of a media is also contemplated.

PROCEDURAL EMBODIMENTS OF THE PRESENT INVENTION

In addition to the tree representations, media divisions and other embodiments of the present invention described above, additional embodiments of the present invention relate to techniques for automatically adjusting the content, design and media of a composition. For example, if a user adds content in the form of a text or a picture (for example) to a composition, the present invention is able to automatically fit that content to the media by either adjusting the content, changing the design, or reformatting the media layout for the content. Also, for a given content in a composition, the user may also choose a new design for that content and the present invention will automatically reformat the content in that new design. And furthermore, if the user has specified a particular content in a specified design, the user may utilize embodiments of the present invention in order to render that content into different media such as screen media, paper page media, HTML media or other.

Figure 29:
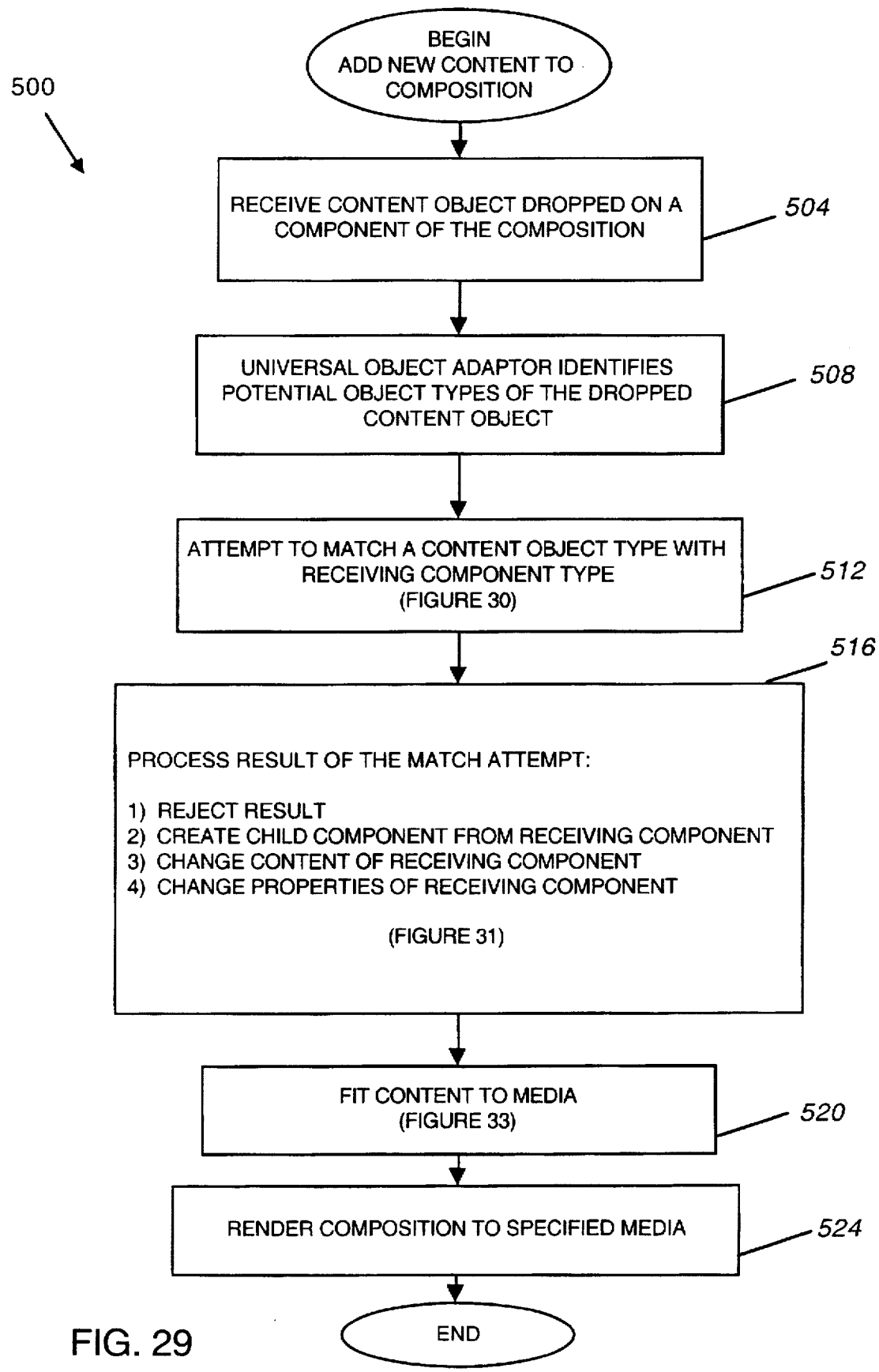
FIG. 29 is a flowchart illustrating a method suitable for adding new content to a composition according to one embodiment of the present invention.
Figure 35:
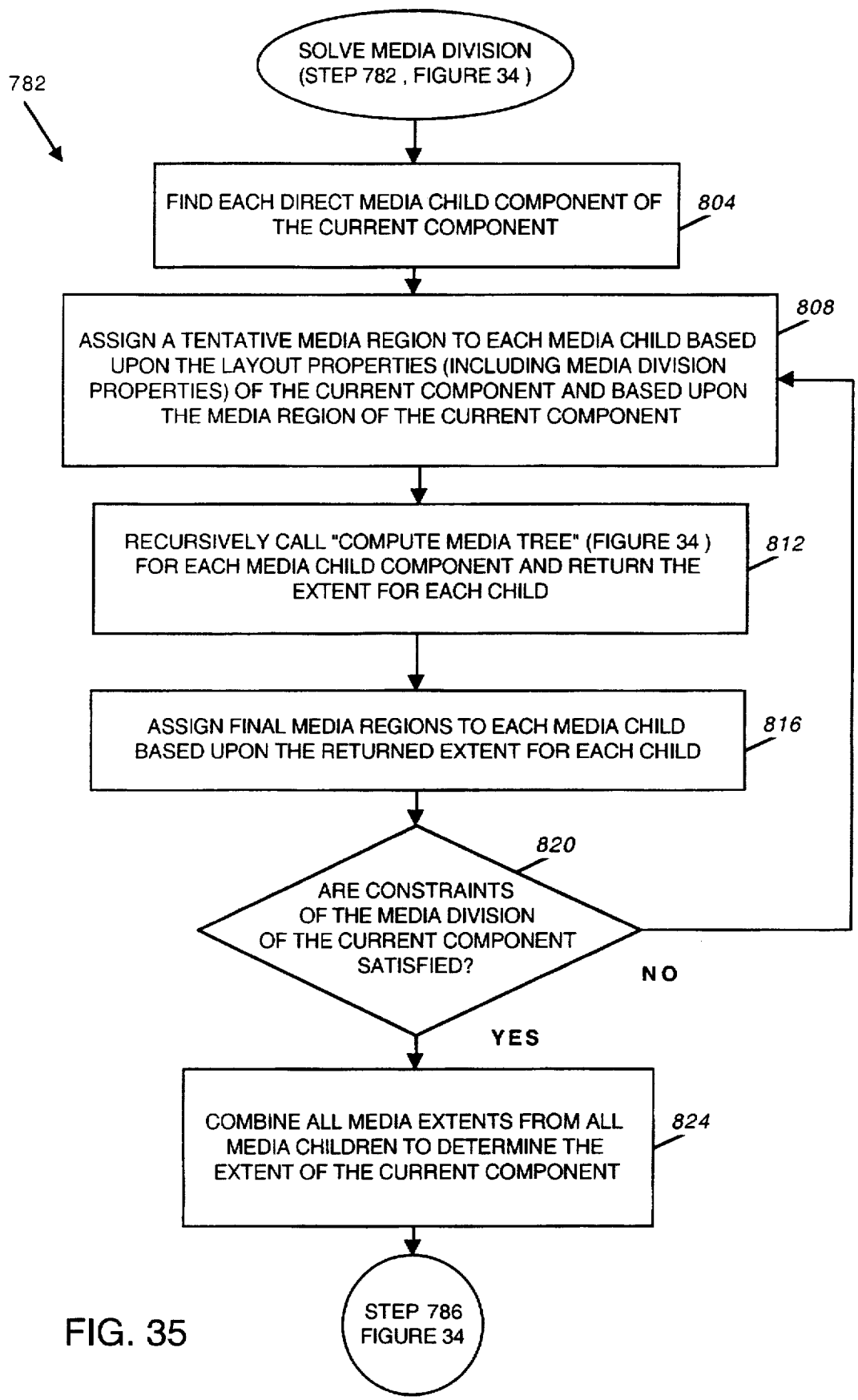
FIG. 35 is a flowchart illustrating one embodiment of the solve media division step 782 of FIG. 34.
Figure 36:
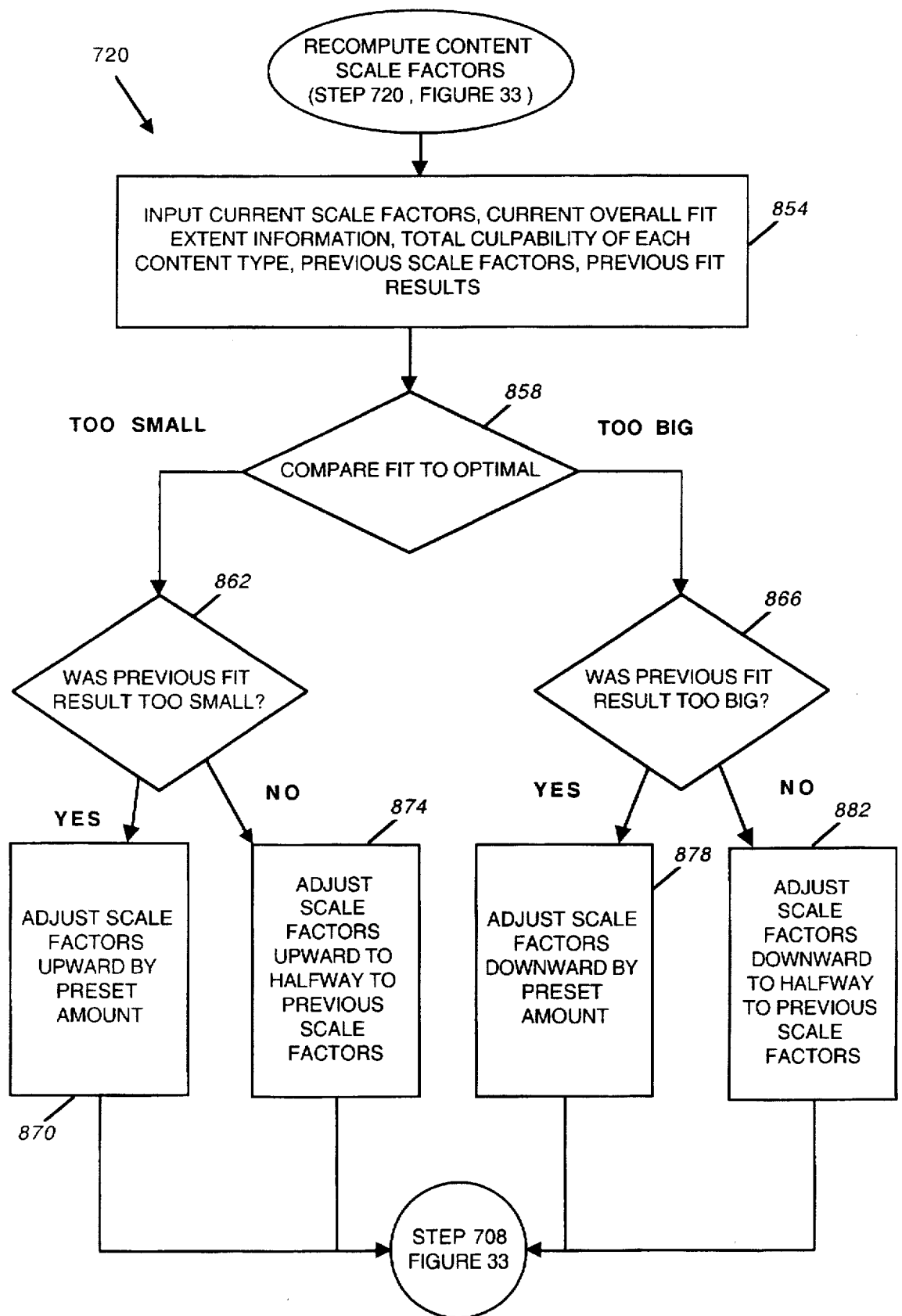
FIG. 36 is a flowchart illustrating one embodiment of the recompute content scale factors step 720 of FIG. 33.
Figure 37:
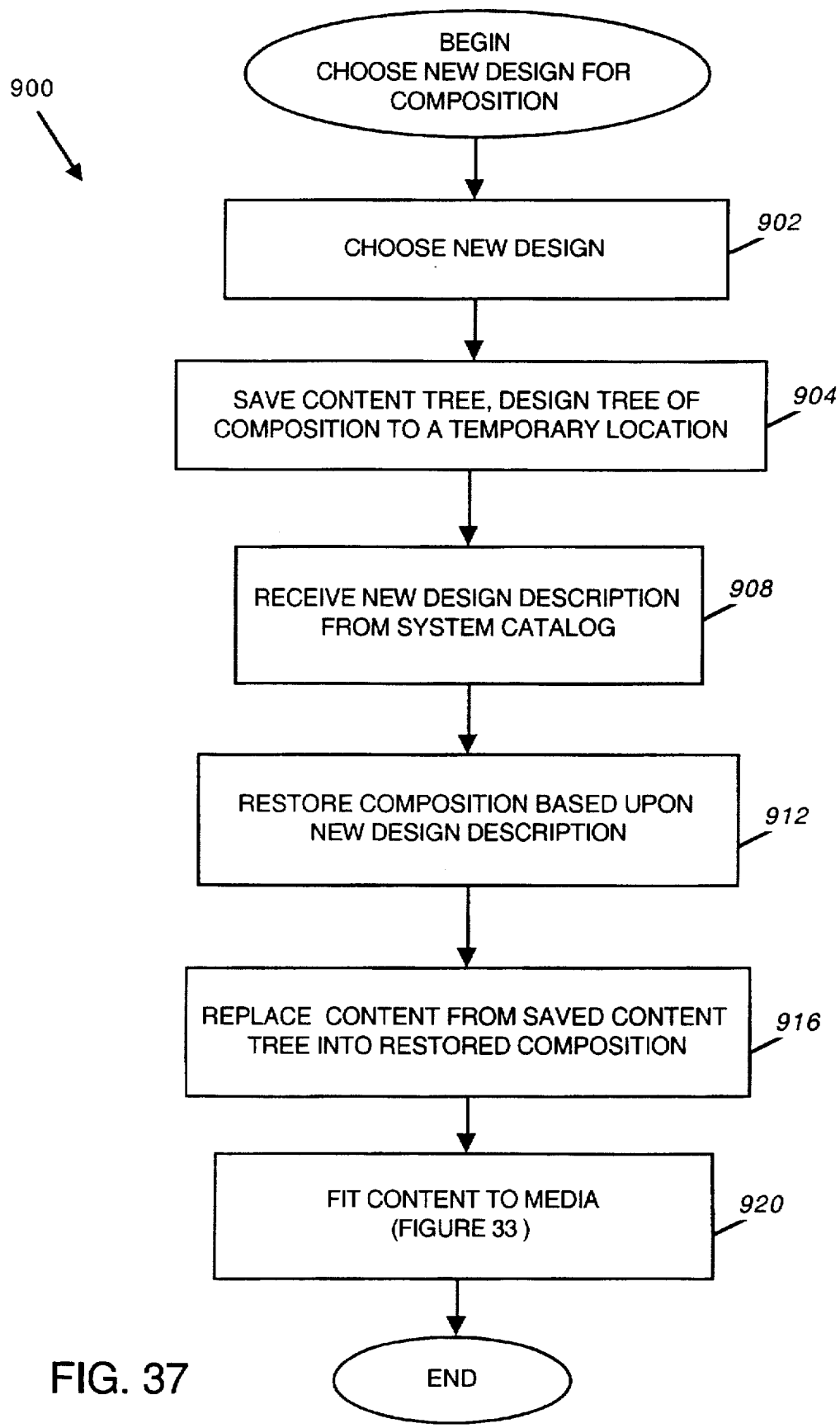
FIG. 37 is a flowchart illustrating a method of choosing a new design for a composition according to one embodiment of the present invention.

The following FIGS. 29 through 38 relate to various embodiments and techniques for performing this automatic fitting of particular content having a specified design into a particular media. FIG. 29 describes an embodiment in which new content is added to a composition and the present invention is able to automatically fit that content to the media. FIG. 37 relates to an embodiment in which the user chooses a new design for a particular composition and FIG. 38 relates to an embodiment in which the user wishes to render particular content into a new medium. The flowcharts for these embodiments will now be discussed.

FIG. 29 describes an embodiment of a technique for adding new content to a composition. The composition to which the content is being added may be a document shell, such as a blank design form, or may be a composition that is in the process of being built, or a composition that is already completely filled with content such as text and images. In a first step 504 a piece of content is dropped on a component of the composition. For example, the user may indicate a location within the composition to which the content is to be dropped via drag and drop or other technique. This location typically corresponds to a receiving component of the design tree of the composition. For example, a user may drop a photograph upon a blank outline of a region for an image in a composition.

In a next step 508 a universal object adaptor identifies potential object types of the content that was dropped. The content that is dropped may be interpreted as a single object with multiple types, or may be an aggregate of different types within a single object. A wide variety of potential object types are possible. By way of example, standard types may be text, hypertext, database records, objects/applets/components, audio/video, three-dimensional models (e.g., VRML), real-time data, images, tables, etc. Other types are possible, for example, text may be plain text, rich text, bitmap, etc. A picture may be a bitmap, a vector drawing, GIF, JPEG, or other. Also, a given content object may possibly be interpreted as being of different potential types. For example, an image is typically of just one type, "image", whereas a text paragraph of content may be of type "text", a bit map type, a meta file, etc.

Next, in step 512 an attempt is made to match one of the potential content object types with a type accepted by the receiving component. This step will return a result from this matching attempt which is processed below in step 516. This matching attempt is used to determine if a receiving component can handle the type of the dropped content object. Each receiving component uses a content drop table that includes the list of types that the receiving component may receive in a preferred order. This content drop table is discussed above with reference to FIG. 22. This matching step is also able to place dropped content in a correct location if it was dropped on an incorrect type. For example, if a receiving component may receive pictures or text and a product is dropped upon this component, it may decide to treat the dropped product as text. Also, if text is dropped on a picture that only can receive images, this text may appear below the picture as a caption. The process by which this matching attempt occurs will be discussed below with reference to FIG. 30.

Other situations in which content is placed at a position that does not include the drop point may be handled according to a design choice. For example, in a brochure design, dropping a picture upon a picture may always replace the content completely. In a report design, dropping a paragraph upon an existing paragraph may insert the dropped paragraph at the drop point. As will be explained below with reference to FIG. 30, if a receiving component cannot accept a drop, the media facet container of the receiving component is searched in order to find an appropriate component. For example, if a picture is dropped upon text in a brochure, the text may not accept it. The product containing that text will accept the picture by way of replacing the content of the existing picture for that product. Also, if a complete product is dropped upon text, the text component will not accept it, and the existing product containing that text will not accept the dropped product either. But, the document will accept the dropped product and will insert a new product component in addition to other existing products. In addition, in a report design, for example, a dropped picture on text may be accepted, unlike the example given above. That is, in a report design, a text component may accept a dropped picture and create an in-line illustration component. It should be appreciated that other protocols and design choices regarding how to treat content dropped at various locations may be possible.

Once the match attempt of step 512 finishes, the result of this match attempt is processed in step 516. Four examples of possible results from this match attempt are shown in step 516. Other results are also possible. A reject result may occur if an attempt is made to drop content onto a component that cannot accept any potential object types of the content. In this scenario, the system may respond by indicating to the user that a drop may not occur, or may accept the drop and then reject it in some fashion and indicate this result to the user. In one embodiment for a reject result, a warning icon may appear over an item to be dropped when the item is positioned over a receiving component that cannot process the drop. This feedback may happen in real time as the user is dragging content over a composition.

A second result might be that a child component needs to be created from the receiving component. This may occur if structured text or other text is being added to a region of text already in place. A third result may indicate that the content of the receiving component may need to be changed. This may occur if the user attempts to drop a new piece of content wholesale over an existing piece of content with the intention of replacing the existing content. A fourth result may be that various properties of the receiving component may need to be changed. This may occur if a new font is dropped upon a receiving component already having text in a different font. In this case, the font properties of the receiving component would need to be changed. In various of the results of step 516 the design tree may be changed by either adding or deleting components. This step 516 will be discussed in more detail below with reference to FIG. 31.

In step 520 the current content of the composition is fit to the indicated media. This step takes the existing content that the user has specified within a particular design, and will adjust the content in a suitable fashion in order to fit it to the required media region. This step will be discussed in more detail below with reference to FIG. 33. This step may involve changing the overall size and form of the media if design properties permit this change. For example, the number of total pages may be fixed for a brochure, but may be able to be expanded for a report design.

Next, in step 524 the entire composition including the content tree, the design tree and the media tree is rendered to the specified media. For example, if the specified media is screen media, then the system will render the composition for viewing on the computer screen. Likewise, if the specified media is paper page media, the system will print onto paper pages, but may also allow the paper page media to be viewed on a computer screen via a print preview option. In a similar fashion, a composition rendered to HTML media may be formatted for presentation in a Web page format and translated into the HTML language, although these same Web pages may be prepared for viewing on a computer screen via a print preview option. A composition may be rendered by taking the extent for each content element along with information from the design tree for that content element and outputting this information into the desired media. For example, a composition may be rendered to paper media by using standard drivers of a computer system to output the information.

A composition may be rendered to media in a wide variety of manners. By way of example, rendering to paper media may be done by using operating system and/or device API's and drivers. Rendering to a computer screen may also be done by using operating system and/or device API's and drivers. Rendering to HTML format may be done by using macros in media facet prototypes, and by using publicly available HTML specifications. Rendering to an OLE object may done by reference to published OLE interfaces. Rendering to other applets may also be done by reference to published specifications.

Figure 30:
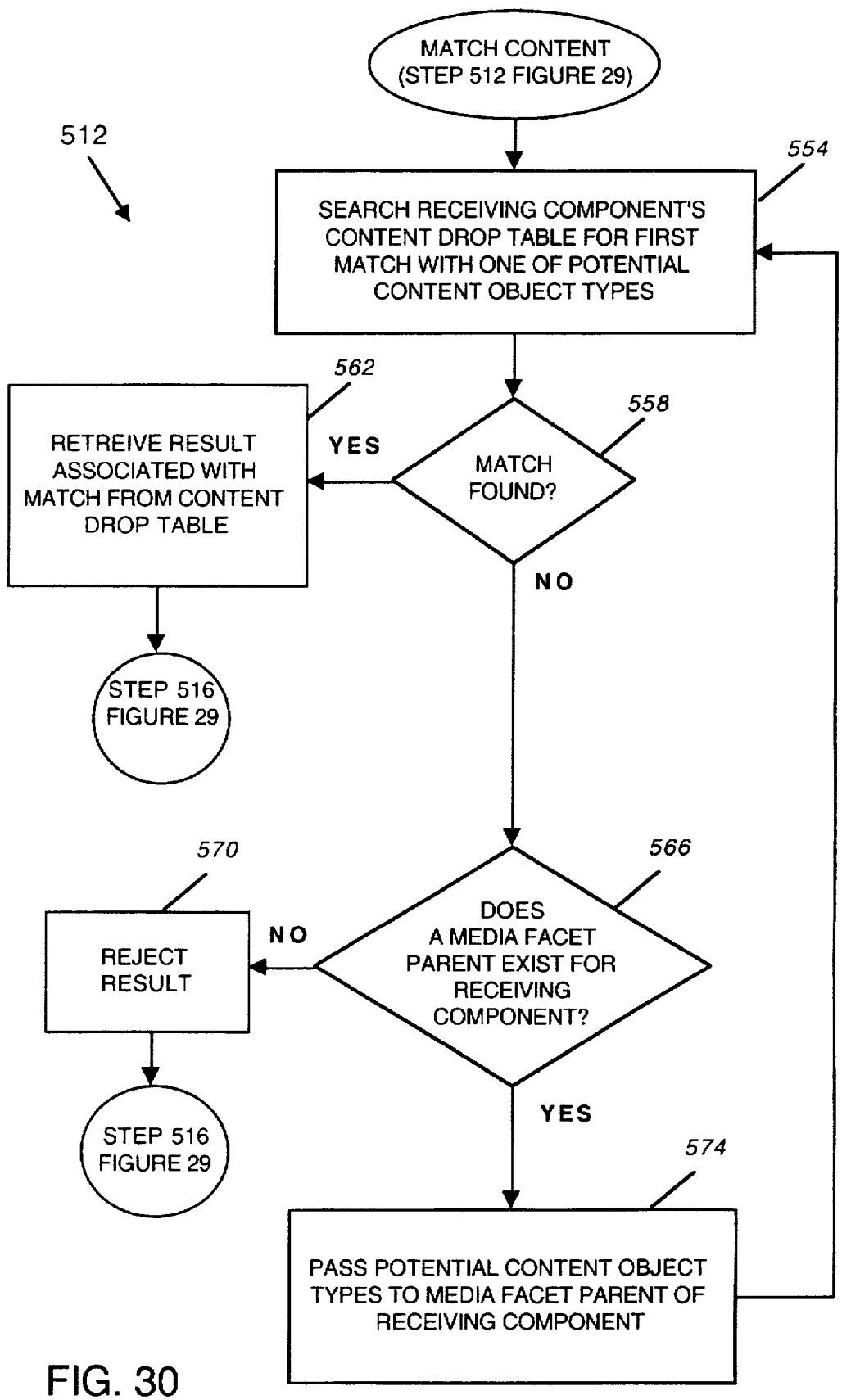
FIG. 30 is a flowchart illustrating one embodiment of the match content step 512 of FIG. 29.

FIG. 30 describes the match content step 512 of FIG. 29. Once the content object has been dropped upon a receiving component, this step tries to match a component type in the composition to the dropped content. For example, the user may drop a content object in an incorrect location, or upon a receiving component that cannot accept that content. This step will make use of the content drop table of FIG. 22 in order to assist in matching the dropped content with a receiving component. In step 554 a search is made through the receiving component's content drop table to find a first match with the prioritized list of new subcomponent types for one of the potential content object types for the dropped content.

For example, referring back to the content drop table of FIG. 22, if the dropped content type has a potential type of "text", the highest priority new subcomponent type of In-line Body Paragraph will match first and indicate that a new subcomponent type of In-line Body Paragraph should be created. However, if the dropped content is only of type "image", then the drop table will first try to match In-line Body Paragraph and In-line Heading to the content type, will fail, and will then match In-line Illustration with "image". Typically, a sequential search is done through the content drop table to find a preferred match. It is preferable to match a high priority table entry with any of the potential object types. In other words, the table will attempt to match the highest priority content drop table entry with any of the potential object types before attempting to match a lower priority table entry with any of the potential object types.

Step 558 test whether a match has been found in the content drop table. If a match has been found, then in step 562 the result associated with this match from the content drop table is retrieved and returned to step 516 of FIG. 29 for processing. The result from the content drop table indicates one of the possible results of step 516 along with a new type of component to be created if necessary. It should be appreciated that many other types of results may be associated with a match in the content drop table and may be processed as well in step 516. A result might also be implemented by specialized code associated with a specific component or component type.

On the other hand, if a match is not found in step 558 then control moves to step 566. For example, if the user attempts to drop a large picture onto a tiny caption there will be no match. Step 566 attempts to find a receiving component that may match the type of the dropped content object by working up the media facet tree. If no media facet parent exists for the receiving component, then in step 570 a reject result is returned to be processed by step 516 of FIG. 29. However, if a media facet parent does exist, then in step 574 these potential content object types are passed to the media facet parent of the receiving component to see if a match can be found with either that media facet parent or with one of its other children. An example of this process may be illustrated with reference to FIG. 23c. For example, if text is dropped upon the Image component, step 558 may not find a match, but then would pass the dropped text up to the parent media component which is Picture. Picture in turn may then pass the dropped text down to one of its children such as Caption or Cutline for the text to be dropped into that position. In this fashion, a dropped content object may be routed to a correct location even if it is dropped in the wrong spot. In the case where Picture does not yet have a Caption child, the font of the dropped text may become a parameter of the construction of a Caption.

Once the potential content object types have been passed to the media parent (which is then treated as the receiving component), the process loops back up to step 554 in order to search the content drop table for this new receiving component in order to find a possible match for the dropped content. The flow continues in this fashion until one of the possible results is returned to step 516. Because this procedure loops, all parents in the media facet tree will be checked for a match until there is either a match or a reject result.

Figure 31:
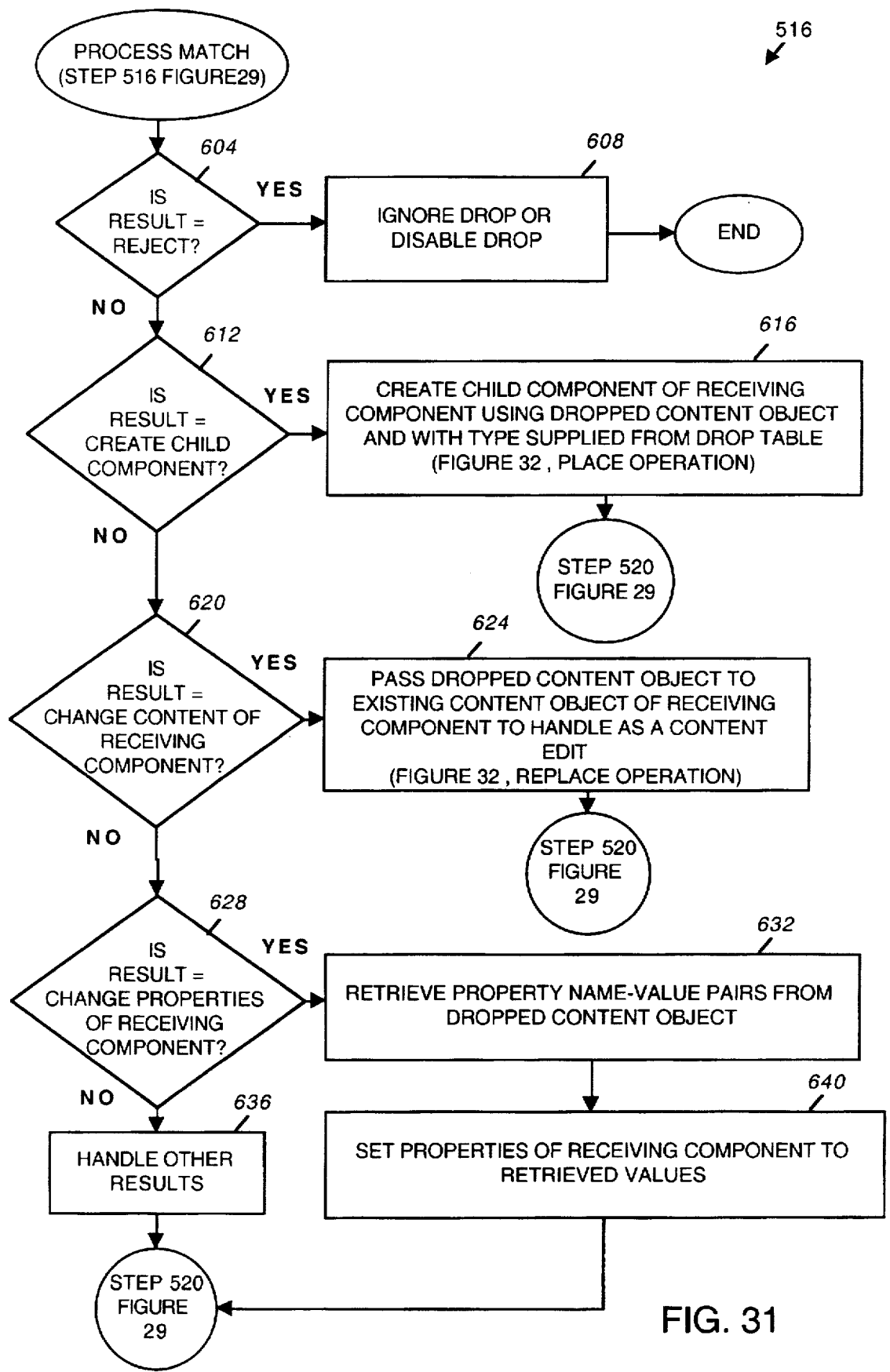
FIG. 31 is a flowchart illustrating one embodiment of the process match step 516 of FIG. 29.

FIG. 31 describes the process result of match attempt step 516 of FIG. 29 in more detail. The step receives a result from the match attempt previous step and processes that result. A first step 604 determines whether the result was to reject the drop attempt. If the answer is yes, then in step 608 the drop is either ignored or disabled in some fashion and then the procedure of FIG. 29 ends. The drop may be ignored if the user had been allowed to perform the drop or the drop may be disabled in real time as the user is attempting to drop content upon a composition.

Step 612 tests whether the result is "create a child component". If that is the result then in step 616 a child component for the receiving component is created using the dropped content object to provide the content for that new child component and also using the type supplied from the drop table. In this situation, because new content is being added to a new location, it is considered a "place" operation. For example, if text is dropped upon a picture, a new caption may be created instead of the text replacing the picture in the composition. A new component may be created in any suitable manner. By way of example, a construction procedure is associated with each component type. To create a new component, the factory for that component is found, the component is created and the dropped content is associated with the new component. The new component may also inherit information and properties from its parent object as well. In a preferred embodiment the creation method is handled by the prototype of the component. Step 616 will be discussed in more detail below with reference to FIG. 32 as a place operation. Once this step 616 concludes, control returns to step 520 of FIG. 29.

Step 620 tests whether the result is "change content of the receiving component". If so, then in step 624 the dropped content object is passed to the existing content object of the receiving component to handle it as a content edit. In this example, a new child component is not being created, but the content associated with the receiving component is being changed, or replaced. In other words, the old content may be removed and replaced with the new content. Various types of edits may be possible in this step. For example, the old content may be replaced entirely, the new content may be inserted into the old content, or the new content may be concatenated with the old content. This step will be discussed in more detail below with reference to FIG. 32 as a "replace" operation. Once this step 624 concludes, control returns to step 520 of FIG. 29.

Step 628 tests whether the result is "change properties of the receiving component". If so, then in step 632 the new property name-value pairs from the dropped content object are retrieved. This situation may occur, for example, when a new font is being dropped upon an existing content object. In another example, if a font is dropped upon a component of a product list type its subcomponents will inherit that new font. This is because a product list component type may not have any text of its own but its subcomponents will. That is, the subcomponents will have associated text, but may not have a text face property of their own. In addition, the retrieved property name value pairs may simply specify new values for existing properties or may also define new properties and values for the existing content object. It may also be that one property of the content is being changed or that many properties are being changed.

Next, in step 640 the current properties of the receiving component are changed to the retrieved properties and values from the dropped content object. This operation may be performed by matching the retrieved values with the corresponding properties of the receiving component. For example, if a new font "Times" is being dropped onto an existing content object that has a font "Helvetica", then the retrieved property font is matched with the existing property font and the new value "Times" replaces the old property value "Helvetica".

It is possible that setting new property values may cause a change in the design tree. That is, a design change might be associated with a particular setting in a property value. For example, a document might include page numbers and a styling property that indicates whether these page numbers will appear or not. If the styling property is changed to indicate that page numbers should not be included with the document, then the design tree representing this document would be changed to remove the components representing the page numbers from the document. Other properties and their values may similarly require a change in the design tree. If a property value indicates a change in the design tree, then the design tree is modified accordingly at this point. Once step 640 has concluded control returns to step 520 in FIG. 29. If the answer to step 628 is no, then other results may be processed at this point before control returns to step 520.

Figure 32:
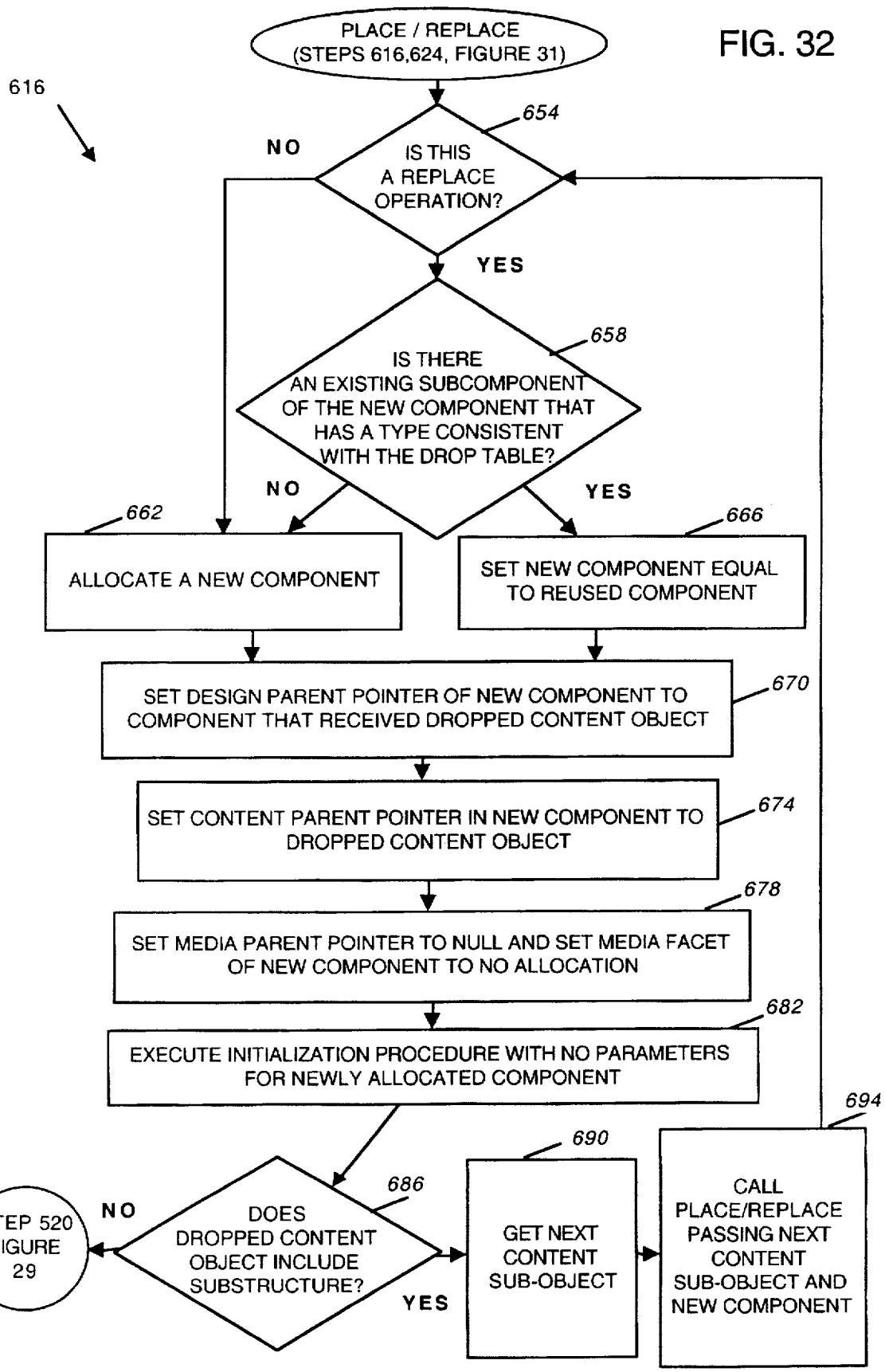
FIG. 32 is a flowchart illustrating one embodiment of the place/replace steps 616 and 624 of FIG. 31.

FIG. 32 describes the place/replace step called from either step 616 or step 624 of FIG. 31. The place/replace operation is used to either place new content into a composition or to replace existing content with new content according to a particular editing operation. Step 654 determines whether this is a place or a replace operation. A place operation is used when a new component needs to be created, whereas a replace operation is used typically when an existing component may be reused. An existing component may be reused because it is desired to preserve its properties, or a portion of its existing content may be reused. If this is a place operation, then in step 662 a new component is allocated. A new component will be allocated using the type matched in the drop table from step 554 of FIG. 30.

If this is a replace operation, then in step 658 the system determines whether there is already an existing subcomponent of the new component that has a type consistent with that matched in the drop table. Because FIG. 32 is a looping operation that will create as many new components as necessary, the new component referred to in step 658 refers to not only the initial receiving component the first time through the loop, but any reused components in further iterations of the loop. Any existing subcomponent that is consistent with the type matched in the drop table will be suitable. The match does not have to be the highest priority type in the drop table, but a higher priority match is preferable. If there is a choice between a replace or a place operation, in a preferred embodiment a replace is preferred.

An example of an existing subcomponent that might be reused may be described as follows. Consider a document having a title where the title appears in a unique font style designed by the user. The user may be replacing the document but wishes to keep the title the same. However, it may be that the new replacing document has a title in a very plain font style. Because the user has previously changed the title to a unique font style, it would be desirable to keep the title in the unique font style. In this example, it would be desirable to reuse the old title (or component) in order to retain the unique font style. Thus, the existing subcomponent representing this title in a unique font would be reused. However, it may be a matter of design choice whether the user wishes to always retain old font styles, or to replace existing font styles with a new font style.

If an existing subcomponent with a type that matches is not found in step 658, then in step 662 a new component is allocated. However, if there is an existing subcomponent that may be reused, then in step 666 the variable new component is set equal to this subcomponent to be reused. Once either step 662 or step 666 has concluded, it is then necessary to modify each of the design, content and media trees in order to insert this new component (whether the new component is newly created or whether it is a reused component).

In step 670 the design tree parent pointer of this new component is set to point to the original component that received the dropped content object. In this fashion, the new component is made a subcomponent of the original receiving component. If this is not the first iteration through the loop procedure of FIG. 32, then the design parent pointer of this new component is set to point to its immediate parent (which may have been created in a previous iteration of the loop). Thus, the design tree is modified to incorporate the new component. Next, in step 674 the content tree parent pointer of the new component is set to point to the dropped content object. If this is not the first iteration through the looping procedure of FIG. 32, then the content parent pointer of the new component would be set to a next content subobject of the dropped content object. In terms of a containment hierarchy, the new component is contained in the dropped content object. In this fashion, the content tree is updated to include the dropped content object (or a next content subobject).

Next, in step 678 the media tree parent pointer of the new component is set to null and the complete media facet of the new component is set to no allocation. The media parent pointer is set to null in order to allow the design facet parent to determine or compute where the new component appears in the layout, while the media facet is not allocated. The attempt to render the new component will then trigger a re-layout resulting in allocation of space for the new component. Once the three trees have been updated, the new component is initialized. In step 682 an initialization procedure for the newly allocated component is executed. This initialization procedure will be executed for a component that has been allocated but not for a component that has been reused. Typically, an initialization procedure sets the properties of the component to their default values.

At this point in the looping procedure of FIG. 32, the procedure is poised to perform a walk of all the substructure included within the dropped content object in order to create components to match these sub objects. If the dropped content object includes no substructure, then this place/replace operation is done and control returns to step 520 of FIG. 29. However, if step 686 determines that the dropped content object does include substructure, then the place/replace operation will perform a looping operation in order to allocate or reuse a component for each of the sub objects within the dropped content object. For example, for a simple image there will be no substructure and the operation will end. However, for structured content 80 such as shown in FIG. 6, a new component will be allocated or reused for each of the title, subheadings and the body text. Structured text is one example of a content object with substructure.

If there is substructure, in step 690 the next content subobject of the dropped content object is retrieved. Next, in step 694 the place/replace operation is called again by looping back up to step 654. The next content subobject retrieved will be passed into the place/replace operation as the next content object, and the new component (which is either a newly allocated component or a reused component) will be passed into the place/replace operation in the place of the receiving component.

The example of FIGS. 19 through 21 may be used to illustrate this situation of FIG. 32. When the imported word processor content 292 is first dropped upon the empty text region 286, the Text Flow component of FIG. 21 is considered the receiving component and the newly created component is a Text Paragraph representing the title "WHO WAS KILROY?" On a second iteration through the place/replace operation, the next content subobject of the dropped content will be the first subheading "Here At One Time" and the component taking the place of the receiving component would be the component that had just been allocated, namely the Text Paragraph component representing the title "WHO WAS KILROY?" In this fashion, the looping procedure of FIG. 32 is able to place all of the structured content found in the word processor content 288 of FIG. 19 into its appropriate place in the design, content and media trees. When all of the sub objects of the dropped content have been placed or replaced, this looping procedure ends after step 686, step 516 of FIG. 29 is done and control returns to step 520.

Figure 33:
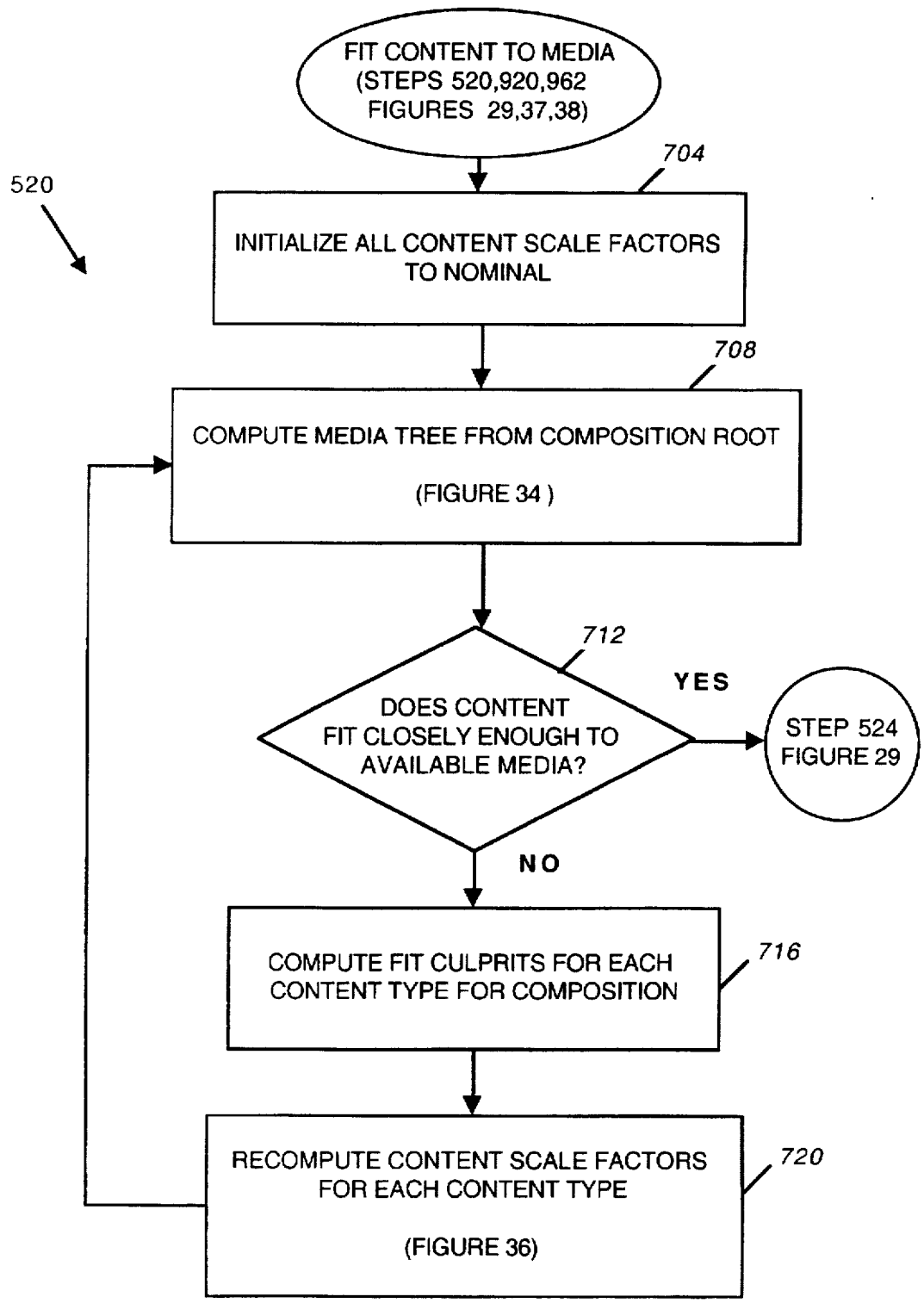
FIG. 33 is a flowchart illustrating one embodiment of the fit content to media step of FIGS. 29, 37 and 38.

FIG. 33 now describes the fit content to media step 520 of FIG. 29. At this point in FIG. 29, new content has been added to the composition. But because most media is limited in some sense (i.e., paper media may be limited to a certain number of pages), it may be necessary to either readjust the content, the design or the media of the composition in order to make the information fit within the media. The information may be adjusted to fit within the desired media in a wide variety of manners. By way of example, the design may be readjusted to allow the content to fit within the available media. Alternatively, the media may be adjusted, i.e. the media may be lengthened, in order to allow the content to fit within the media. That is, the number of pages in a document may be changed, or the calculation of the media divisions may dictate a different layout. Also, the content itself may be adjusted in some fashion to fit within a defined media region. For example, a filler image may be clipped from a larger stock image in order to make everything fit within a page. It should be appreciated that any one these techniques may be used by itself, or in conjunction with the other techniques. Step 520 describes a method for fitting the information of a composition into a media region by adjusting the content and design.

Once new content has been added to a composition, there may be a variety of reasons why the overall content of the composition must be adjusted in order to fit it within the available media. For example, if a page of text is nearly full and a picture is dropped onto this page, the design tree will be changed because a new component is created for the picture. In this situation, not only are the design tree and the content tree changed, but also the media tree will have new regions calculated for the newly dropped picture. In another example, if only additional text is dropped onto a page of text, the design tree would not be changed because the existing text is merely being replaced and no new components would need to be created in the design tree. However, if the addition of new text causes the body of text to overflow onto a second page, then a new page is created and a new text component for that new page is created within the design tree. In addition, the media tree will calculate a region for the newly added text on the second page. Similarly, an added picture to a page of text may push text onto a second page. In all of these situations, either one, two or three of the trees have changed, and the layout must be readjusted in order to fit the available media.

In general, the step of fitting content to media involves the layout of each component element. Fitting content to media starts by walking through the design tree from top to bottom and creating new media components between existing components in the design tree where needed. In an optimization, only a subtree may need to be computed. Tentative regions are calculated for existing media components on the way down through the trees, and as the recursive algorithm pops back up through the trees, these tentative regions are replaced by final regions. If a particular layout does not fit, then global scale factors may be used to adjust each component type.

In a first step 704 all of the content scale factors are initialized to nominal values. A content scale factor indicates how a particular type of content may be scaled either up or down in order to assist in fitting all of the content into the available media. A wide variety of scale factors may be used. In one embodiment, one scale factor is used for each type of content. In other words, each type of content (e.g., text or graphics) may be adjusted by a particular factor in order to either enlarge all content items of that content type, or to reduce all content items of that content type. It is also contemplated that there may be a content scale factor corresponding to each item of content or that a scale factor may apply to any permutation of content items and content types. Also, a scale factor may refer instead to particular design components, or particular regions within a media, in addition to affecting the scaling of content by type. In a preferred embodiment, there is a content scale factor for content of type text, a scale factor for content of type graphics, an opaque content scale factor (for objects such as OLE embedded objects), a white space scale factor, an overlap scale factor and a layout pressure scale factor. Initially, these content scale factors are set to a nominal value, for example, each scale factor is set to 100%.

Once the content scale factors have been initialized, in step 708 the media tree is computed starting from the root of the composition. The media tree is computed by passing to it the design hierarchy embodied in the design tree and walding through this design tree in order to create new media components between design components (if necessary) and to calculate media regions for each of the existing and new media components. This step 708 is a recursive step which will call itself for each component in the design tree. Once this step has completed, each item of content will have an associated extent, or defined region, that indicates how much space within the available media the content uses. This step 708 will be explained in more detail below with reference to FIG. 34.

The compute media tree step 708 also returns overall rich extent information including the combined extents for all descendants in the media tree. Once this information has been returned, the system will know if the document fits overall or not into the available media, and will also know if any particular component does not fit. That is, the information returned will also indicate whether a particular leaf component does not fit, and if not, by how much it does not fit.

Next, step 712 determines whether the content fits closely enough into the available media. If the content does fit then control moves to step 524 of FIG. 29 and no adjusting of the content is required. However, if the content does not fit, then the content may be adjusted in order for it to fit within the available media. If the content is over the available media (an over fit) then the content is defined as not fitting. If the content is under the available media (an under fit), then the content will fit, unless a particular design calls for the content filling as much of the available media as possible. In this situation, the content may be enlarged to fit more closely in the available media. Also, certain thresholds may be used in order to define the meaning of "closely enough". A "leftover" medium threshold may be defined indicating how much extra medium is acceptable if the content is under fit. A "time" threshold may also be used to indicate for how long or for how many times the process has attempted to fit the content to the media. Other thresholds may also be used. If the content does not fit, then flow moves on to step 716.

In step 716 the fit culprits for each content type are computed for the overall composition. In other words, this step determines which types of content contribute to the overall over fit, or to the overall under fit. For each type of content contributing to the non-fit, a value is given indicating by how much that content type contributes (such as a percentage or in absolute units). A fit culprit is determined by reference to the media division of each media component. For example, if a picture placed next to a corresponding body of text occupies more vertical space then the text, then the picture is determined to be the fit culprit for that particular localized region. On the other hand, if a region of text is much longer than a picture placed next to it then the region of text is determined to be the local fit culprit because it contributes more to the over fit of the composition than the picture. Therefore, for a vertical media division typically only one of the components within this vertical division will be determined to be the fit culprit.

For a horizontal media division (where a region is divided by a horizontal line), it may be that one or all of the components within the horizontal division are fit culprits. For example, in a horizontal media division that uses an absolute fit, if a body of text does not completely fill an absolute region, it is not a fit culprit because it is not filling the whole region. However, another body of text that fills an absolute region completely will be determined to be a fit culprit. Likewise, for a horizontal division that uses exact fit, all of the components that are fit exactly into this region will be considered fit culprits because they fill the region completely and do not leave any extra space.

All of these fit culprits are calculated at a local level. However, it may be the case that a child is a local fit culprit but if the parent is not a fit culprit then the local fit culprit is irrelevant. For example, in a vertical division if a group of pictures occupies a left hand portion of the division and text occupies the right hand portion, any one of the group of pictures may be determined to be a local fit culprit on the left hand side. But if overall, the group of pictures occupies less vertical space than the corresponding body of text on the right hand side, then the text is considered the fit culprit for that region and not the group of pictures.

In one embodiment, this step is performed by walking the media tree and by looking at the media divisions to determine local fit culprits and determining whether the local fit culprits may be bubbled up to a higher level. The result of this step is a value that indicates how much each type of content is responsible for the over fit (or the under fit). For example, for a single page paper media where the content overflows by five inches, the result of this step may return values indicating that overall the text content overflows by two inches and that the graphic content overflows by three inches. Once an amount of over fit or under fit is calculated for each content type then control moves to step 720.

In step 720 the content scale factors for each content type are recomputed. This step may change one, many or all of the content scale factors. The purpose of this step is to adjust the content either upward or downward in order to optimize the resulting content so it will fit within the available media. In one sense, the compute media tree step 708 may be viewed as somewhat of a black box into which are input the various content scale factors. Step 720 adjusts these scale factors in a particular fashion in order to achieve a different result from the compute media tree step 708. The desired result is a close enough fit as possible, as determined by step 712. Step 720 takes into account various inputs such as the over fit or under fit of each content type, how the close the current fit is, how close a previous fit attempt was, the previous content scale factors used and the current content scale factors. Step 720 may be performed in a variety of manners. This step may be performed by a function maximizer for nonlinear discontinuous functions. By way of example, this step may be performed by using a simulated annealing technique, or other techniques such as genetic algorithms. One technique for performing this step will be discussed in more detail below with reference to FIG. 36.

Once the content scale factors have been recomputed for each content type in step 720, then the procedure of FIG. 33 loops back to step 708 in which the media tree is again computed from the composition root using the new content scale factors. The procedure continues looping in this fashion until step 712 determines that the content does fit closely enough to the available media.

Figure 34:
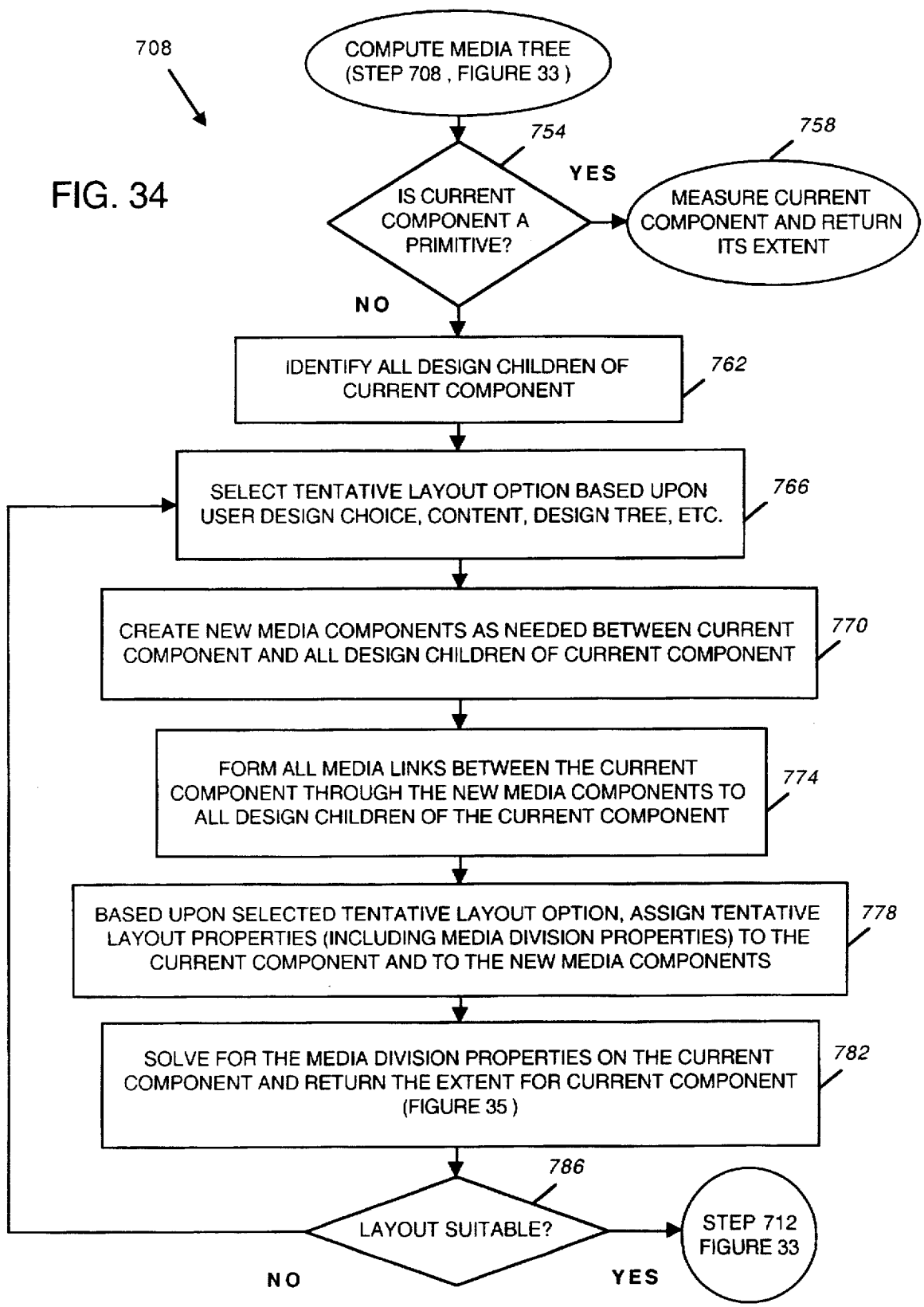
FIG. 34 is a flowchart illustrating one embodiment of the compute media tree step 708 from FIG. 33.

FIG. 34 describes the compute media tree step 708 of FIG. 33. This step will be called recursively for each component in the design tree as the procedure walks down through the design tree. As the design tree is walked, the context of where a particular component is located geographically on page and where it occurs in the design hierarchy will affect the layout options for that component.

A first step 754 tests whether the current component is a primitive. This test is used as a terminating condition for this recursive procedure. A component is a primitive (or atomic) typically if it is a leaf node containing content such as an image, text or data. If the component is a primitive, then in step 758 the component is measured and its extent is returned. Thus, as the design tree is recursively walked, when a leaf node is reached its extent will be returned back up to its parent in order that the parent may calculate its own extent.

The extent of a component is the N-dimensional space in the media that is occupied by the component. For example, for a two-dimensional media such as a paper page, the extent of a component is its X and Y coordinates and a width and a height. For VRML media, the extent of a component may be the above and may also include its depth and orientation. Thus, the extent of a component includes a variety of information and depends upon the media to which the content is to be rendered. The extent information returned for a component also includes information about whether a component fits in its allocation region and if not, by how much it is over fit or under fit. The extent of a component is typically dependent upon properties such as "fixed width" and "fixed height". For example, if a property of an image dictates that the image must have a fixed width, then based upon that property the image will adjust itself in order to fit in a particular region. That is, the image will keep its aspect ratio and will automatically adjust its height in order to fit within the region. Other properties that affect a component's extent are: tolerance to aspect ratio change, visual embellishments such as borders, frames, etc., orientation, inter-character, inter-line or inter paragraph spacing of text, and a user specification (such as interactively assigning a greater or lesser size).

Next, in step 762 the procedure continues with a depth first walk of the design tree by identifying all design children of the current component. As this is a recursive procedure, this step will be performed for each node in the design tree. At this step, only the immediate design children of the current component are identified in order that new media components may be created between the current component and its immediate design children as will be explained below in step 770.

Next, in step 766 a tentative layout option is selected based upon the user design choice, the content of the composition, aspects of the design tree, etc. For a particular design choice, many different layout options may be possible. This tentative layout option is based upon a variety of factors. For example, the user design choice is the initial design that the user has chosen for this composition. This initial design choice will influence which layout option is chosen. In addition, the content of the composition may dictate a particular layout option. For example, an extremely tall picture, a very wide picture or an extremely small amount of text may indicate that a particular layout option is more suitable for that particular content. Also, properties of the parent component may indicate a particular layout option. For example, a property of a parent component may dictate that any child picture be made as wide as possible.

Other aspects of the content may also influence the layout option. For example, new products may have been added to a particular composition, or columns may have to be changed from columns to rows if too many columns exist. Also, a very small caption and cutline may be inappropriate to the right of a very tall image and may be more appropriately placed below the image in order make the design more symmetrical. This step of selecting a tentative layout option may be performed automatically by the system by choosing an optimal option. Alternatively, the user may be presented with any number of layout options and may have a choice in selecting a particular option.

Next, in step 770 new media components are created as needed between the current component and all immediate design children of the current component. The purpose of this step is to create portions of the media tree between design components by creating new media components and forming links between these new media components and their parents and children. An example of a new media component between design components may be seen in FIG. 23d. In this Figure, it can be seen that the top level design component Product has design children components Picture, Name and Body. However, the media tree for this composition does not directly form a link between the top level component Product and its children Name and Body. Because a media region is to be allocated on the right hand side of the composition, a new media component labeled Text Area is created between the Product component and its design children components Name and Body.

Figure 23D:
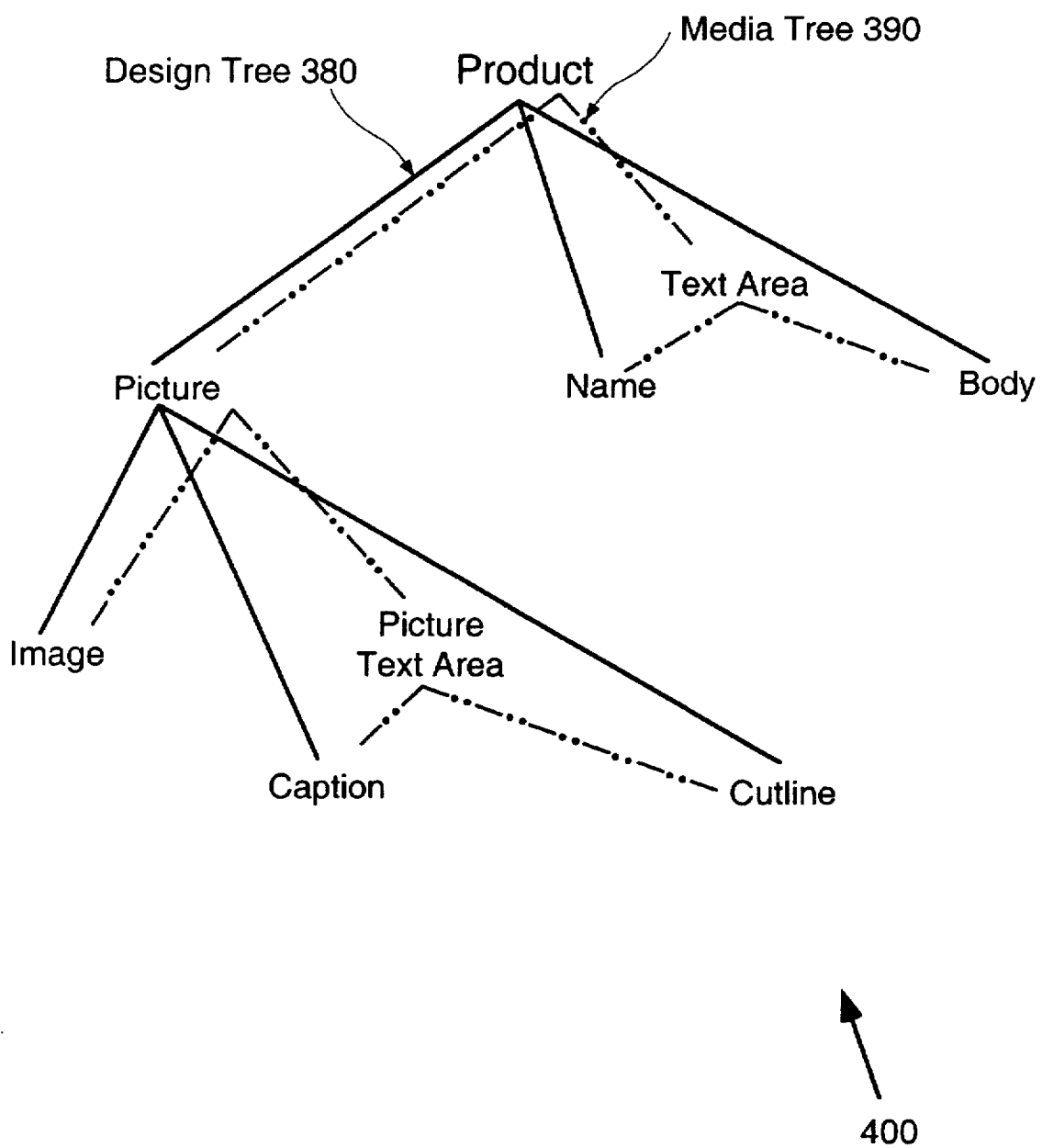

Once these new media components have been created in step 770, in step 774 all of the required media tree links between the current component through the new media components to the design children of the current component are formed. For example, once the new media component Text Area has been created as shown in FIG. 23d, it is linked to its parent component Product and to its children Name and Body. In this fashion, the media tree is created and built up through the use of the media facets while walking down the design tree.

Once these new media components have been created and linked, in step 778 tentative layout properties which include media division properties are assigned to the current component and to the new media components. These tentative layout properties are based in part upon the tentative layout option that was selected in step 766. The media division properties assigned may include choosing a media division type (such as one-way, two-way, or other) and setting any of the media division properties such as "vertical" or "horizontal", "fit", or "swap". The step of assigning tentative layout properties includes setting not only these media division properties but also includes setting any other properties of the current component that affects the layout of its children.

Once these tentative layout properties for a current component and its children media components have been assigned, it is necessary to solve for the media division properties on the current component. In other words, the extent for each child needs to be calculated in order to calculate the extent of the current component. This step 782 of solving for the media division on the current component may be performed in different manners. By way of example, one technique for performing this step will be discussed in more detail below with reference to FIG. 35. The result of performing step 782 will be to return the extent of the current component. The purpose of this step is to look at the media component children of the current component and to assign to them a particular media division (or region) according to the layout properties assigned to the current component. By solving for the media division on the current component, this process determines a layout between the current component and its design children. But because the layout of the design children may in part be determined upon how their children are laid out, this step will end up calling the procedure "compute media tree" (FIG. 34) recursively.

Once step 782 has completed, step 786 determines if this overall layout is suitable. If the layout is suitable, then control returns to step 712 of FIG. 33 in order to determine if the content fits closely enough in the available media. However, if the layout is determined not to be suitable, then this procedure loops back up to step 766 in order to choose another tentative layout and to create and link new media components as necessary.

The layout may be determined to be suitable or not suitable in step 786 according to a wide variety of factors. By way of example, various factors may help to determine suitability and each one may be weighted differently. These factors include: the suitability of a particular layout option for the chosen design, how well the extents of the components fit in the available media, if the content fits with the original design intent, properties of the media divisions of the component, the number of alternative layout options that have been tried, the time that has been spent in trying to choose an appropriate layout option, the suitability of the layout option for the particular media, and how a particular layout option ranks amongst all of the layout options considered. Other factors may also be considered in order to determine layout suitability.

FIG. 35 describes the solve media division step 782 of FIG. 34. This figure describes one embodiment of a technique for solving for the media division. This step takes a current component and calculates a media division only for its direct children. In other words, this is a specific numerical algorithm for solving for the properties of a media division. Other techniques may be utilized that make use of the abstract expression of the relationship between the parent component and its children components.

In a first step 804 each direct media child of the current component is determined. In step 808 a tentative media region is assigned to each media child based upon the layout properties of the current component and also based upon the media region allocated to the current component. A tentative media region is assigned because this region may be adjusted below in step 816. In one embodiment, media children are assigned a particular rectangular media region having a particular relationship to the current component. For example, in a two-way vertical media division, one child will be assigned a left-hand portion of the current component's media region and the second child will be assigned the right-hand portion.

Once a media region has been assigned to each media child, then in step 812 the procedure "compute media tree" of FIG. 34 is called for each media child component. This procedure will be recursively called and returns the extent for each child. This recursive call is done in a depth first fashion. In this fashion, tentative media regions are assigned to media children as the procedure walks down through the design tree, and when the procedure recursively pops back up through the design tree the actual extents for each child are returned (as calculated in the terminating step 758 of FIG. 34). Once these actual extents for each child are returned, then final media regions may be assigned to a particular media component. In step 816 final media regions are assigned to each media child of the current component based upon the returned extent for each child.

Step 820 tests whether the constraints provided by the media division of the current component are satisfied. These media division constraints must be checked again because in step 816 the media region for each child may have been changed. For example, if an image was too big for its allocated space and it was given more space in which to fit, it may then be necessary to recalculate space for the other components below or above the image. In another example, if an address for a company letterhead is placed as a footer at the bottom of the page, it may have been placed higher than expected. If so, then regions above this footer may have to be recomputed. If the constraints are not satisfied then the procedure loops back up to step 808 in order to assign a new tentative media region for each media child.

If, however, the constraints are satisfied, then in step 824 the media extents from all of the direct media children are combined in order to determine the extent of the current component. In other words, once the regions occupied by the children of the current component have been determined, it is then possible to determine the overall region that is occupied by the current component. For example, if a product region contains a picture and body text, it is first necessary to determine the amount of space needed by the picture and the body text in order to determine how much space must be allocated to the overall product. Once the extent of the current component has been determined, then this step of solving the media division for that current component has concluded and control returns to step 786 of FIG. 34.

This step 824 includes combining all of the extents from all of the direct media children of the current component. And because each media child includes knowledge of the extents from its media children, all this rich extent information will be combined as this procedure pops back up recursively. In other words, knowledge of the extents from all descendants is used in order to determine the extent of the current component. This rich extent information includes information about whether a child fits within a given region in addition to information about the size of that child. Thus, the rich extent information for the current component includes knowledge as to whether the region allocated for the current component is enough or not.

FIG. 36 describes the recompute content scale factors step 720 of FIG. 33. The purpose of this step is to take into account the relative culpability of each content type that may contribute to an over fit or an under fit of the content and to rescale the content scale factors for each type in order to achieve a better fit. In a first step 854 various parameters are input to this procedure. These parameters include the current content scale factors, the current overall fit (over fit or under fit and by how much), the rich extent information for all components, the total culpability for each content type (e.g., the number of excess inches for each type), the previous scale factors used, and the previous fit results. Next, in step 858 the current fit is compared to the optimal fit. If the current fit is too small for the available media then control moves to step 862, while if the current fit is too big then control moves to step 866.

Based upon the result of step 862 the content scale factors will be adjusted in different manners. For example, if the current fit is too small and the previous fit was also too small, this indicates that the content scale factors were adjusted upward previously but not by enough. Thus, in step 870 the content scale factors will be adjusted upward again by a preset amount. This preset amount may be any suitable number for adjusting all of the scale factors or for adjusting each one individually. In one optimization, if the underfit is 90% of the region or more, then an informed guess may be used based upon the input parameters in order to adjust the scale factors upward by other than a preset amount. Other heuristics may also be used to adjust these scale factors. For example, by design choice, images may be shrunk more than text if the content needs to be reduced while text may be enlarged more than images if the content needs to be enlarged. In one embodiment, text and graphics scale factors may also be adjusted separately to avoid unnecessary shrinkage of either text or graphics, depending on the percent of overall fit contributed by text content and by graphics content. In one embodiment, a formula may be used to determine a new text scale factor and a new graphic scale factor. For example, the new text scale factor=(Percent Text)/((Percent Text)$^2$+(Percent Graphics)$^2$), while the new graphics scale factor=(Percent Graphics)/((Percent Text)$^2$+(Percent Graphics)$^2$). In this formula, Percent Text and Percent Graphics refer to the percentage of each of these content that contribute to the overall fit (how much of a fit culprit they each are).

On the other hand, if the current fit is too small but the previous fit was too large, this indicates that the content scale factors were previously reduced but were reduced by too much. In this case, in step 874 the content scale factors are adjusted back upward to halfway to the previous scale factors. After either steps 870 or 874 has concluded control returns to step 708 of FIG. 33.

Steps 866, 878 and 882 may be performed in a similar fashion the steps 862, 870 and 874. For example, based upon the result of step 866 the content scale factors will be adjusted in different manners. For example, if the current fit is too big and the previous fit was also too big, this indicates that the content scale factors were adjusted downward previously but not by enough. Thus, in step 878 the content scale factors will be adjusted downward again by a preset amount. These factors may be adjusted downward in a fashion similar to that described for step 870.

On the other hand, if the current fit is too big but the previous fit was too small, this indicates that the content scale factors were previously increased but were increased by too much. In this case, in step 882 the content scale factors are adjusted back downward to halfway to the previous scale factors. After either steps 878 or 882 has concluded control returns to step 708 of FIG. 33.

FIGS. 29 through 36 have described an embodiment of a technique for adding new content to a composition. FIG. 37 now describes a technique for choosing a new design for a composition while the content and the media may stay the same. For example, one design for a document may include a table of contents while another design may not. If a new design is chosen that requires a table of contents, the new design will have a table of contents component, a new title page component and links between the table of contents and the rest of the document. It should be appreciated that this change of design may take place independently of a change of content or of media, or may take place in conjunction with a change in content and a change in media.

This procedure of choosing a new design for a composition begins with choosing a new design in step 902. This new design may be chosen by modifying a current design using the user interface, or the user may select a design from a catalogue of designs within the system. For example, a user may choose a vertical format for a brochure instead of the current horizontal format. Alternatively, in other embodiments, the system may automatically select a design for the user based upon various criteria.

In step 904 both the content tree and the design tree representations of the composition are saved to a temporary location within the system. These trees may be saved in any suitable fashion as will be appreciated by one of skill in the art. Thus, in this fashion, the content elements are saved along with their corresponding components which also allow access to the design properties for that content element.

Next, in step 908 the new design description chosen by the user is received from the system catalogue. The designs in the system catalogue of designs may be standard designs or may be custom designs that a user has created previously and stored. The new design description may include a root with a number of components, or may simply be a root component. This new design may appear differently due because of different properties or because of different drop tables used. For example, the root of this new design may have different properties defined upon it that will be inherited by all of its subcomponents. Similarly, any components initially attached to the root may have particular properties and values assigned to them. Also, the root (or any of its components) may utilize a different content drop table than that used by the old design. In this way, a new design may appear differently from an old design.

Next in step 912 the design tree of the composition is restored using the new design description. In this step, the new design description is used to form the new design tree. That is, the root of the new design tree (and any subcomponents of that root) are incorporated into the composition as the current design tree. At this point, a design tree exists for the composition (although it may just be a root), but no content has been added.

Once the design tree of the composition has been restored, in step 916 the saved content from the saved content tree is placed back into the restored composition. This saved content may be restored to the composition in any suitable manner. By way of example, the saved content may be added to the new design tree by a simulation of dropping content. That is, the saved content may be dropped onto the composition which contains the new design tree. This dropping of content onto a composition may be performed as discussed in FIGS. 29 through 32. Additionally, an optimization may be performed in order to preserve old user document settings. For example, override properties of a particular component in the old design tree may be applied to a new component associated with the same content.

This optimization may be performed in the following manner. As content is being dropped onto the new design, a new component may be created for that content. For example, a product from a brochure may have a new component created for it. And because a particular item of content is associated with its design component from the old design tree, the old design properties of this component (applied to the item of content) are available for inspection. By way of example, content may be associated with design tree components as illustrated in FIGS. 6, 18, 21 or by using other techniques. In other words, a walk of the content tree (as content is being dropped) still allows the old design components and properties to be accessed. If the new component created (product) is of the same type as the old component (product), then all of the override properties for that old component will be transferred over to the new component. In this fashion, local property overrides for a component (as applied to a particular item of content) are preserved.

Consider the brochure example in which the user is switching from a horizontal format for products to a vertical format. The first product may have an emphasis property set locally which overrides the document properties and presents that product all in bold (instead of in regular font like the rest of the document). When the old content is dropped onto the new vertical design, the new document may only specify regular font. When the first product is dropped, it is noted that its new component (product) is the same as its old component (product). Included within the properties defined upon the old component are the property "horizontal" and the property "bold". Because "horizontal" is a property inherited from the document and not locally defined, it will not be copied over to the new component. But, "bold" is a locally defined, override property. It will be copied over to the new component, thus preserving the first product as being all in bold in the new vertical format. At this point, the content and design trees now exist for the new composition.

Next, in step 920 the content of the new design is fit to the appropriate media by calling the fit content to media step of FIG. 33. This step will walk through the new design tree and create the media tree and assign regions to each content item. This step of fitting content to media has been discussed in greater detail above. Once this step has concluded, this procedure for choosing a new design for a composition is complete.

Figure 38:
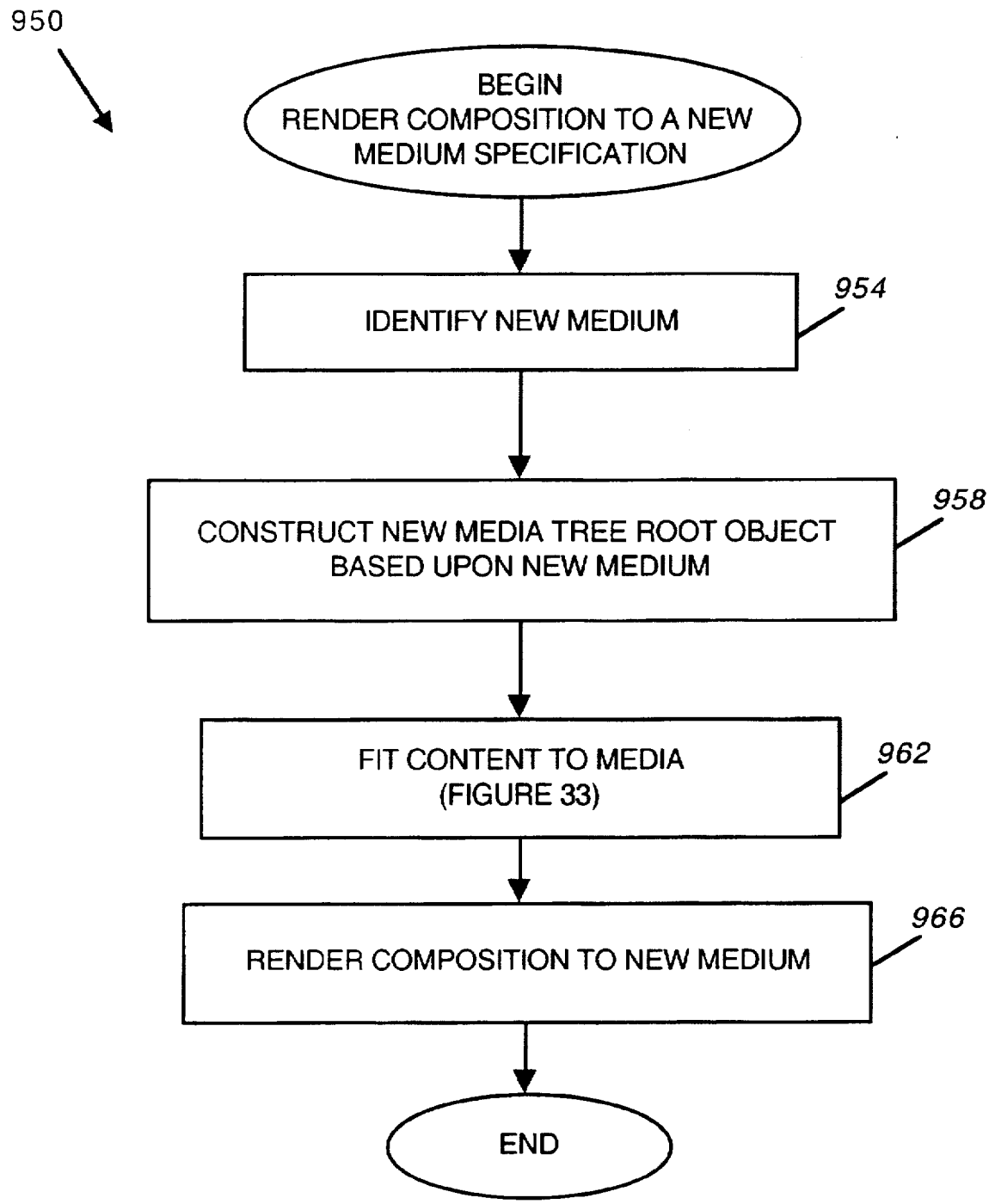
FIG. 38 is a flowchart illustrating a method of rendering a composition to a new medium according to one embodiment of the present invention.

In addition to adding new content to a composition or changing the design of a composition, a user may wish to render a composition into a different medium. FIG. 38 describes an embodiment of a procedure for performing this function. For example, if the user has produced a composition rendered for paper media, the user may also wish to publish this same document in an HTML format, or vice-versa. The composition may be rendered to a new medium independent of any change to the content or to the design. Alternatively, it is also possible to render a composition to a new medium if the content and/or the design is also changing.

In a first step 954 a new medium is identified. This new medium may be identified by the user issuing a command to the user interface or it may also be identified automatically by a computer system when it is desirable to publish to a new medium. A wide variety of new media may be identified. By way of example, these new media may be paper, HTML, an OLE object, VRML, or any of the media previously discussed. Next, in step 958 a new media tree root object is constructed based upon the new chosen medium. This step is a pre-programmed function supplied as a method of a built-in factory object.

At this point, step 962 calls the fit content to media procedure of FIG. 33 above. This fit content to media procedure will walk through the design tree of the composition and create the new media tree and assign layout regions for each content item. This step utilizes the existing content and design trees and will recompute a new media tree from scratch. The old media tree will be invalidated globally. This fit content to media step has been discussed in detail above. Once step 962 has completed, in step 966 the composition is rendered to the new medium. Step 966 may be performed as discussed above in step 524 of FIG. 29.

Embodiments of the present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer-readable materials that include program instructions for performing various computer-implemented operations. The materials and program instructions may be those specially designed and constructed for the purposes of the present invention, or they may be of the kind well known and available to those having skill in the computer software arts. Examples of computer-readable materials include, but are not limited to, magnetic materials such as hard disks, floppy disks, and magnetic tape; optical materials such as CD-ROM disks; magneto-optical materials such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 39:
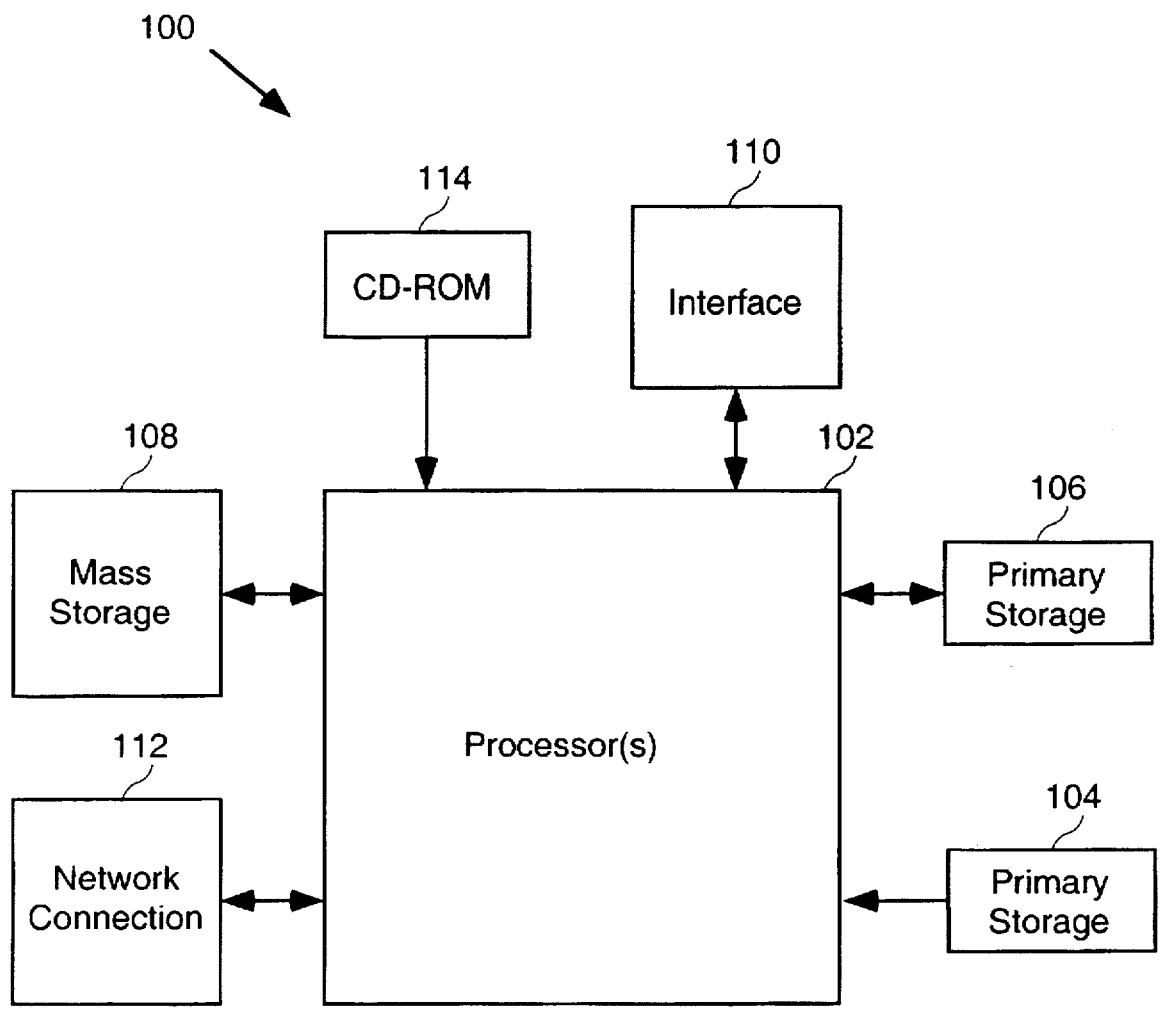
FIG. 39 shows a typical computer system suitable for implementing various embodiments of the present invention.

FIG. 39 illustrates a typical computer system in accordance with an embodiment of the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable materials described above. A mass storage device 108 is also coupled bi-directionally to CPU 102 and provides additional data storage capacity and may include any of the computer-readable materials described above. The mass storage device 108 may be used to store programs, data and the like and is typically a secondary storage unit such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Figure 3:
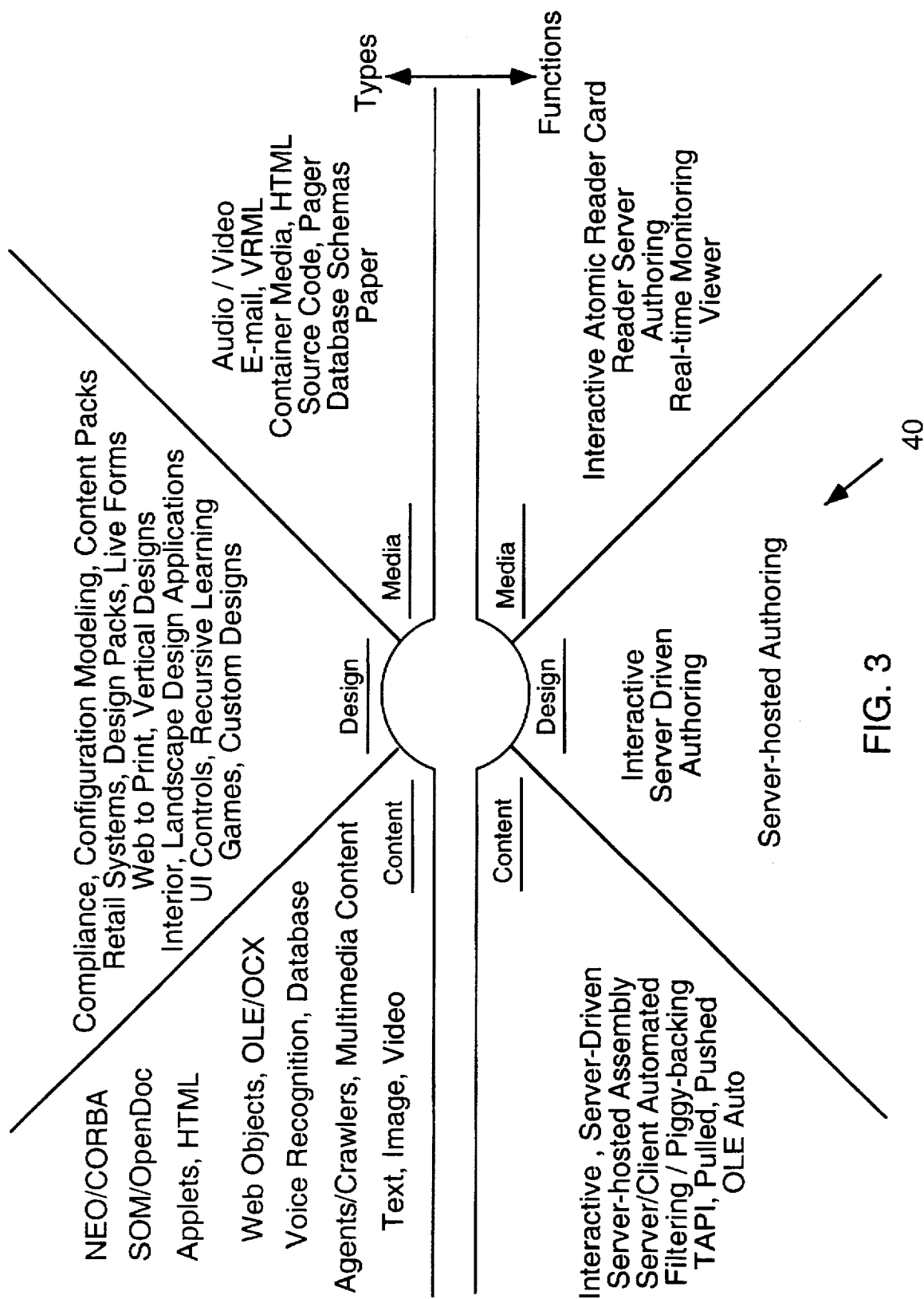
FIG. 3 illustrates various types and functions of content, design and media.

Although the foregoing invention has been described in some detail for purposes of clarity of understanding, it will be apparent that certain changes and modifications may be practiced within the scope of the appended claims. For instance, the embodiments of the present invention described are applicable to other types of application programs aside from the one described above. Also, the design engine of the present invention may be based upon any suitable technology, and not necessarily upon the use of a facets engine. A composition may contain many kinds of components, the types of components described herein are examples of types that may be used. Also, the content, design and media aspects of a composition may represent a wide variety of information. An example of different types and functions of content, design and media is shown in FIG. 3. Shown in the top half of FIG. 3 are examples of various types of content, design and media. Shown in the bottom half of the Figure are examples of various functions performed by content, design and media.

Although particular structures have been shown for representing and connecting the content, design and media trees of the present invention, a composition of information may be separated symbolically into content, design and media aspects using other representations and interconnections. In particular, content elements may be associated with design components in different ways. The above description has also provided illustrative examples of how content may be added, a design may be changed or a new medium specified. It should be appreciated that other more complex modifications are also be possible. Also, a given content may be fit to a particular media by also adjusting the design or by adjusting the media.

An embodiment of a media division has been described above showing in particular various properties. This media division may be represented in different manners, and may be associated with a parent component and its children using different techniques. Also, a media division may include many other properties that describe the layout of children components in relation to a parent component. Also, solving for the media division properties of a current component in order to lay out its children may be performed in different manners. Once a layout has been generated, this layout may be modified, for example, by adjusting scale factors for the composition. Other techniques for modifying a layout may also be used in order to fit content to a medium. Therefore, the described embodiments should be taken as illustrative and not restrictive, and the invention should not be limited to the details given herein but should be defined by the following claims and their full scope of equivalents.

We claim:

1. A computer-implemented method of adding content to a composition having a chosen design and automatically calculating a layout for said composition, said method comprising:

receiving a content object dropped upon a receiving component of said composition, said dropped content object having at least one potential type, said composition represented by a plurality of components in a design tree and including a plurality of content elements associated with said plurality of components;

matching a potential type of said content object with a compatible type of said receiving component;

modifying said design tree to incorporate said content object; and calculating media layout values for each content element of said plurality of content elements of said composition using said design tree such that said plurality of content elements are laid out in said chosen design.

2. A method as recited in claim 1 wherein said matching a potential type of said content object with a compatible type of said receiving component is performed in part by using a content drop table.

3. A method as recited in claim 1 wherein said matching a potential type of said content object with a compatible type of said receiving component includes:

determining whether a match is found; and wherein when it is determined that a match is not found, passing said potential types of said content object to parent components of said receiving component to determine whether a match is found with a compatible type of any of said parent components.

4. A method as recited in claim 1 wherein said modifying said design tree to incorporate said content object includes:

creating a content component to represent said content object; and inserting said content component into said design tree as a sub-component of said receiving component.

5. A method as recited in claim 1 wherein said calculating media layout values uses a media tree representative of a medium in which said composition may be rendered, said media tree having media components associated with said media layout values for each content element.

6. A computer-implemented method of adding content to a composition having a chosen design and automatically calculating a layout for said composition, said method comprising:

receiving a content object dropped upon a receiving component of said composition, said dropped content object having at least one potential type, said composition represented by a plurality of components in a design tree and including a plurality of content elements associated with said plurality of components;

matching a type of said dropped content object with a compatible type of said receiving component;

changing the content of said receiving component based upon the content of said dropped content object; and calculating media layout values for each content element of said plurality of content elements of said composition using the design tree such that said plurality of content elements are laid out in said chosen design.

7. A method as recited in claim 6 wherein said matching a potential type of said content object with a compatible type of said receiving component is performed in part by using a content drop table.

8. A method as recited in claim 6 wherein said matching a potential type of said content object with a compatible type of said receiving component includes:

determining whether a match is found; and wherein when it is determined that a match is not found, passing said potential types of said content object to parent components of said receiving component to determine whether a match is found with a compatible type of any of said parent components.

9. A method as recited in claim 6 wherein said calculating media layout values uses a media tree representative of a medium in which said composition may be rendered, said media tree having media components associated with said media layout values for each content element.

10. A computer-implemented method of adding content to a composition having a chosen design and automatically calculating a layout for said composition, said method comprising:

receiving a content object dropped upon a receiving component of said composition, said dropped content object having at least one potential type, said composition represented by a plurality of components in a design tree and including a plurality of content elements associated with said plurality of components;

matching a type of said dropped content object with a compatible type of said receiving component;

changing properties of said receiving component based upon properties of said dropped content object; and calculating media layout values for each content element of said plurality of content elements of said composition using the design tree such that said plurality of content elements are laid out in said chosen design.

11. A method as recited in claim 10 wherein said matching a potential type of said content object with a compatible type of said receiving component is performed in part by using a content drop table.

12. A method as recited in claim 10 wherein said matching a potential type of said content object with a compatible type of said receiving component includes:

determining whether a match is found; and wherein when it is determined that a match is not found, passing said potential types of said content object to parent components of said receiving component to determine whether a match is found with a compatible type of any of said parent components.

13. A method as recited in claim 10 wherein said calculating media layout values uses a media tree representative of a medium in which said composition may be rendered, said media tree having media components associated with said media layout values for each content element.

14. A computer-implemented method of adding content to a composition having a chosen design and automatically calculating a layout for said composition, said method comprising:

receiving a content object dropped upon a receiving component of said composition, said dropped content object having at least one potential type, said composition represented by a plurality of components in a design tree and including a plurality of content elements associated with said plurality of components;

determining whether a compatible type of said receiving component matches with a potential type of said dropped content object, wherein when it is determined that no compatible type of said receiving component matches with a potential type of said content object, performing the following steps, identifying a parent component of said receiving component, determining whether a potential type of said dropped content object matches with a compatible type of said parent component, and wherein when it is determined that a potential type of said dropped content object matches with a compatible type of said parent component, calculating media layout values for each content element of said plurality of content elements of said composition using the design tree such that said plurality of content elements are laid out in said chosen design.

15. A method as recited in claim 14 wherein said determining whether a compatible type of said receiving component matches with a potential type of said dropped content object is performed in part by using a content drop table.

16. A method as recited in claim 14 wherein said calculating media layout values uses a media tree representative of a medium in which said composition may be rendered, said media tree having media components associated with said media layout values for each content element.

17. A method as recited in claim 14 wherein when it is determined that a potential type of said dropped content object matches with a compatible type of said parent component, said method further comprises modifying said design tree to incorporate said content object.

18. A computer-implemented method of recognizing content added to a composition having a chosen design, said method comprising:

receiving a content object dropped upon a receiving component of said composition, said dropped content object having at least one potential content type, said composition represented by a plurality of components in a design tree and including a plurality of content elements associated with said plurality of components;

identifying said at least one potential content types of said dropped content object;

creating a component having an associated content element representative of said content object and of one of said identified potential content types;

modifying said design tree to incorporate said created component; and placing said content element within said composition such that said content element appears in said composition in the context of said chosen design.

19. A method as recited in claim 18 wherein said creating a component utilizes a content drop table in order to determine an appropriate component to be created.

20. A method as recited in claim 18 further comprising:

calculating media layout values for each content element of said plurality of content elements of said composition using said design tree such that said plurality of content elements are laid out in said chosen design.

* * * * *